United States Patent [19]

Spix et al.

[11] Patent Number: 5,179,702
[45] Date of Patent: Jan. 12, 1993

[54] SYSTEM AND METHOD FOR CONTROLLING A HIGHLY PARALLEL MULTIPROCESSOR USING AN ANARCHY BASED SCHEDULER FOR PARALLEL EXECUTION THREAD SCHEDULING

[75] Inventors: George A. Spix; Diane M. Wengelski; Stuart W. Hawkinson; Mark D. Johnson; Jeremiah D. Burke; Keith J. Thompson; Gregory G. Gaertner; Giacomo G. Brussino, all of Eau Claire; Richard E. Hessel, Altoona; David M. Barkai, Eau Claire; Steve S. Chen; Steven G. Oslon, both of Chippewa Falls, all of Wis.; Robert E. Strout, II, Livermore, Calif.; Jon A. Masamitsu, Livermore, Calif.; David M. Cox, Livermore, Calif.; Linda J. O'Gara, Livermore, Calif.; Kelly T. O'Hair, Livermore, Calif.; David A. Seberger, Livermore, Calif.; James C. Rasbold, Livermore, Calif.; Timothy J. Cramer, Pleasanton, Calif.; Don A. Van Dyke, Pleasanton, Calif.; Ashok Chandramouli, Fremont, Calif.

[73] Assignee: Supercomputer Systems Limited Partnership, Eau Claire, Wis.

[21] Appl. No.: 537,466

[22] Filed: Jun. 11, 1990

Related U.S. Application Data

[63] Continuation-in-part of Ser. No. 459,083, Dec. 29, 1989.

[51] Int. Cl.[5] ............................................. G06F 9/46
[52] U.S. Cl. .................................. 395/650; 364/DIG. 1; 364/228.7; 364/281.3; 364/281.7
[58] Field of Search ... 364/200 MS File, 900 MS File; 395/650

[56] References Cited

U.S. PATENT DOCUMENTS 3,593,300 7/1971 Driscoll, Jr. et al. .............. 395/650
3,648,253 3/1972 Mullery et al. .................... 364/200
4,099,235 7/1978 Hoschler et al. .................. 364/200
4,183,083 1/1980 Chatfield ........................... 364/200
4,484,274 11/1984 Berenbaum et al. ............... 364/200
4,494,188 1/1985 Nakane et al. .................... 364/200
4,633,387 12/1986 Hartung et al. ................... 395/650
4,747,130 5/1988 Ho ..................................... 364/200
4,800,521 1/1989 Carter et al. ...................... 364/900
4,809,170 2/1989 Leblang et al. .................... 395/700
4,837,676 6/1989 Rosman ............................. 364/200
4,845,665 7/1989 Heath et al. ....................... 364/900
4,890,257 12/1989 Anthias et al. .................... 364/900
4,939,507 7/1990 Beard et al. ....................... 364/200
4,951,192 8/1990 Chase, Jr. et al. ................. 395/700
5,050,070 9/1991 Chastain et al. ................... 395/375

OTHER PUBLICATIONS

Almasi, G. and Gottlieb, A., *Highly Parallel Computing*, Benjamin/Cummings Publ. Co., Inc. (1989), Chpt. 7, pp. 247-277.

*Primary Examiner*—Thomas C. Lee
*Assistant Examiner*—Richard Lee Ellis
*Attorney, Agent, or Firm*—Patterson & Keough

[57] ABSTRACT

An integrated software architecture for a highly parallel multiprocessor system having multiple tightly-coupled processors that share a common memory efficiently controls the interface with and execution of programs on such a multiprocessor system. The software architecture combines a symmetrically integrated multithreaded operating system and an integrated parallel user environment. The operating system distributively implements an anarchy-based scheduling model for the scheduling of processes and resources by allowing each processor to access a single image of the operating system stored in the common memory that operates on a common set of operating system shared resources. The user environment provides a common visual representation for a plurality of program development tools that provide compilation, execution and debugging capabilities for multithreaded user programs and assumes parallelism as the standard mode of operation.

12 Claims, 53 Drawing Sheets

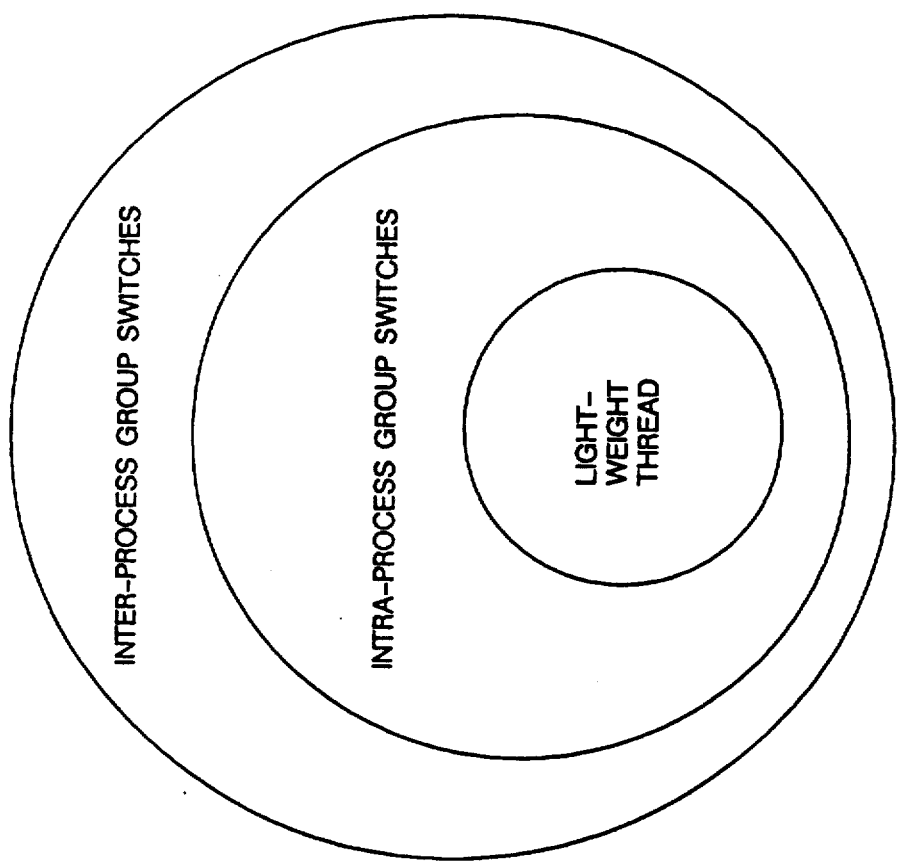

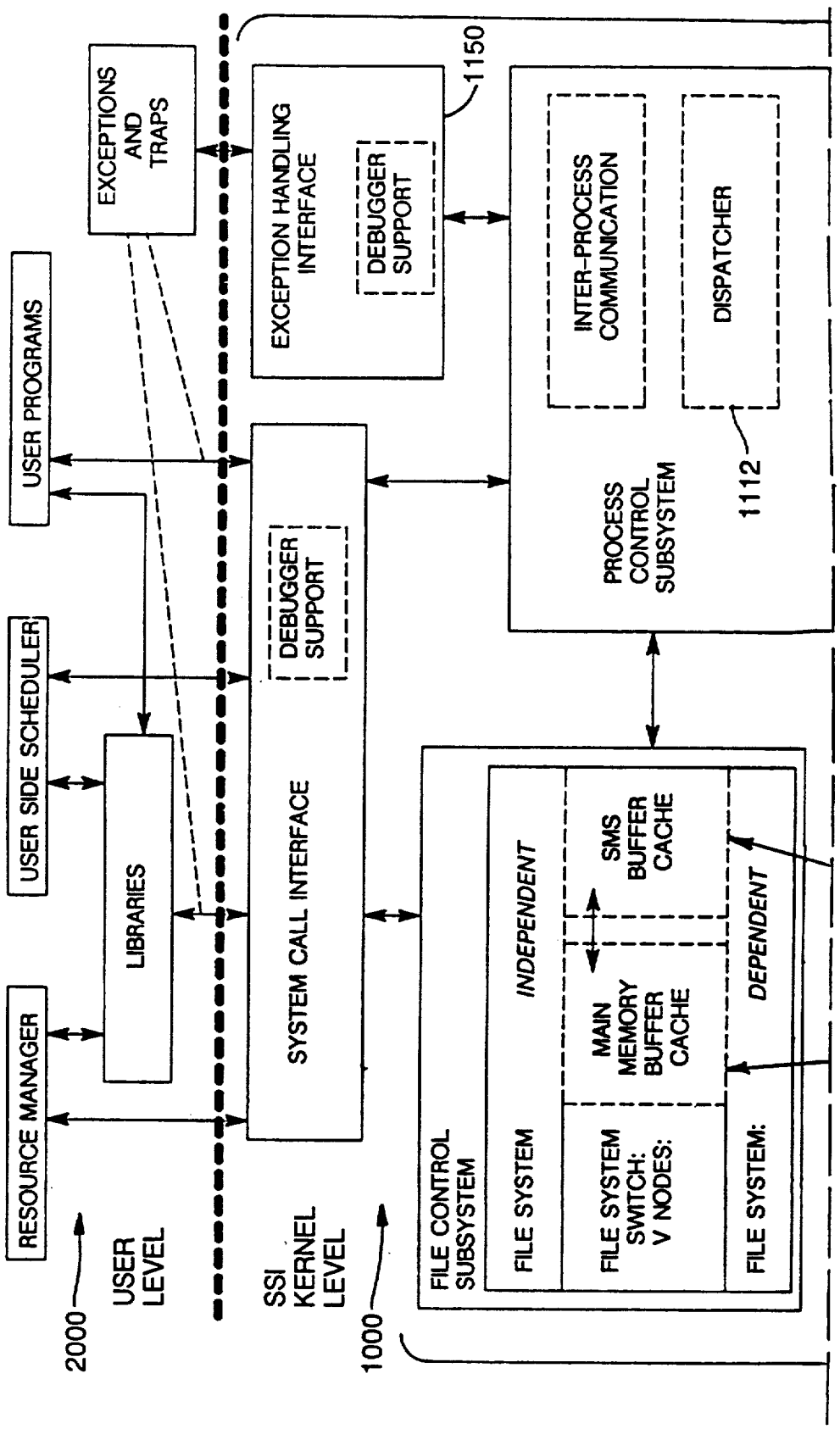

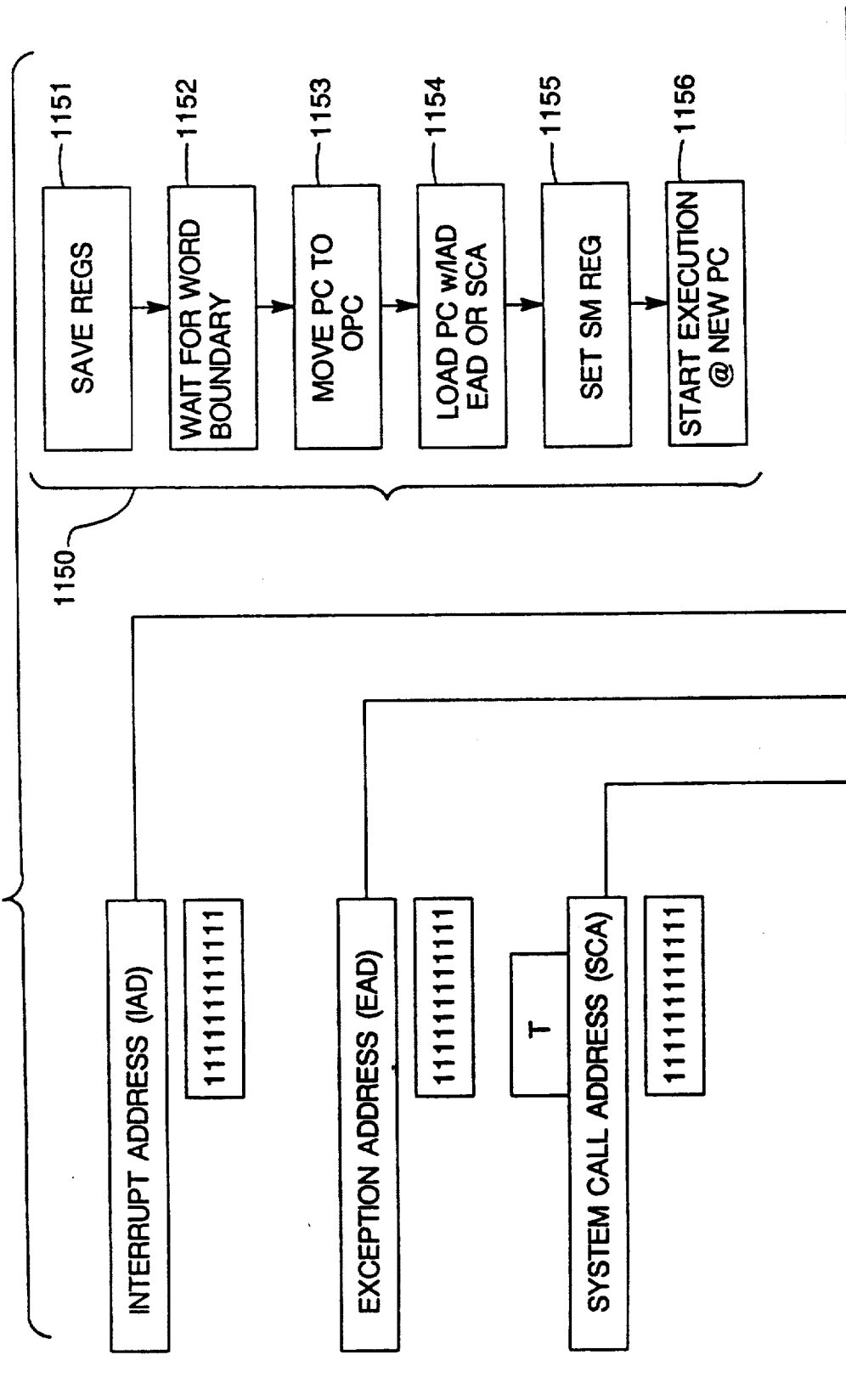

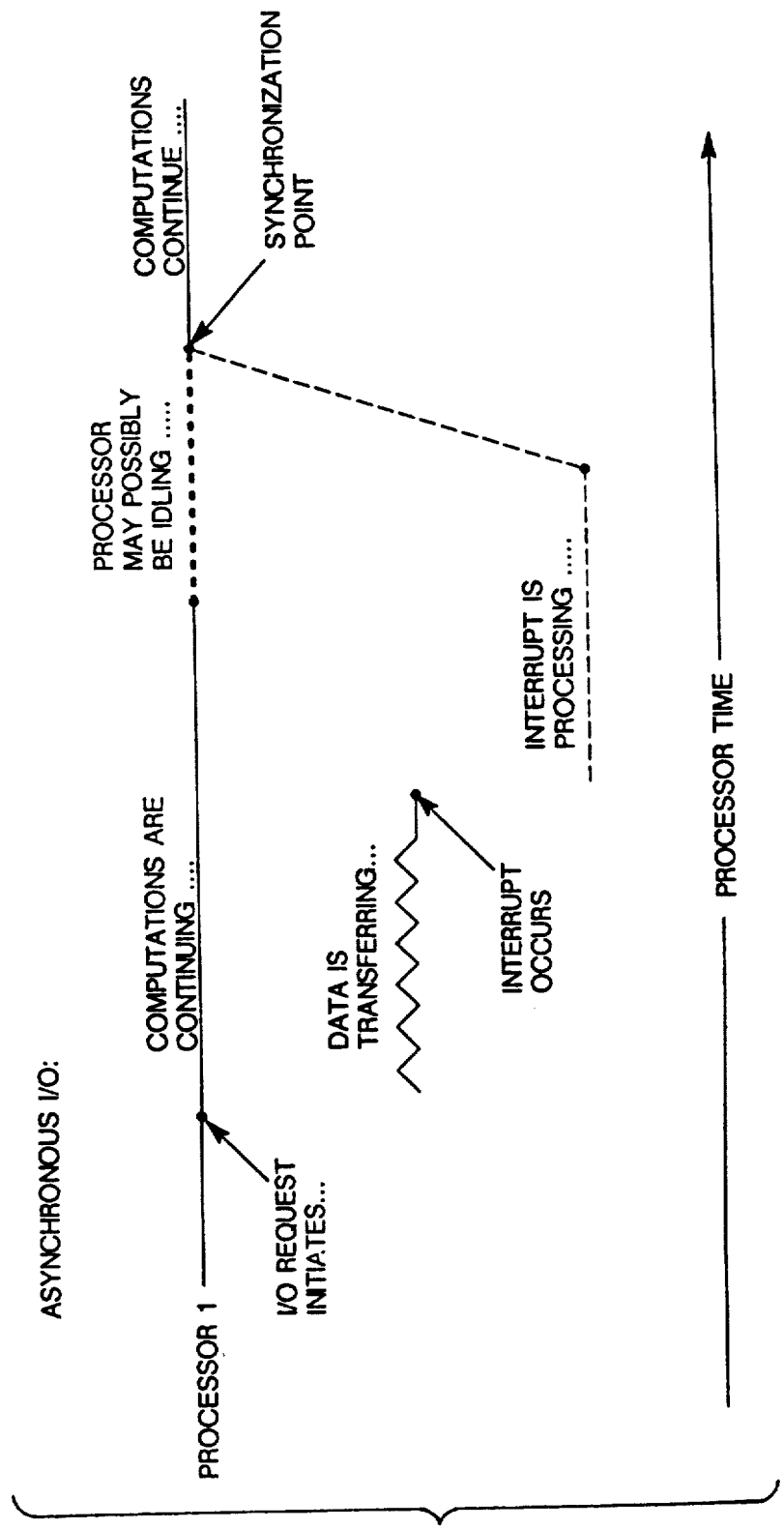

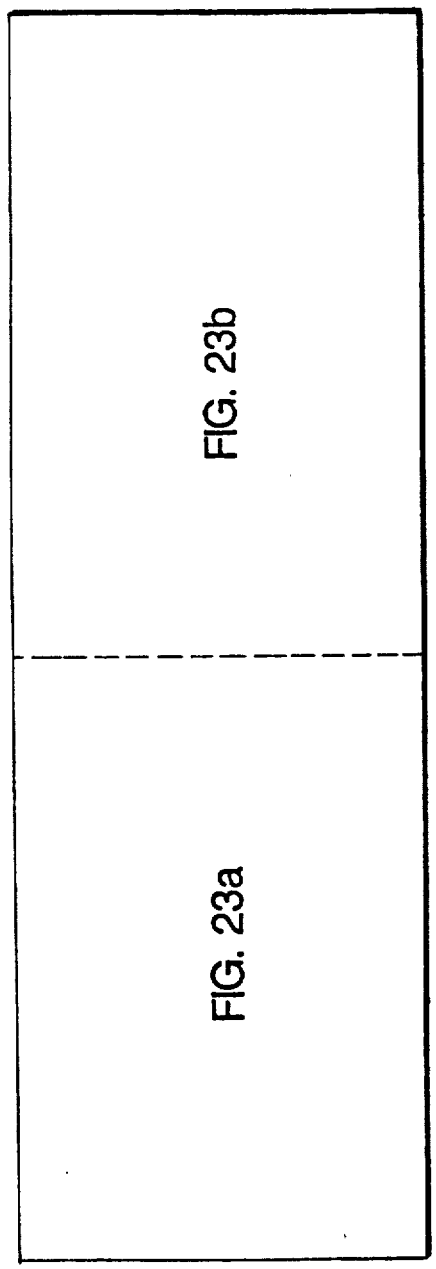
FIG. 23a
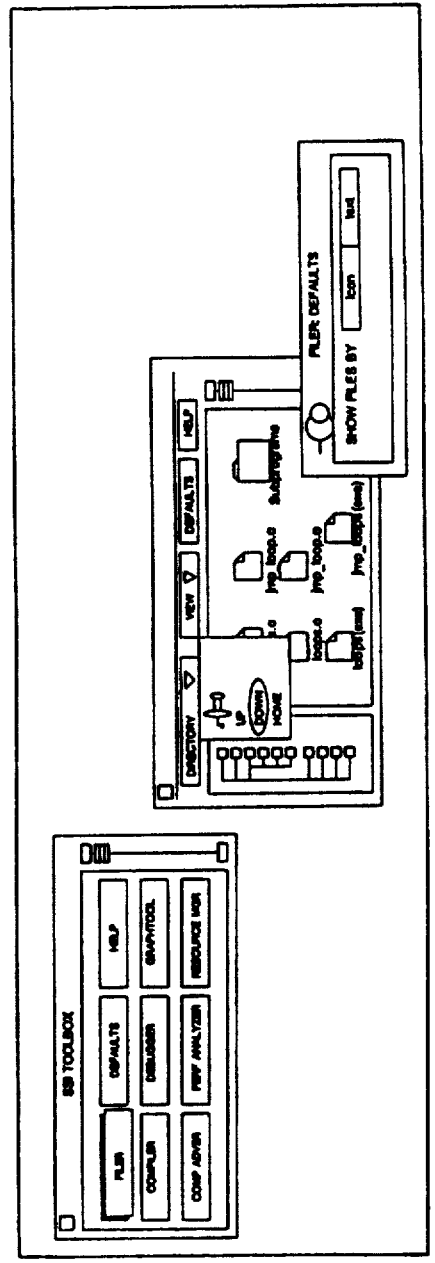
FIG. 23b
FIG. 23-0
FIG. 23

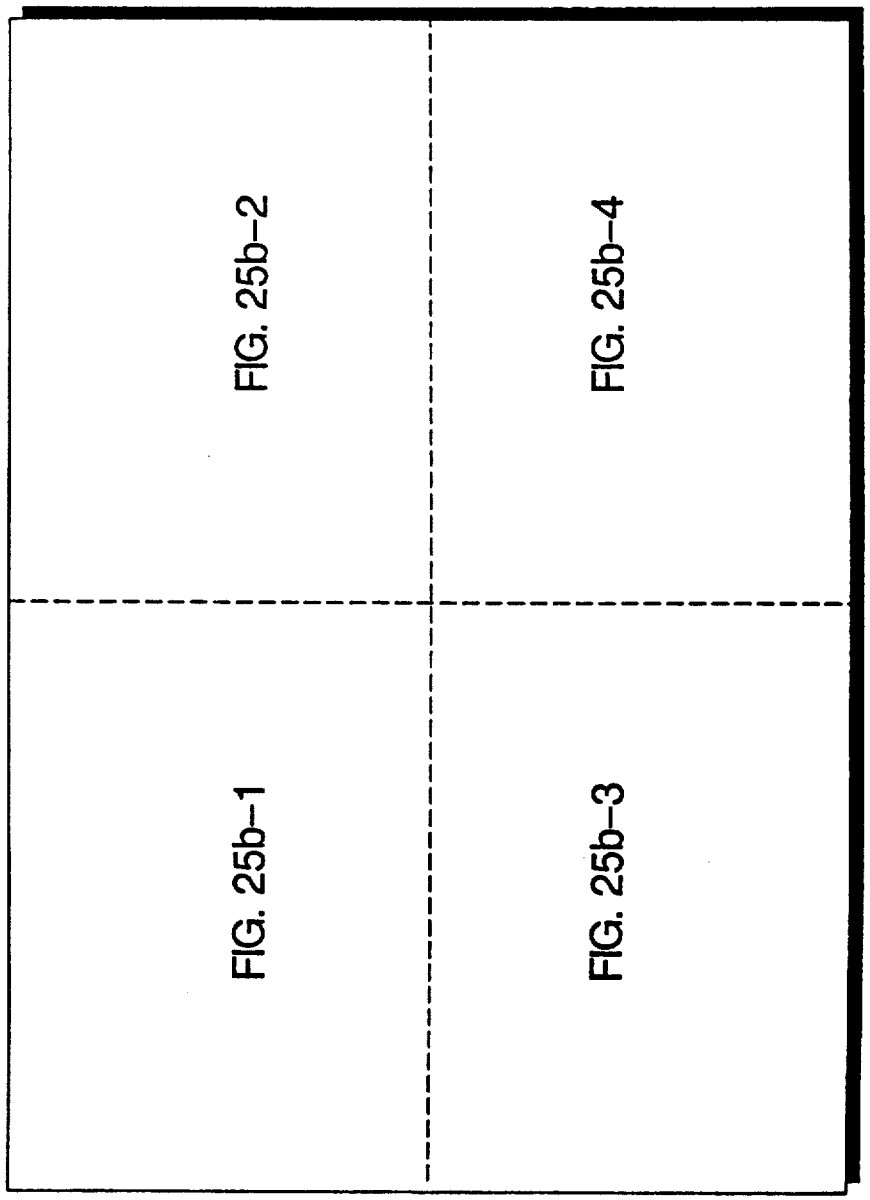

INTERACTIVE NODESTOOL – USES INFORMATION FROM THE COMPILER

INTERPROCEDURAL
PROCTOOL – CALL GRAPH AND INTERPROCEDURAL
ANALYSIS

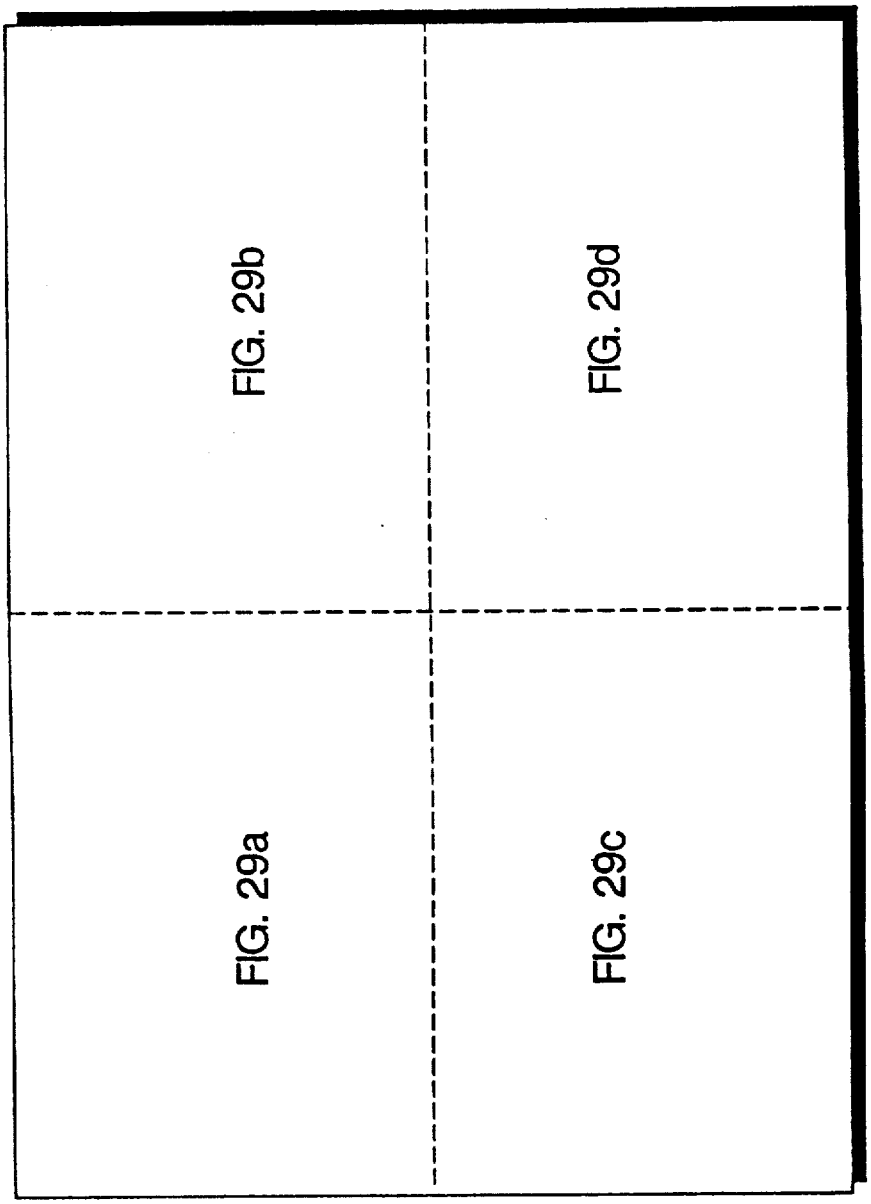

SYSTEM AND METHOD FOR CONTROLLING A HIGHLY PARALLEL MULTIPROCESSOR USING AN ANARCHY BASED SCHEDULER FOR PARALLEL EXECUTION THREAD SCHEDULING

RELATED APPLICATIONS

This application is a continuation-in-part of an application filed in the United States Patent and Trademark Office on Dec. 29, 1989, entitled CLUSTER ARCHITECTURE FOR A HIGHLY PARALLEL SCALAR/VECTOR MULTIPROCESSOR SYSTEM, Ser. No. 07/459,083, and assigned to the assignee of the present invention, the disclosure of which is hereby incorporated by reference in the present application. This application is also related to co-pending applications filed in the United States Patent and Trademark Office concurrently herewith, entitled DISTRIBUTED INPUT/OUTPUT ARCHITECTURE FOR A HIGHLY PARALLEL MULTIPROCESSOR SYSTEM, Ser. No. 07/536,182, and SCALAR/VECTOR PROCESSOR, Ser. No. 07/536,409, both of which are assigned to the assignee of the present invention, and the disclosures of which are hereby incorporated by reference in the present application.

TECHNICAL FIELD

This invention relates generally to the field of operating system software and program development tools for computer processing systems. More particularly, the present invention relates to an integrated software architecture for a highly parallel multiprocessor system having multiple, tightly-coupled processors that share a common memory.

BACKGROUND ART

It is well recognized that one of the major impediments to the effective utilization of multiprocessor systems is the lack of appropriate software adapted to operate on something other than the traditional von Neuman computer architecture of the types having a single sequential processor with a single memory. Until recently, the vast majority of scientific programs written in the Fortran and C programming languages could not take advantage of the increased parallelism being offered by new multiprocessor systems, particularly the high-speed computer processing systems which are sometimes referred to as supercomputers. It is particularly the lack of operating system software and program development tools that has prevented present multiprocessor systems from achieving significantly increased performance without the need for user application software to be rewritten or customized to run on such systems.

Presently, a limited number of operating systems have attempted to solve some of the problems associated with providing support for parallel software in a multiprocessor system. To better understand the problems associated with supporting parallel software, it is necessary to establish a common set of definitions for the terms that will be used to describe the creation and execution of a program on a multiprocessor system. As used within the present invention, the term program refers to either a user application program, operating system program or a software development program referred to hereinafter as a software development tool. A first set of terms is used to describe the segmenting of the program into logical parts that may be executed in parallel. These terms relate to the static condition of the program and include the concepts of threads and multithreading. A second set of terms is used to describe the actual assignment of those logical parts of the program to be executed on one or more parallel processors. This set of terms relate to the dynamic condition of the program during execution and include the concepts of processes, process images and process groups.

A thread is a part of a program that is logically independent from another part of the program and can therefore be executed in parallel with other threads of the program. In compiling a program to be run on a multiprocessor system, some compilers attempt to create multiple threads for a program automatically, in addition to those threads that are explicitly identified as portions of the program specifically coded for parallel execution. For example, in the UNICOS operating system for the Cray X-MP and Y-MP supercomputers from Cray Research, Inc., the compilers (one for each programming language) attempt to create multiple threads for a program using a process referred to by Cray Research as Autotasking ®. In general, however, present compilers have had limited success in creating multiple threads that are based upon on analysis of the program structure to determine whether multithreading is appropriate and that will result in reduction in execution time of the multithreaded program in proportion to the number of additional processors applied to the multithreaded program.

The compiler will produce an object code file for each program module. A program module contains the source code version for all or part of the program. A program module may also be referred to as a program source code file. The object code files from different program modules are linked together into an executable file for the program. The linking of programs together is a common and important part of large scale user application programs which may consist of many program modules, sometimes several hundred program modules.

The executable form of a multithreaded program consists of multiple threads that can be executed in parallel. In the operating system, the representation of the executable form of a program is a process. A process executes a single thread of a program during a single time period. Multiple processes can each execute a different thread or the same thread of a multithreaded program. When multiple processes executing multiple threads of a multithreaded program are simultaneously executing on multiple processors, then parallel processing of a program is being performed. When multiple processes execute multiple threads of a multithreaded program, the processes share a single process image and are referred to as shared image processes. A process image is the representation in the operating system of the resources associated with process. The process image includes the instructions and data for the process, along with the execution context information for the processor (the values in all of the registers, both control registers and data registers, e.g., scalar registers, vector registers, and local registers) and the execution context information for operating system routines called by the process.

In present multiprocessor systems, the operating system is generally responsible for assigning processes to the different processors for execution. One of the problems for those prior art operating systems that have attempted to provide support for multithreaded programs is that the operating systems themselves are typically centralized and not multithreaded. Although a centralized, single threaded operating system can schedule multiple processes to execute in multiple processors in multiprocessor systems having larger numbers of processors, the centralized, single threaded operating system can cause delays and introduce bottlenecks in the operation of the multiprocessor system.

One method of minimizing the delays and bottlenecks in the centralized operating system utilizes the concept of a lightweight process. A lightweight process is a thread of execution (in general, a thread from a multithreaded program) plus the context for the execution of the thread. The term lightweight refers to the relative amount of context information for the thread. A lightweight process does not have the full context of a process (e.g., it often does not contain the full set of registers for the processor). A lightweight process also does not have the full flexibility of a process. The execution of a process can be interrupted at any time by the operating system. When the operating system stops execution of a process, for example in response to an interrupt, it saves the context of the currently executing process so that the process can be restarted at a later time at the same point in the process with the same context. Because of the limited context information, a lightweight process should not be interrupted at an arbitrary point in its execution. A lightweight process should only be interrupted at a specific point in its execution. At these specific points, the amount of context that must be saved to restart the lightweight process is known. The specific points at which the lightweight process may be interrupted are selected so that the amount of context that must be saved is small. For example, at certain points in the execution of a lightweight process, it is known which registers do not have values in them such that they would be required for the restart of the lightweight process.

Lightweight processes are typically not managed by the operating system, but rather by code in the user application program. Lightweight processes execute to completion or to points where they cannot continue without some execution by other processes. At that point, the lightweight processes are interrupted by the code in the user's application program and another lightweight process that is ready to execute is started (or restarted). The advantage of present lightweight processes is that the switching between the lightweight processes is not done by the operating system, thus avoiding the delays and bottlenecks in the operating system. In addition, the amount of context information necessary for a lightweight process is decreased, thereby reducing the time to switch in and out of a lightweight process. Unfortunately, the handling of lightweight processes must be individually coded by the user application program.

Another problem for prior art operating systems that have attempted to provide support for multithreaded programs is that the operating systems are not designed to minimize the overhead of different types of context switching that can occur in fully optimized multiprocessor system. To understand the different types of context switching that can occur in a multiprocessor system, it is necessary to define additional terms that describe the execution of a group of multithreaded processes.

Process Group-For Unix ® and other System V operating systems, the kernel of the operating system uses a process group ID to identify groups of related processes that should receive a common signal for certain events. Generally, the processes that execute the threads of a single program are referred to a process group.

Process Image-Associated with a process is a process image. A process image defines the system resources that are attached to a process. Resources include memory being used by the process and files that the process currently has open for input or output.

Shared Image Processes-These are processes that share the same process image (the same memory space and file systems). Signals (of the traditional System V variety) and semaphores synchronize shared image processes. Signals are handled by the individual process or by a signal processing group leader, and can be sent globally or targeted to one or more processes. Semaphores also synchronize shared image processes.

Multithreading-Multiple threads execute in the kernel at any time. Global data is protected by spin locks and sleeping locks (Dijkstra semaphores). The type of lock used depends upon how long the data has to be protected.

Spin Locks-Spin locks are used during very short periods of protection, as an example, for memory references. A spin lock does not cause the locking or waiting process to be rescheduled.

Dijkstra Semaphores-Dijkstra semaphores are used for locks which require an exogenous event to be released, typically an input/output completion. They cause a waiting process to discontinue running until notification is received that the Dijkstra semaphore is released.

Intra-Process Context Switch-a context switch in which the processor will be executing in the same shared process image or in the operating system kernel.

Inter-Process Context Switch-a context switch in which the processor will be executing in a different shared process image. Consequently, the amount of context information that must be saved to effect the switch is increased as the processor must acquire all of the context information for the process image of the new shared image process.

Lightweight Process Context Switch-a context switch executed under control of a user program that schedules a lightweight process to be executed in another processor and provides only a limited subset of the intra-process context information. In other words, the lightweight process context switch is used when a process has a small amount of work to be done and will return the results of the work to the user program that schedule the lightweight process.

Prior art operating systems for minimally parallel supercomputers (e.g., UNICOS) are not capable of efficiently implementing context switches because the access time for acquiring a shared resource necessary to perform a context switch is not bounded. In other words, most prior art supercomputer operating systems do not know how long it will take to make any type of context switch. As a result, the operating system must use the most conservative estimate for the access time to acquire a shared resource in determining whether to schedule a process to be executed. This necessarily implies a penalty for the creation and execution of multithreaded programs on such systems because the operating system does not efficiently schedule the multithreaded programs. Consequently, in prior art supercomputer operating systems a multithreaded program may not execute significantly faster than its single-threaded counter part and may actually execute slower.

Other models for operating systems that support multithreaded programs are also not effective at minimizing the different types of context switching overheads that can occur in fully optimized multithreaded programs. For example, most mini-supercomputers create an environment that efficiently supports intra-process context switching by having a multiprocessor system wherein the processors operate at slower speeds so that the memory access times are the same order of magnitude as the register access times. In this environment, an intra-process context switch among processes in a process group that shares the same process image incurs very little context switch overhead. Unfortunately, because the speed of the processors is limited to the speed of the memory accesses, the system incurs a significant context switch overhead in processing inter-process context switches. On the other hand, one of the more popular operating systems that provides an efficient model for inter-process context switches is not capable of performing intra-process context switches. In a virtual machine environment where process groups are divided among segments in a virtual memory, inter-process context switches can be efficiently managed by the use of appropriate paging, look-ahead and caching schemes. However, the lack of a real memory environment prevents the effective scheduling of intra-process context switches because of the long delays in updating virtual memory and the problems in managing cache coherency.

One example of an operating system that schedules multithreaded programs is Mach, a small single-threaded monitor available from Carnegie Mellon University. Mach is attached to a System V-type operating system and operates in a virtual memory environment. The Mach executive routine attempts to schedule multithreaded programs; however, the Mach executive routine itself is not multithreaded. Mach is a centralized executive routine that operates on a standard centralized, single-threaded operating system. As such, a potential bottleneck in the operating system is created by relying on this single-threaded executive to schedule the multithreaded programs. Regardless of how small and efficient the Mach executive is made, it still can only schedule multithreaded programs sequentially.

Another example of a present operating system that attempts to support multithreading is the Amoeba Development, available from Amersterdam University. The Amoeba Development is a message passingbased operating system for use in a distributed network environment. Generally, a distributed computer network consists of computers that pass messages among each other and do not share memory. Because the typical user application program (written in Fortran, for example) requires a processing model that includes a shared memory, the program cannot be executed in parallel without significant modification on computer processing systems that do not share memory.

The Network Livermore Time Sharing System (NLTSS) developed at the Lawrence Livermore National Laboratory is an example of a message passing, multithreaded operating system. NLTSS supports a distributed computer network that has a shared memory multiprocessor system as one of the computers on the network. Multiprocessing that was done on the shared memory multiprocessor system in the distributed network was modified to take advantage of the shared memory on that system. Again, however, the actual scheduling of the multithreaded programs on the shared memory multiprocessor system was accomplished using a single-threaded monitor similar to the Mach executive that relies on a critical region of code for scheduling multiple processes.

The Dynix operating system for the Sequent Balance 21000 available from Sequent Computer Systems, Inc. is a multithreaded operating system that uses bus access to common memory, rather than arbitration access. Similarly, the Amdahl System V-based UTS operating system available from Amdahl Computers is also multithreaded; however, UTS uses a full cross bar switch and a hierarchical cache to access common memory. Although both of these operating system are multithreaded in that each has multiple entry points, in fact, both operation systems use a critical region, like the single-threaded monitor of Mach, to perform the scheduler allocation. Because of the lack of an effective lock mechanism, even these supposedly multithreaded operating systems must perform scheduling as a locked activity in a critical region of code.

The issue of creating an efficient environment for multiprocessing of all types of processes in a multiprocessor system relates directly to the communication time among processors. If the time to communicate is a significant fraction of the time it takes to execute a thread, then multiprocessing of the threads is less beneficial in the sense that the time saved in executing the program in parallel on multiple processors is lost due to the communication time between processors. For example, if it takes ten seconds to execute a multithreaded program on ten processors and only fifteen seconds to execute a single-threaded version of the same program on one processor, then it is more efficient to use the multiprocessor system to execute ten separate, single-threaded programs on the ten processors than to execute a single, multithreaded program.

The issue of communication time among processors in a given multiprocessor system will depend upon a number of factors. First, the physical distance between processors directly relates to the time it takes for the processors to communicate. Second, the architecture of the multiprocessor system will dictate how some types of processor communication are performed. Third, the types of resource allocation mechanisms available in the multiprocessor (e.g., semaphore operators) determines to a great degree how processor communication will take place. Finally, the type of processor communication (i.e., inter-process context switch, intra-process context switch or lightweight process) usually determines the amount of context information that must be stored, and, hence, the time required for processor communication. When all of these factors are properly understood, it will be appreciated that, for a multiprocessor system consisting of high performance computers, the speed of the processors requires that lightweight context switches have small communication times in order to efficiently multiprocess these lightweight processes. Thus, for high performance multiprocessors, only a tightly-coupled multiprocessor system having a common shared memory are able to perform efficient multiprocessing of small granularity threads.

Another consideration in successfully implementing multiprocessing, and in particular lightweight processing, relates to the level of multithreading that is performed for a program. To minimize the amount of customization necessary for a program to efficiently execute in parallel, the level of multithreading that is performed automatically is a serious consideration for multiprocessor systems where the processors can be individually scheduled to individual processes.

Still another problem in the prior art is that some present operating systems generally schedule multiple processes by requesting a fixed number N of processors to work on a process group. This works well if the number N is less than the number of processors available for work; however, this limitation complicates the scheduling of processes if two or more process group are simultaneously requesting multiple processors. For example, in the Alliant operating system, the operating system will not begin execution of any of the processes for a shared image process group until all N of the requested processor are available to the process group.

An additional problem in present multiprocessor operating systems is the lack of an efficient synchronization mechanism to allow processors to perform work during synchronization. Most prior art synchronization mechanisms require that a processor wait until synchronization is complete before continuing execution. As a result, the time spent waiting for the synchronization to occur is lost time for the processor.

In an effort to increase the processing speed and flexibilty of supercomputers, the cluster architecture for highly parallel multiprocessors described in the previously identified parent application provides an architecture for supercomputers wherein multiple processors and external interfaces can make multiple and simultaneous requests to a common set of shared hardware resources, such as main memory, global registers and interrupt mechanisms. Although this new cluster architecture offers a number of solutions that can increase the parallelism of supercomputers, these solutions will not be utilized by the vast majority of users of such systems without software that implements parallelism by default in the user environment and provides an operating system that is fully capable of supporting such a user environment. Accordingly, it is desirable to have a software architecture for a highly parallel multiprocessor system that can take advantage of the parallelism in such a system.

SUMMARY OF THE INVENTION

The present invention is an integrated software architecture that efficiently controls the interface with and execution of programs on a highly parallel multiprocessor system having multiple tightly-coupled processors that share a common memory. The software architecture of the present invention combines a symmetrically integrated multithreaded operating system and an integrated parallel user environment. The operating system distributively implements an anarchy-based scheduling model for the scheduling of processes and resources by allowing each processor to access a single image of the operating system stored in the common memory that operates on a common set of operating system shared resources. The user environment provides a common visual representation for a plurality of program development tools that provide compilation, execution and debugging capabilities for parallel user application programs and assumes parallelism as the standard mode of operation.

The major problem with the present software associated with multiprocessor systems is that the prior art for high performance multiprocessor systems is still relatively young. As a result, the software problems associated with such systems have been only partially solved, either as an after-thought or in a piece-meal, ad hoc manner. This is especially true for the problems associated with parallel execution of software programs. The present invention approaches the problem of software for multiprocessor systems in a new and fully integrated manner. The parallel execution of software programs in a multiprocessor system is the primary objective of the software architecture of the present invention.

In order to successfully implement parallelism by default in a multiprocessor system it is desirable to maximize the processing speed and flexibility without the need for user intervention of the multiprocessor system. As a result, a balance must be maintained among the speed of the processors, the bandwidth of the memory interface and the input/output interface. If the speed or bandwidth of any one of these components is significantly slower than the other components, some portion of the computer processing system will starve for work and another portion of the computer processing system will be backlogged with work. If this is the case, there can be no allocation of resources by default because the user must take control of the assignment of resources to threads in order to optimize the performance of a particular thread on a particular system. The software architecture of the present invention integrates a symmetrical, multithreaded operating system and a parallel user environment that are matched with the design of the highly parallel multiprocessor system of the preferred embodiment to achieve the desired balance that optimizes performance and flexibility.

The integrated software architecture of the present invention decreases overhead of context switches among a plurality of processes that comprise the multithreaded programs being executed on the multiprocessor system. Unlike prior supercomputer operating systems, user application programs are not penalized for being multithreaded. The present invention also decreases the need for the user application programs to be rewritten or customized to execute in parallel on the particular multiprocessor system. As a result, parallelism by default is implemented in the highly parallel multiprocessor system of the preferred embodiment.

The present invention is capable of decreasing the context switch overhead for all types of context switches because of a highly bounded switching paradigm of the present invention. The ability to decrease context switching in a supercomputer is much more difficult than for a lower performance multiprocessor system because, unlike context switching that takes place in non-supercomputers, the highly parallel multiprocessor of the present invention has hundreds of registers and data locations that must be saved to truly save the "context" of a process within a processor. To accommodate the large amount of information that must be saved and still decrease the context switch overhead, the operating system operates with a caller saves paradigm where each routine saves its context on a activation record stack like an audit trail. Thus, to restore the entire context for a process, the operating system need only save the context of the last routine and then unwind the activation record stack. The caller saves paradigm represents a philosophy implemented throughout the multiprocessor system of never being in a situation where it is necessary to save all of those hundreds of registers for a context switch because the operating system did not know what was going on in the processor at the time that a context switch was required.

In addition to decreasing the overhead of context switches, the preferred embodiment of the present invention increases the efficiency of all types of context switches by solving many of the scheduling problems associated with scheduling multiple processes in multiple processors. The present invention implements a distributed, anarchy-based scheduling model and improves the user-side scheduling to takes advantage of an innovation of the present invention referred to as microprocesses (mprocs). Also new to the preferred embodiment is the concept of a User-Side Scheduler (USS) that can both place work in the request queues in the OSSR and look for work to be done in the same request queues. The order of the work to be done in the request queue is determined by a prioritization of processes.

The User-Side Scheduler (USS) is a resident piece of object code within each multithreaded program. Its purpose is manyfold: 1) request shared image processes from the operating system and schedule them to waiting threads inside the multithreaded program, 2) detach shared image processes from threads that block on synchronization, 3) reassign these shared image processes to waiting threads, 4) provide deadlock detection, 5) provide a means to maximize efficiency of thread execution via its scheduling algorithm, and 6) return processors to the operating system when they are no longer needed.

The present invention improves the user-side scheduler to address these issues. The USS requests a processor by incrementing a shared resource representing a request queue using an atomic resource allocation mechanism. Processors in the operating system detect this request by scanning the request queues in the shared resources across the multiprocessor system. When a request is detected that the processor can fulfill, it does so and concurrently decrements the request count using the same atomic resource allocation mechanism. The USS also uses this request count when reassigning a processor. The request count is checked and decremented by the USS. This check and decrement by the processors in the operating system and the USS are done atomically. This allows a request for a processor to be retracted, thereby reducing the unnecessary scheduling of processors.

The improvement to the USS is particularly useful with the scheduling of microprocesses (mprocs). Microprocesses are a type of lightweight process that have a very low context of a microprocess of the present invention switch overhead because the context is discardable upon exit. In other words, microprocesses are created as a means for dividing up the work to be done into very small segments that receive only enough context information to do the work required and return only the result of the work with no other context information. In this sense, the mprocs can be thought of as very tiny disposable tools or building blocks that can be put together in any fashion to build whatever size and shape of problem-solving space is required.

Another important advantage of the mprocs of the present invention is that, while they are disposable, they are also reusable before being disposed. In other words, if the USS requests a processor to be set up to use a mproc to perform a first small segment of work, the USS (and for that matter, any other requestor in the system via the operating system) can use that same mproc to perform other small segment of work until such time as the processor with the mproc destroys the mproc because it is scheduled or interrupted to execute another process.

Another way in which the scheduling of the operating system of the present invention is improved is that the operating system considers shared image process groups when scheduling processes to processors. For example, if a process is executing, its process image is in shared memory. The operating system may choose to preferentially schedule other processes from the same group to make better use of the process image. In this sense, any process from a process group may be executed without requiring that all of the processes for a process group be executed. Because of the way in which the anarchy-based scheduling model uses the request queues and the atomic resource allocation mechanism, and the way in which the operating system considers shared image process groups, the present invention does not suffer from a lockout condition in the event that more than one shared image process group is requesting more than the available number of processors.

The supercomputer symmetrically integrated, multithreaded operating system (SSI/mOS) controls the operation and execution of one or more user application programs and software development tools and is capable of supporting one or more shared image process groups that comprise such multithreaded programs. SSI/mOS is comprised of a multithreaded operating system kernel for processing multithreaded system services, and an input/output section for processing distributed, multithreaded input/output services.

The operating system of this invention differs from present operating systems in the way in which interrupts and system routines are handled. In addition to the procedure (proc) code within the kernel of the operating system, the kernel also includes code for multithreaded parallel interrupt procedures (iprocs) and multithreaded parallel system procedures (kprocs). In the present invention, interrupts (signals) are scheduled to be handled by the iproc through a level 0 interrupt handler, rather than being immediately handled by the processor. This allows idle or lower priority processors to handle an interrupt for a higher priority processor. Unlike prior art operating systems, the kprocs in the present invention are not only multithreaded in that multiple processors may execute the system procedures at the same time, but the kprocs are themselves capable of parallel and asynchronous execution. In this sense, kprocs are treated just as any other type of procedure and can also take advantage of the parallel scheduling innovations of the present invention.

The operating system kernel includes a parallel process scheduler, a parallel memory scheduler and a multiprocessor operating support module. The parallel process scheduler schedules multiple processes into multiple processors. Swapping prioritization is determined by first swapping the idle processors and then the most inefficient processors as determined by the accounting support. The parallel memory scheduler allocates shared memory among one or more shared image process groups and implements two new concepts, partial swapping of just one of the four memory segments for a processor, and partial swapping within a single segment. The parallel memory scheduler also takes advantage of the extremely high swap bandwidth of the preferred multiprocessor system that is a result of the distributed input/output architecture of the system which allows for the processing of distributed, multithreaded input/output services, even to the same memory segment for a processor. The multiprocessor operating support module provides accounting, control, monitoring, security, administrative and operator information about the processors.

The input/output software section includes a file manager, an input/output manager, a resource scheduler and a network support system. The file manager manages directories and files containing both data and instructions for the programs. The input/output manager distributively processes input/output requests to peripheral devices attached to the multiprocessor system. The resource scheduler schedules processors and allocates input/output resources to those processors to optimize the usage of the multiprocessor system. The network support system supports input/output requests to other processors that may be interconnected with the multiprocessor system.

The program development tools of the integrated parallel user environment includes a program manager, a compiler, a user interface, and a distributed debugger. The program manager controls the development environment for source code files representing a software program. The compiler is responsible for compiling the source code file to create an object code file comprised of multiple threads capable of parallel execution. An executable code file is then derived from the object code file. The user interface presents a common visual representation of the status, control and execution options available for monitoring and controlling the execution of the executable code file on the multiprocessor system. The distributed debugger provides debugging information and control in response to execution of the executable code file on the multiprocessor system.

The compiler includes one or more front ends, a pair of optimizers and a code generator. The front ends parse the source code files and generate an intermediate language representation of the source code file referred to as HiForm (HF). The optimizer includes means for performing machine-independent restructuring of the HF intermediate language representation and means for producing a LoForm (LF) intermediate language representation that may be optimized on a machine-dependent basis by the code generator. The code generator creates an object code file based upon the LF intermediate language representation, and includes means for performing machine dependent restructuring of the LF intermediate language representation. An assembler for generating object code from an assembly source code program may also automatically perform some optimization of the assembly language program. The assembler generates LoForm which is translated by the code generator into object code (machine instructions). The assembler may also generate HF for an assembly language program that provides information so that the compiler can optimize the assembly language programs by restructuring the LF. The HF generated assembly language code can also be useful in debugging assembly source code because of the integration between the HF representation of a program and the distributed debugger of the present invention.

The user interface provides means for linking, executing and monitoring the program. The means for linking the object code version combines the user application program into an executable code file that can be executed as one or more processes in the multiprocessor system. The means for executing the multithreaded programs executes the processes in the multiprocessor system. Finally, the means for monitoring and tuning the performance of the multithreaded programs includes means for providing the status, control and execution options available for the user. In the preferred embodiment of the user interface, the user is visually presented with a set of icon-represented functions for all of the information and options available to the user. In addition, an equivalent set of commandline functions is also available for the user.

The distributed debugger is capable of debugging optimized parallel object code for the preferred multiprocessor system. It can also debug distributed programs across an entire computer network, including the multiprocessor system and one or more remote systems networked together with the multiprocessor system. It will be recognized that the optimized parallel object code produce by the compiler will be substantially different than the non-optimized single processor code that a user would normally expect as a result of the compilation of his or her source code. In order to accomplish debugging in this type of environment, the distributed debugger maps the source code file to the optimized parallel object code file of the software program, and vice versa.

The primary mechanism for integrating the multithreaded operating system and the parallel user environment is a set of data structures referred to as the Operating System Shared Resources (OSSR) which are defined in relation to the various hardware shared resources, particularly the common shared main memory and the global registers. The OSSRs are used primarily by the operating system, with a limited subset of the OSSRs available to the user environment. Unlike prior art operating systems for multiprocessors, the OSSRs are accessible by both the processors and external interface ports to allow for a distributed input/output architecture in the preferred multiprocessor system. A number of resource allocation primitives are supported by the hardware shared resources of the preferred embodiment and are utilized in managing the OSSRs, including an atomic resource allocation mechanism that operates on the global registers.

An integral component of the parallel user environment is the intermediate language representation of the source code version of the application or development software program referred to as HiForm (HF). The representation of the software programs in HF allows the four components of the parallel user environment, the program management module, the compiler, the user interface and the distributed debugger to access a single common representation of the software program, regardless of the programming langauge in which the source code for the software program is written.

As part of the compiler, an improved and integrated Inter-Procedural Analysis (IPA) is used by the parallel user environment to enhance the value and utilization of the HF representation of a software program. The IPA analyzes the various relationships and dependencies among the procedures in the HF representation of a multithreaded program to be executed using the present invention.

It is an objective of the present invention to provide a software architecture for implementing parallelism by default in a highly parallel multiprocessor system having multiple, tightly-coupled processors that share a common memory.

It is another objective of the present invention to provide a software architecture that is fully integrated across both a symmetrically integrated, multithreaded operating system capable of multiprocessing support and a parallel user environment having a visual user interface.

It is a further objective of the present invention to provide an operating system that distributively implements an anarchy-based scheduling model for the scheduling of processes and resources by allowing each processor to access a single image of the operating system stored in the common memory that operates on a common set of operating system shared resources.

It is a still further objective of the present invention to provide a software architecture with a parallel user environment that offers a common representation of the status, control and execution options available for user application programs and software development tools, including a visual user interface having a set of icon-represented functions and an equivalent set of command-line functions.

These and other objectives of the present invention will become apparent with reference to the drawings, the detailed description of the preferred embodiment and the appended claims.

DESCRIPTION OF THE DRAWINGS

FIG. 3 is a representation of the relative amount of context switch information required to perform a context switch in a multiprocessor system.

FIGS. 9a and 9b are a block diagram showing the main components of the operating system kernel of the present invention.

FIGS. 10a and 10b are a schematic flow chart showing the processing of context switches by the interrupt handler of the present invention.

FIG. 11 is a simplified schematic diagram showing how background processing continues during an interrupt.

FIG. 23-0 illustrates the arrangement of FIGS. 23a and 23b.

FIG. 23 is a composite drawing of FIGS. 23a and 23b.

FIG. 25b-0 illustrates the arrangement of FIGS. 25b-1, 25b-2, 25b-3, and 25b-4.

FIG. 25b is a composite drawing of FIGS. 25b-1, 25b-2, 25b-3, and 25b-4.

FIGS. 25b-1, 25b-2, 25b-3 and 25b-4 are a pictorial representation of a common user interface to the compiler shown in FIG. 25a.

FIG. 29-0 illustrates the arrangement of FIGS. 29a, 29b, 29c, and 29d.

FIG. 29 is a composite drawing of FIGS. 29a, 29b, 29c, and 29d.

DESCRIPTION OF THE PREFERRED EMBODIMENT

To aid in the understanding of the present invention, a general overview of how the present invention differs from the prior art will be presented. In addition, an analogy is presented to demonstrate why the present invention is a true software architecture for generating and executing multithreaded programs on a highly parallel multiprocessor system, as compared to the loosely organized combination of individual and independent software development tools and operating system software that presently exists in the prior art.

Figure 1A:
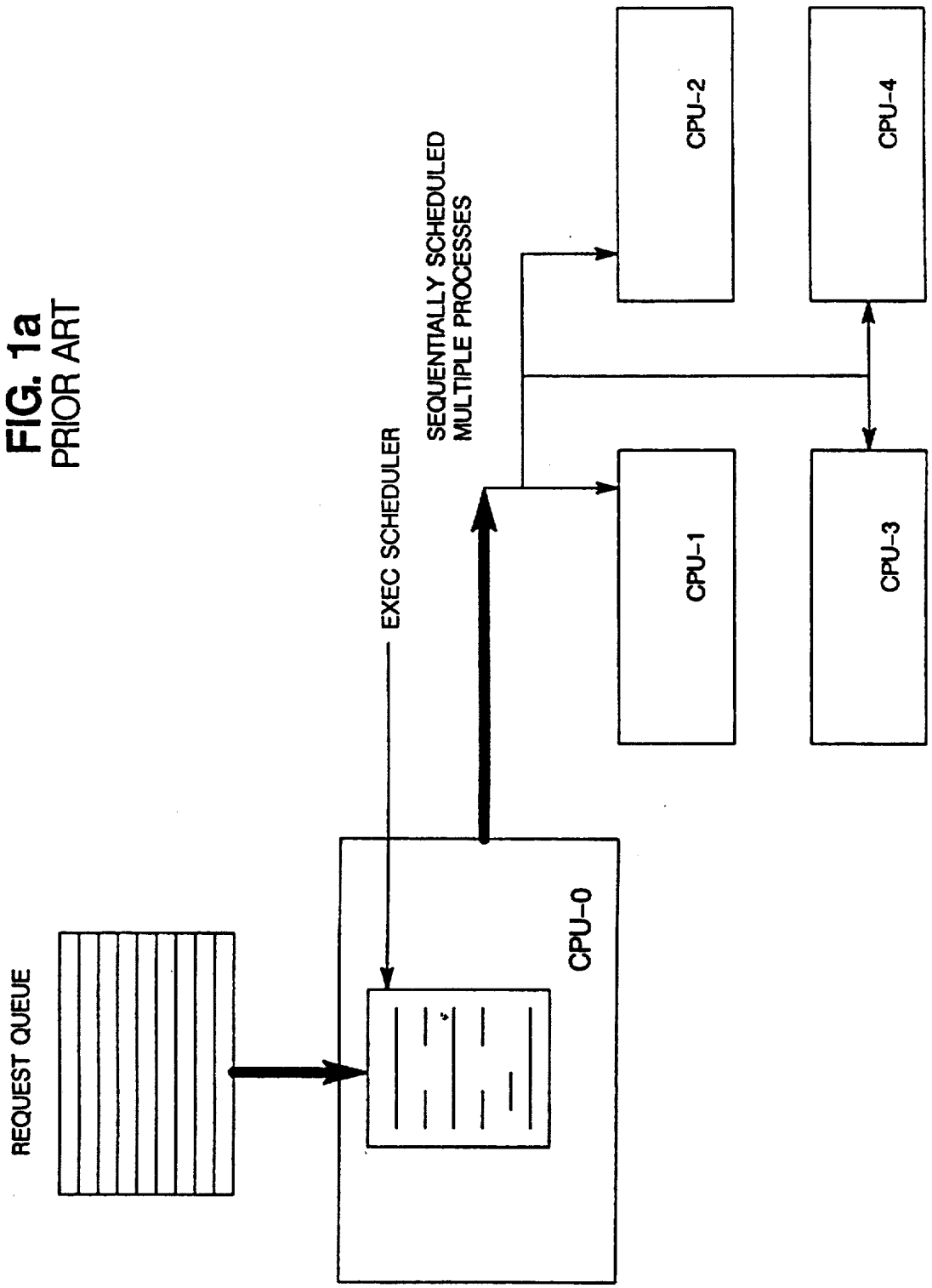
FIGS. 1a and 1b are simplified schematic representations of the prior art attempts at multischeduling and multischeduling in the present invention, respectively.
Figure 1B:
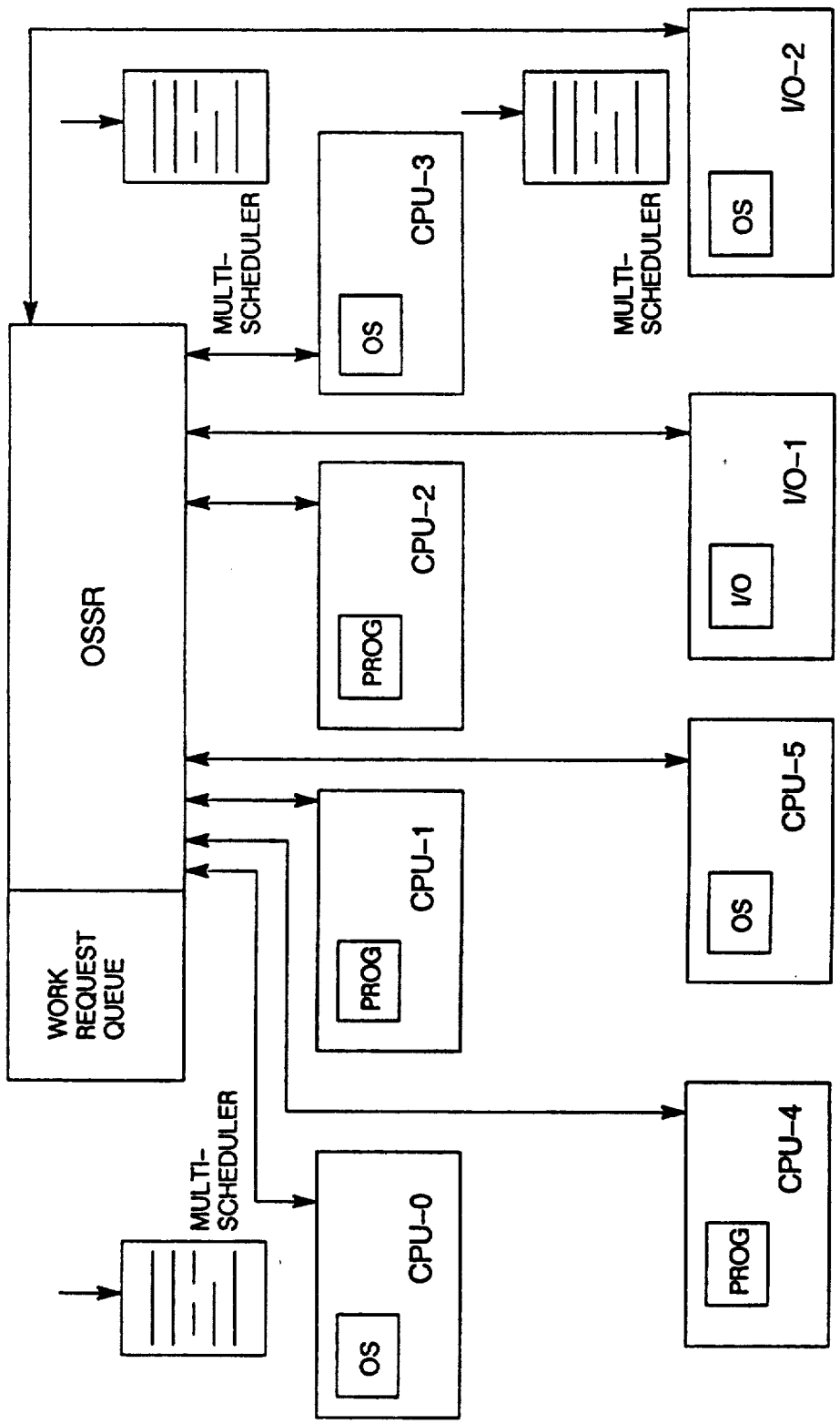

Referring now to FIG. 1a, a schematic representation is shown of how most of the prior art operating systems attempted multischeduling of multiple processes into multiple processors. The requests for multiple processes contained in a Request Queue are accessed sequentially by a single Exec Scheduler executing in CPU-0. As a result, the multiple processes are scheduled for execution in CPU-1, CPU-2, CPU-3 and CPU-4 in a serial fashion. In contrast, as shown in FIG. 1b, the present invention, all of the CPU's (CPU-0, CPU-1, CPU-2, CPU-3, CPU-4 and CPU-5) and all of the I/O controllers (I/O-1 and I/O-2) have access to a common set of data structures in the Operating System Shared Resources (OSSR), including a Work Request Queue. As a result, more than one CPU can simultaneously execute a shared image of the operating system (OS) code to perform operating system functions, including the multithreaded scheduling of processes in the Work Request Queue. Also unlike the prior art, the present invention allow the I/O controllers to have access to the OSSRs so that the I/O controllers can handle input/output operations without requiring intervention from a CPU. This allows I/O-2, for example, to also execute the Multi-Scheduler routines of the Operating System to perform scheduling of input/output servicing.

Figure 2:
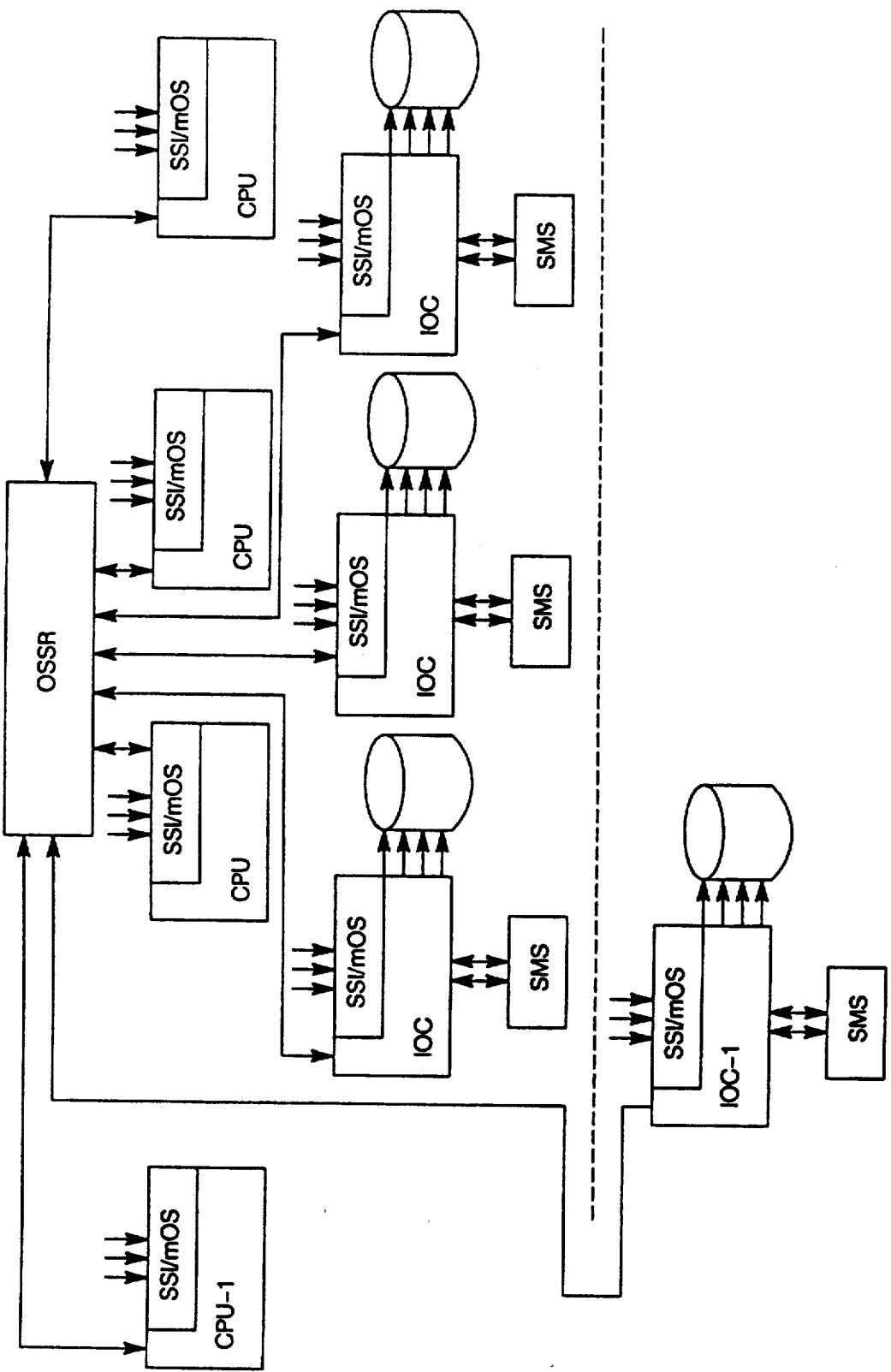
FIG. 2 is a simplified schematic representation showing the multithreaded operating system of the present invention.

Because the operating system of the present invention is both distributed and multithreaded, it allows the multiprocessor system to assume the configuration of resources (i.e., CPU's, I/O controllers and shared resources) that is, on average, the most efficient utilization of those resources. As shown in FIG. 2, the supercomputer, symmetrically integrated, multithreaded operating system (SSI/mOS) can be executed by each of the CPU's and the I/O controllers from a common shared image stored in main memory (not shown) and each of the CPUs and I/O controllers can access the common OSSR's. In the software architecture of the present invention, additional CPU's (e.g., CPU-1) and I/O controllers (e.g., IOC-1) can be added to the multiprocessor system without the need to reconfigure the multiprocessor system. This allows for greater flexibility and extensibility in the control and execution of the multiprocessor system because the software architecture of the present invention uses an anarchy-based scheduling model that lets the CPU's and IOC's individually schedule their own work. If a resource (CPU or IOC) should be unavailable, either because it has a higher priority process that it is executing, or, for example, because an error has been detected on the resource and maintenance of the resource is required, that resource does not affect the remaining operation of the multiprocessor system. It will also be recognized that additional resources may be easily added to the multiprocessor system without requiring changes in the user application programs executing on the system.

Figure 4A:
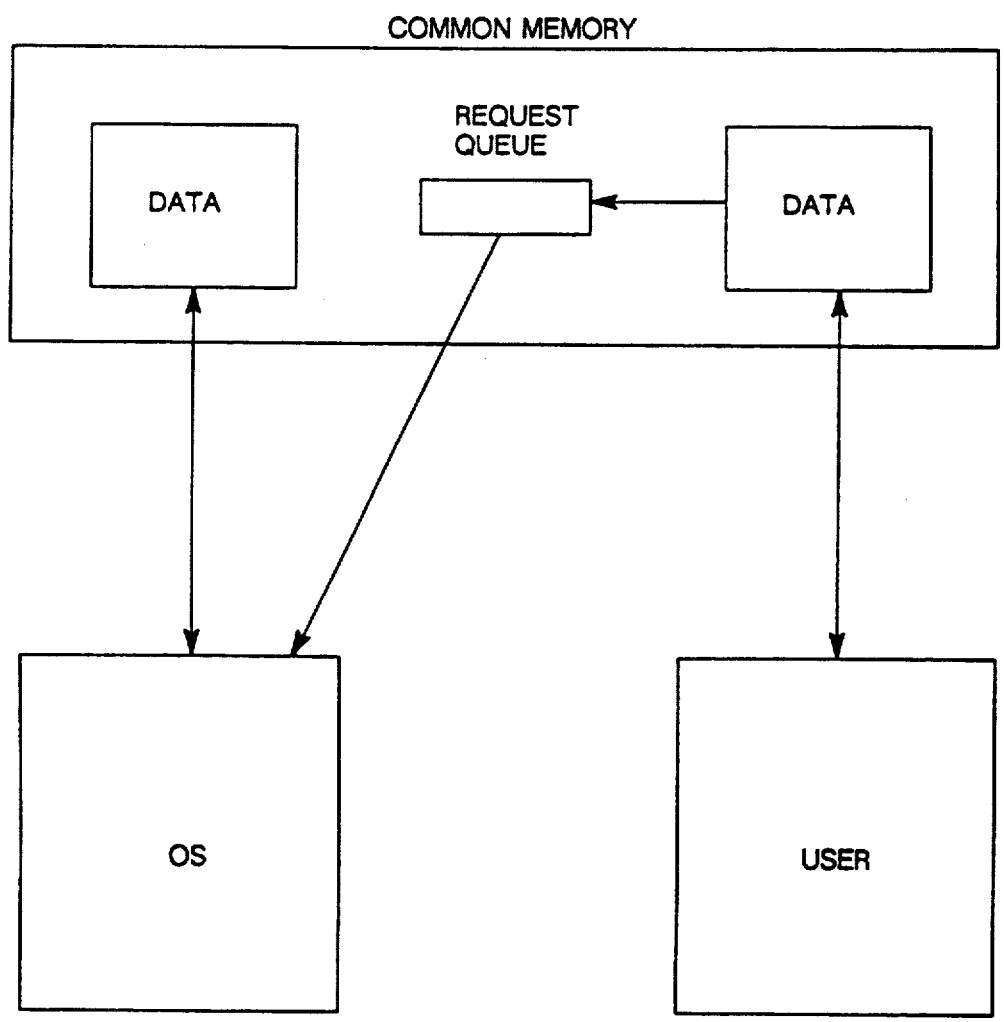
FIGS. 4a and 4b are simplified schematic representations of the prior art lightweight scheduling and microprocess scheduling in the present invention.
Figure 4B:
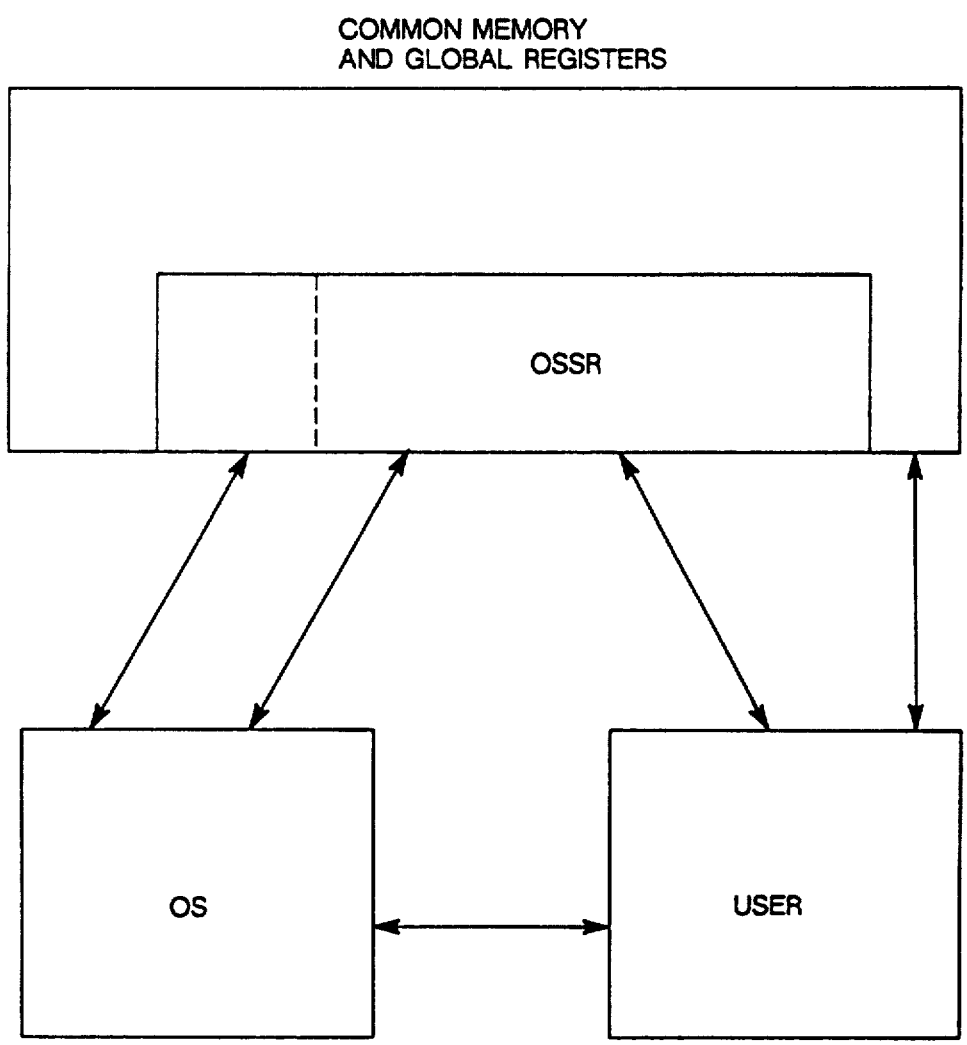
Figure 25A:
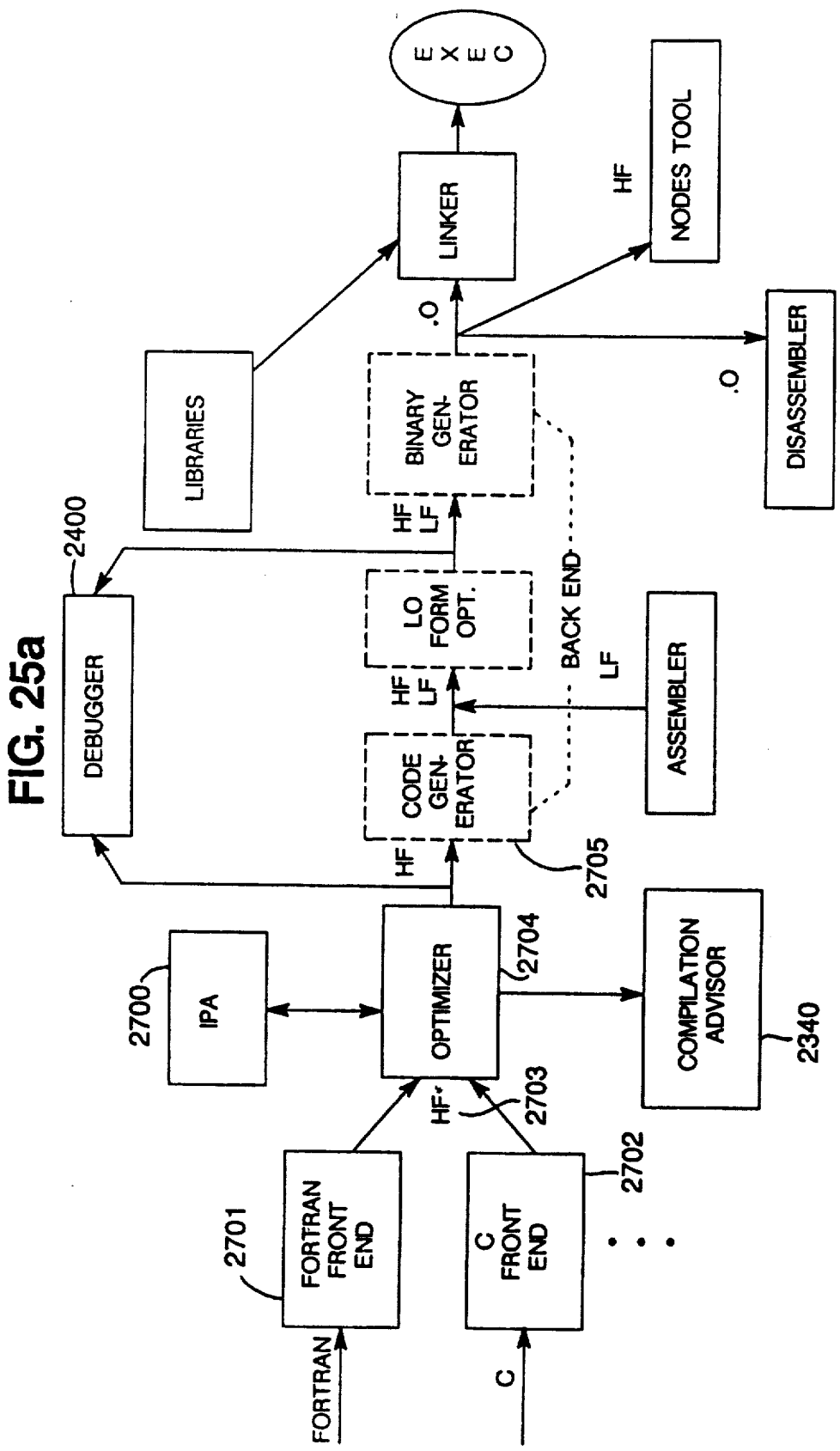
FIG. 25a is a block diagram of the compiler of the present invention.
Figure 25B:
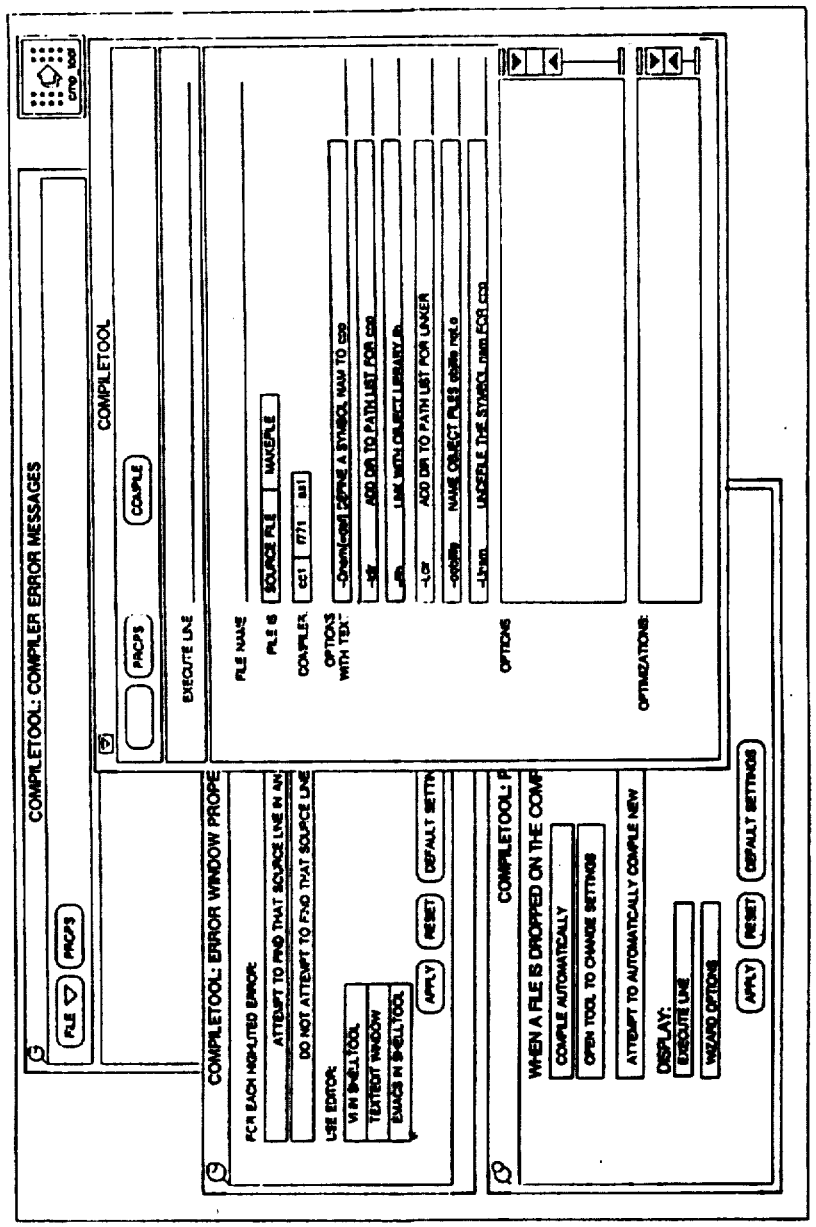
Figures 1, 25B:
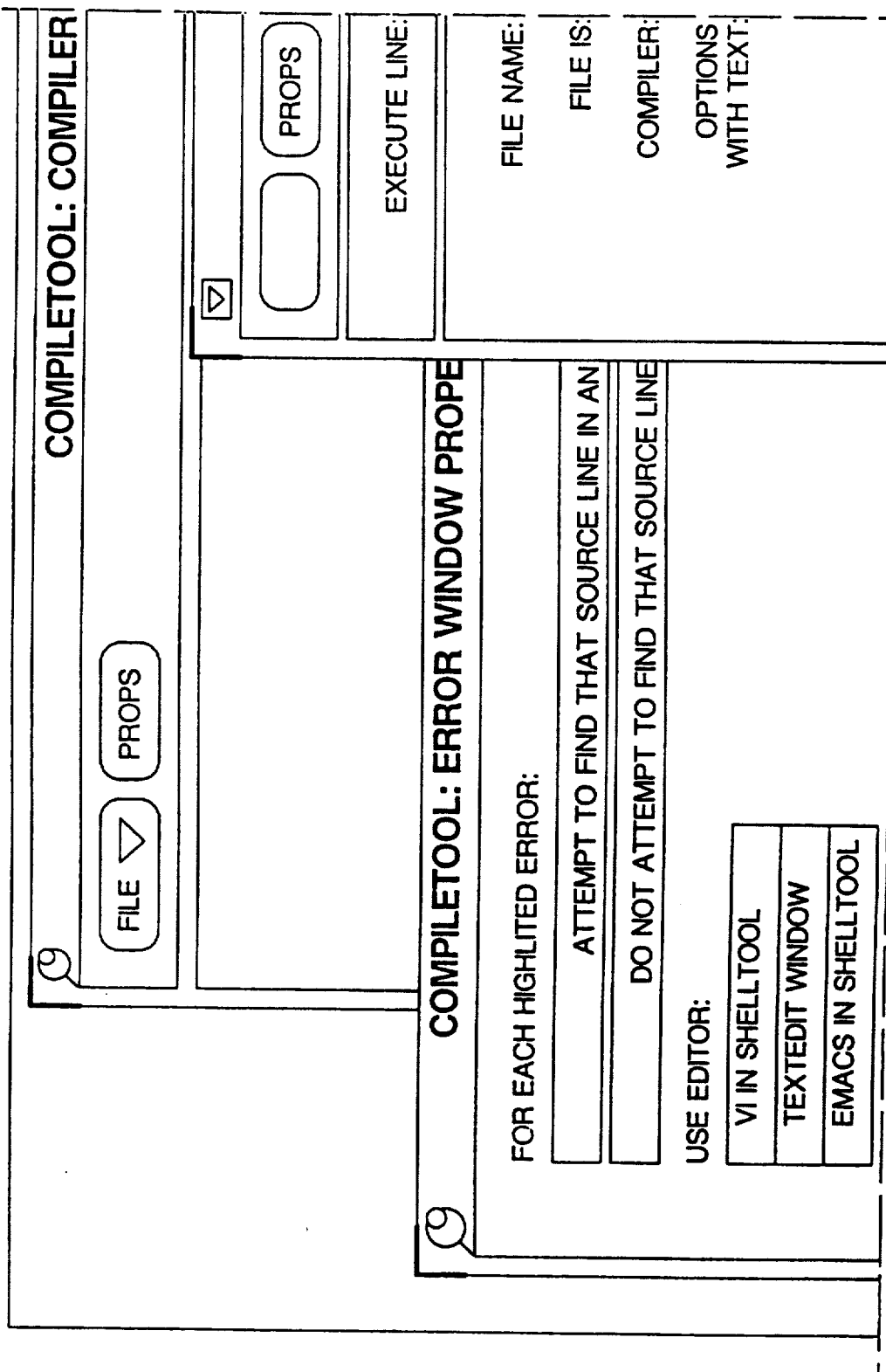
Figures 2, 25B:
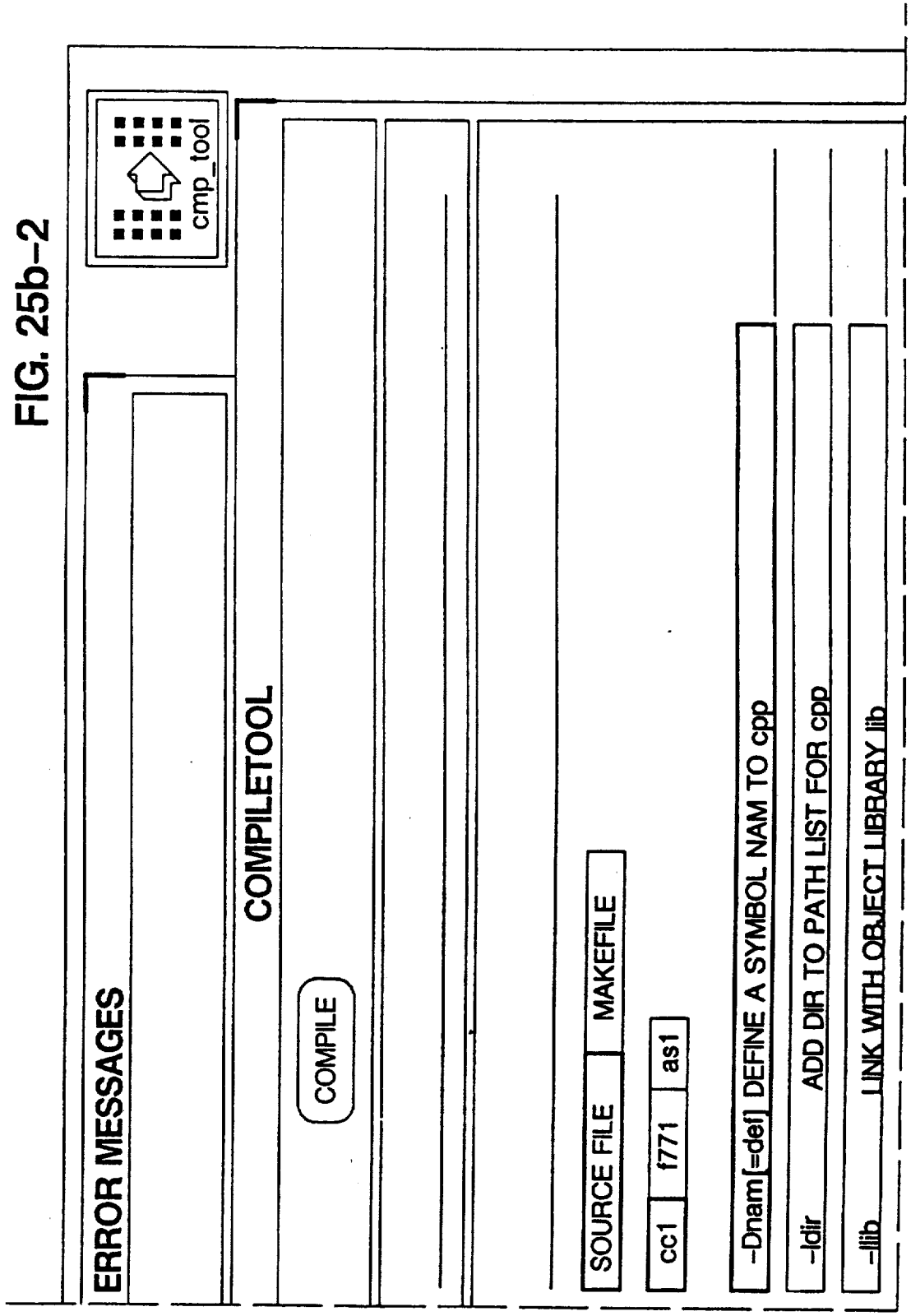
Figures 3, 25B:
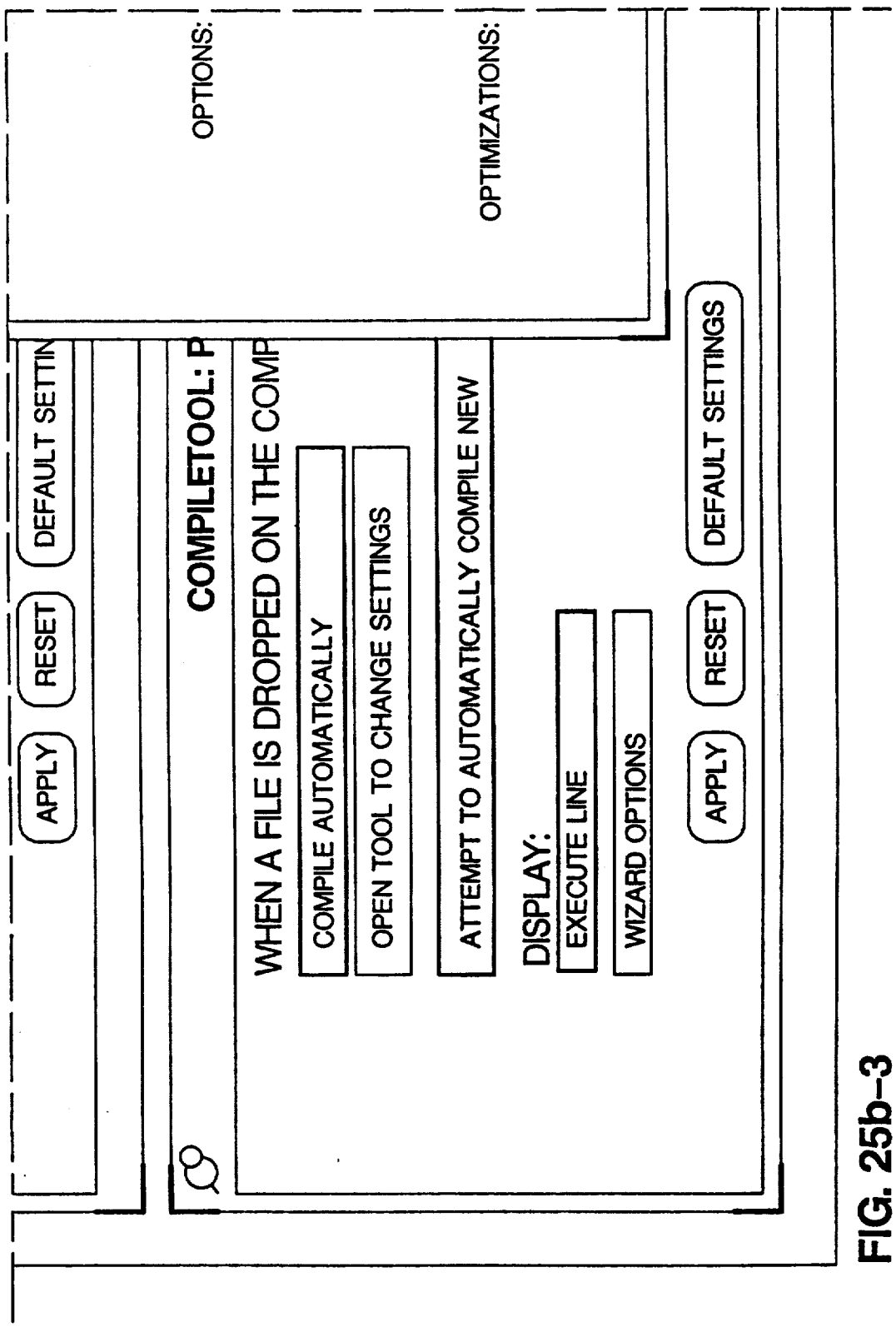
Figures 4, 25B:
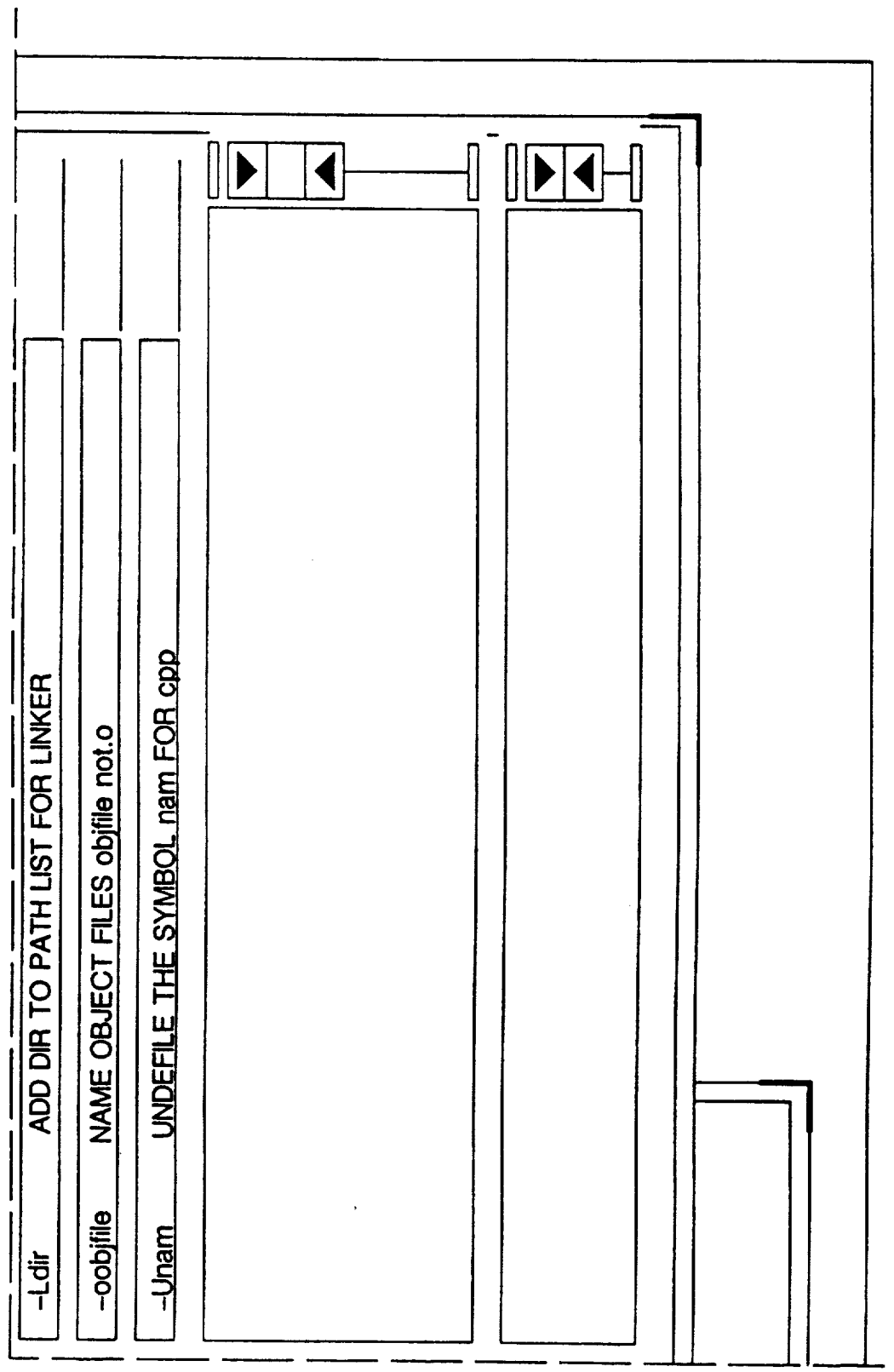

Referring now to FIG. 3, a simplified representation of the relative amounts of context switch information is shown for the three types of context switches: lightweight processes, intra-process group switches and inter-process group switches. Based upon this representation, it is easy to understand that the best way to minimize total context switch overhead is to have the majority of context switches involve lightweight processes. Unfortunately, as shown in FIG. 4a, the prior art scheduling of lightweight processes is a cumbersome one-way technique wherein the user program determines the type of lightweight processes it wants to have scheduled based on its own independent criteria using data structures in the main memory that are unrelated to the other operating system scheduling that may be occurring in the multiprocessor. Because the user-side scheduling of such lightweight processes and the operating system are not integrated, the context switch overhead for lightweight process context switches is increased. In the present invention, shown in FIG. 4b, both the user-side scheduler and the operating system operate on the same set of OSSR's that use both shared common memory and global registers. As a result, there is a two-way communication between the operating system and the user-side scheduler that allows the present invention to decrease the context switch overhead associated with lightweight processes, and in particular, with a new type of lightweight process referred to as a microprocess.

An analogy that may be helpful in understanding the present invention is to visualize the software architecture of the present invention in terms of being a new and integrated approach to constructing buildings. In the prior art, construction of a building is accomplished by three different and independent entities: the customer with the idea for the type of building to be built, the architect who takes that idea and turns it into a series of blueprints and work orders, and the contractor who uses the blueprints and work orders to build the building. By analogy, the user application program is the customer with the idea and requirements for the program to be built, the program development tools such as the compiler are the architect for creating the blueprints and work order for building the program, and the operating system is the contractor using the blueprints and work orders to build (execute) the program.

Presently, the customer, architect and contractor do not have a common language for communicating the ideas of the customer all the way down the work orders to be performed by the construction workers. The customer and the architect talk verbally and may review models and written specifications. The architect produces written blue prints and work orders that must then be translated back into verbal work instructions and examples that are ultimately given to the construction workers. In addition, the communication process is ineffient because of the time delays and lack of an integrated, distributed mechanism for communication among all of the people involved. For example, assume that the foreman who is responsible for scheduling all of the work to be performed on a job site has extra sheet rock workers on a given day because a shipment of sheet rock did not arrive. It is not easy for the foreman to reschedule those sheet rock workers, either within the foreman's own job site or maybe to another job site also being constructed by the same contractor. If the sheet rockers can only do sheet rocking, it is not possible to have them do other work on the job site. To move the workers to another site will take time and money and coordination with the contractor's central office and the foreman at the other job site. The end result is that often it is easier and more "efficient" to just let the workers sit idle at the present job site, than it is to find "other" work for them to do. Similarly, the lack of efficient communication may mean that it could take weeks for a decision by the customer to change part of the building to be communicated to the workers at the construction site.

The present invention is an entirely integrated approach to construction that has been built from the ground up without having to accommodate to any existing structure or requirements. All of the entities in this invention are completely integrated together and are provided with a common communication mechanism that allows for the most efficient communication among everyone and the most efficient utilization of the resources. In this sense, the present invention is as if the customer, architect and contractor all worked together and are all linked together by a single communication network, perhaps a multiprocessor computer system. The customer communicates her ideas for the building by entering them into the network, the architect modifies the ideas and provides both the customer and the contractor with versions of the blue prints and work orders for the building that are interrelated and the each party can understand. The contractors workers do not have a centralized foreman who schedules work. Instead, each worker has access to a single job list for each of the job sites which the contractor is building. When a worker is idle, the worker examines the job list and selects the next job to be done. The job list is then automatically updated so that no other workers will do this job. In addition, if a worker finds out that he or she needs additional help in doing a job, the worker may add jobs to the job list. If there are no more available jobs for a given job site, the worker can immediately call up the job list for another job site to see if there is work to be done there. Unlike the prior situation where the foreman had to first communicate with the central office and then to another job site and finally back to the foreman at the first job site before it was possible to know if there was work at the second site, the present invention allows the worker to have access to the job list at the second site. If the worker feels that there is sufficient work at the second job site to justify traveling back and forth to that job site, then the worker can independently decide to go to the second job site.

As with the integrated communication network and distributed job list in the construction analogy, the present invention provides a similar integrated communication network and distributed job list for controlling the execution of programs on a multiprocessor system. As the architect, the integrated parallel user environment of the present invention provides a common visual representation for a plurality of program development tools that provide compilation, execution and debugging capabilities for multithreaded programs. Instead of relying on the present patch-work of program development tools, some which were developed before the onset of parallelism, the present invention assumes parallelism as the standard mode of operation for all portions of the software architecture. As the contractor, the operating system of the present invention distributively schedules the work to be done using an anarchy-based scheduling model for a common work request queue maintained in the data structures that are part of the OSSR's resident in the shared hardware resources. The anarchy-based scheduling model is extended not only to the operating system (the contractor and foreman), but also to the processes (the workers) in the form of user-side scheduling of microprocesses. Efficient interface to the request queue and other OSSRs by both the processes and the operating system is accomplished by the distributed use of a plurality of atomic resource allocation mechanisms that are implemented in the shared hardware resources. The present invention uses an intermediate language referred to as HiForm (HF) as the common language that is understood by all of the participants in the software architecture. The end result is that the present invention approaches the problem of software for multiprocessor systems in a new and fully integrated manner with the primary objective of the software architecture being the implementation of parallelism by default for the parallel execution of software programs in a multiprocessor system.

Preferred Multiprocessor System

Although it will be understood that the software architecture of the present invention is capable of operating on any number of multiprocessor systems, the preferred embodiment of a multiprocessor cluster system for executing the software architecture of the present invention is briefly presented to provide a common reference for understanding the present invention. For a more detailed description of the preferred embodiment of the multiprocessor cluster system for executing the present invention, reference is made to the previously identified parent application, entitled CLUSTER ARCHITECTURE FOR A HIGHLY PARALLEL SCALAR/VECTOR MULTIPROCESSOR SYSTEM Ser. No. 07/459,083.

Figure 5:
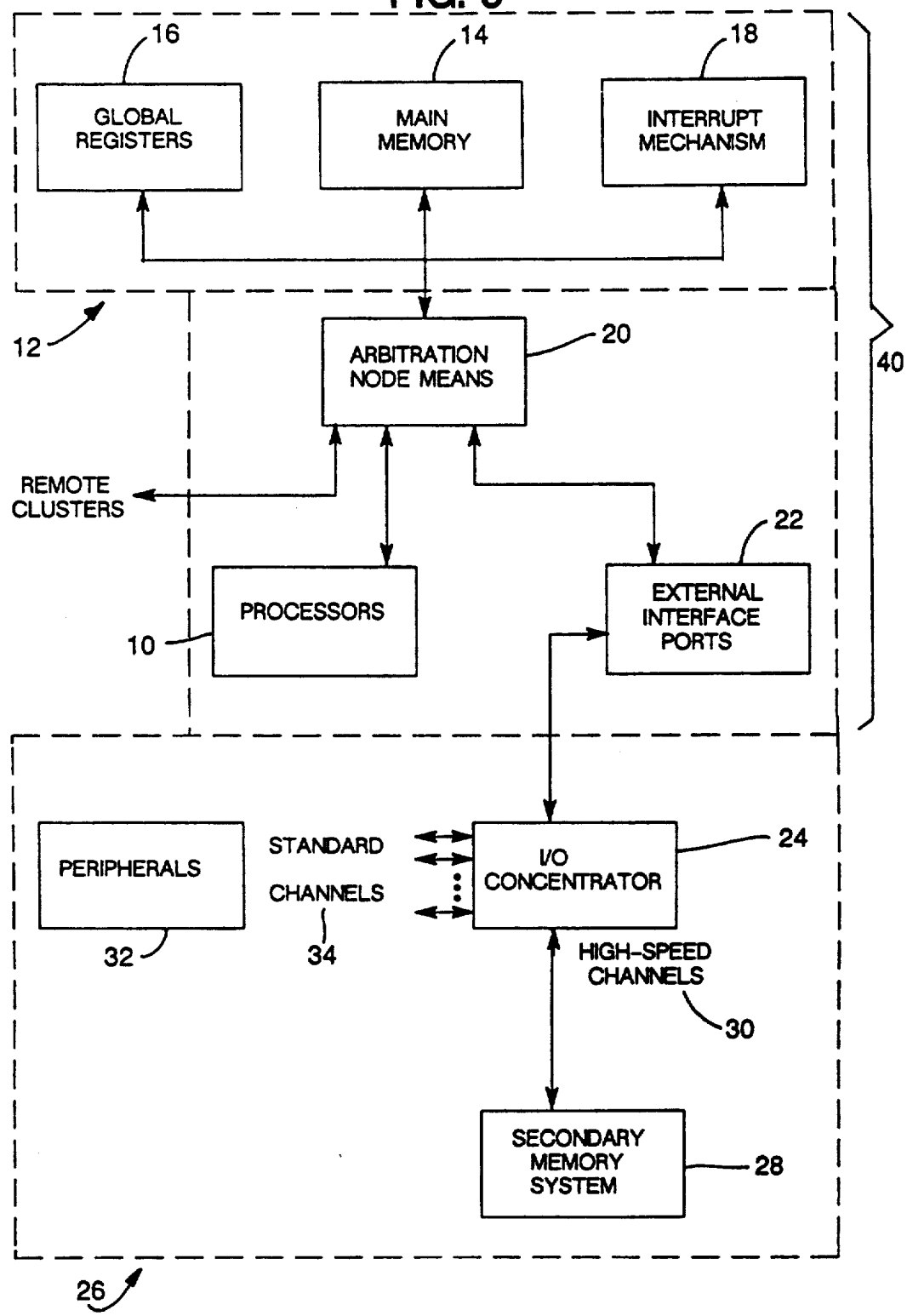
FIG. 5 is a block diagram of the preferred embodiment of a single multiprocessor cluster system for executing the software architecture of the present invention.

Referring now to FIG. 5, a single multiprocessor cluster of the preferred embodiment of the multiprocessor cluster system for executing the present invention is shown having a plurality of high-speed processors 10 sharing a large set of shared resources 12 (e.g., main memory 14, global registers 16, and interrupt mechanisms 18). In this preferred embodiment, the processors 10 are capable of both vector and scalar parallel processing and are connected to the shared resources 12 through an arbitration node means 20. The processors 10 are also connected through the arbitration node means 20 and a plurality of external interface ports 22 and input/output concentrators (IOC) 24 to a variety of external data sources 26. The external data sources 26 may include a secondary memory system (SMS) 28 linked to the input/output concentrator means 24 via one or more high speed channels 30. The external data source 26 may also include a variety of other peripheral devices and interfaces 32 linked to the input/output concentrator via one or more standard channels 34. The peripheral device and interfaces 32 may include disk storage systems, tape storage systems, terminals and workstations, printers, and communication networks.

Figure 6:
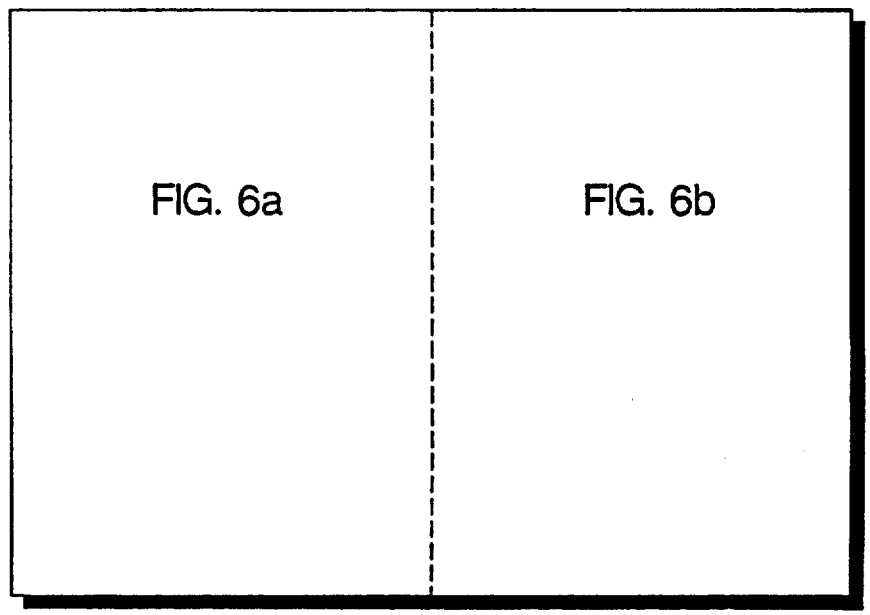
FIG. 6 illustrates the arrangement of FIGS. 6a and 6b.
Figure 6A:
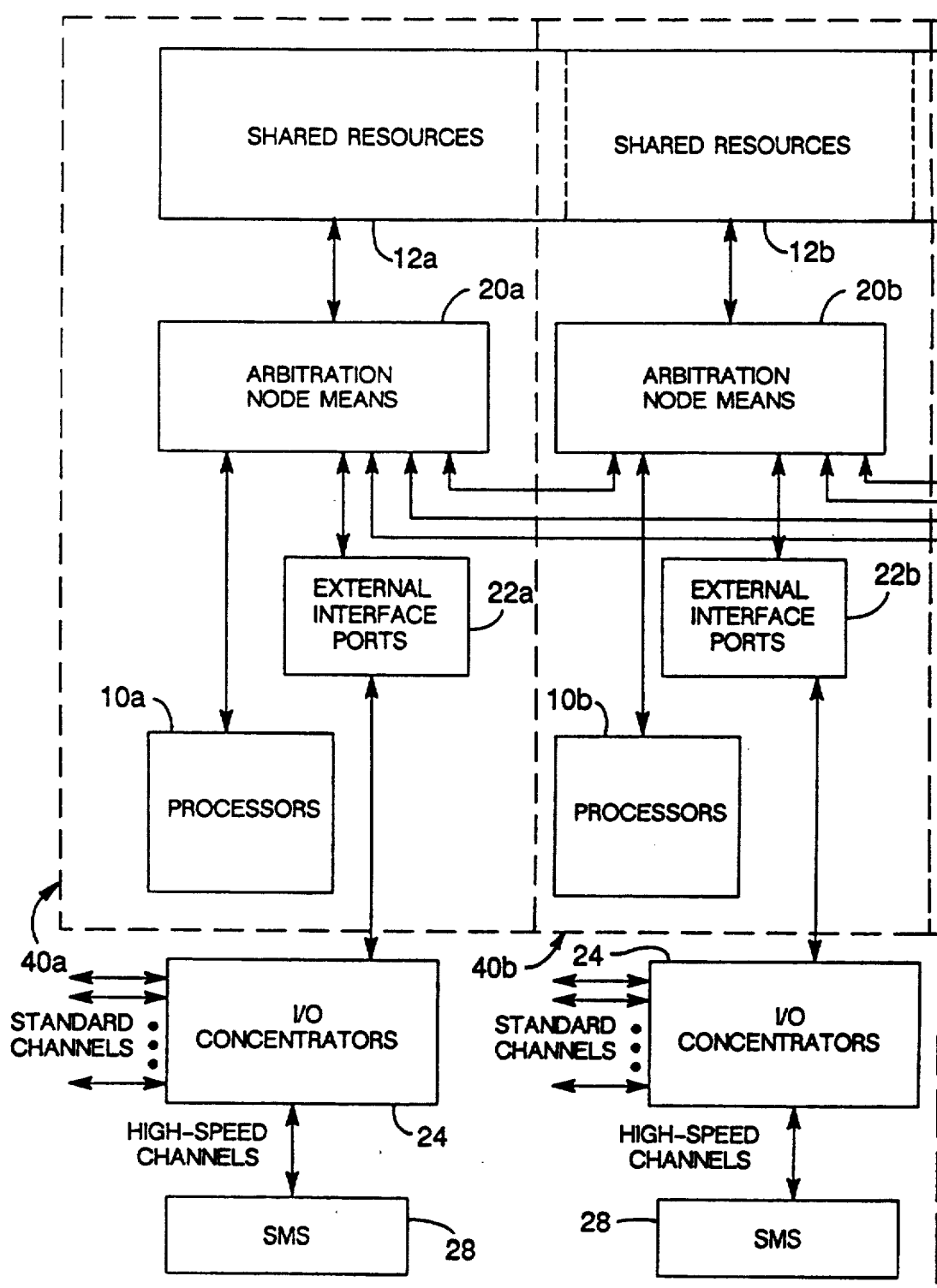
FIGS. 6a and 6b are a block diagram of a four cluster implementation of the multiprocessors cluster system shown in FIG. 5.
Figure 6B:
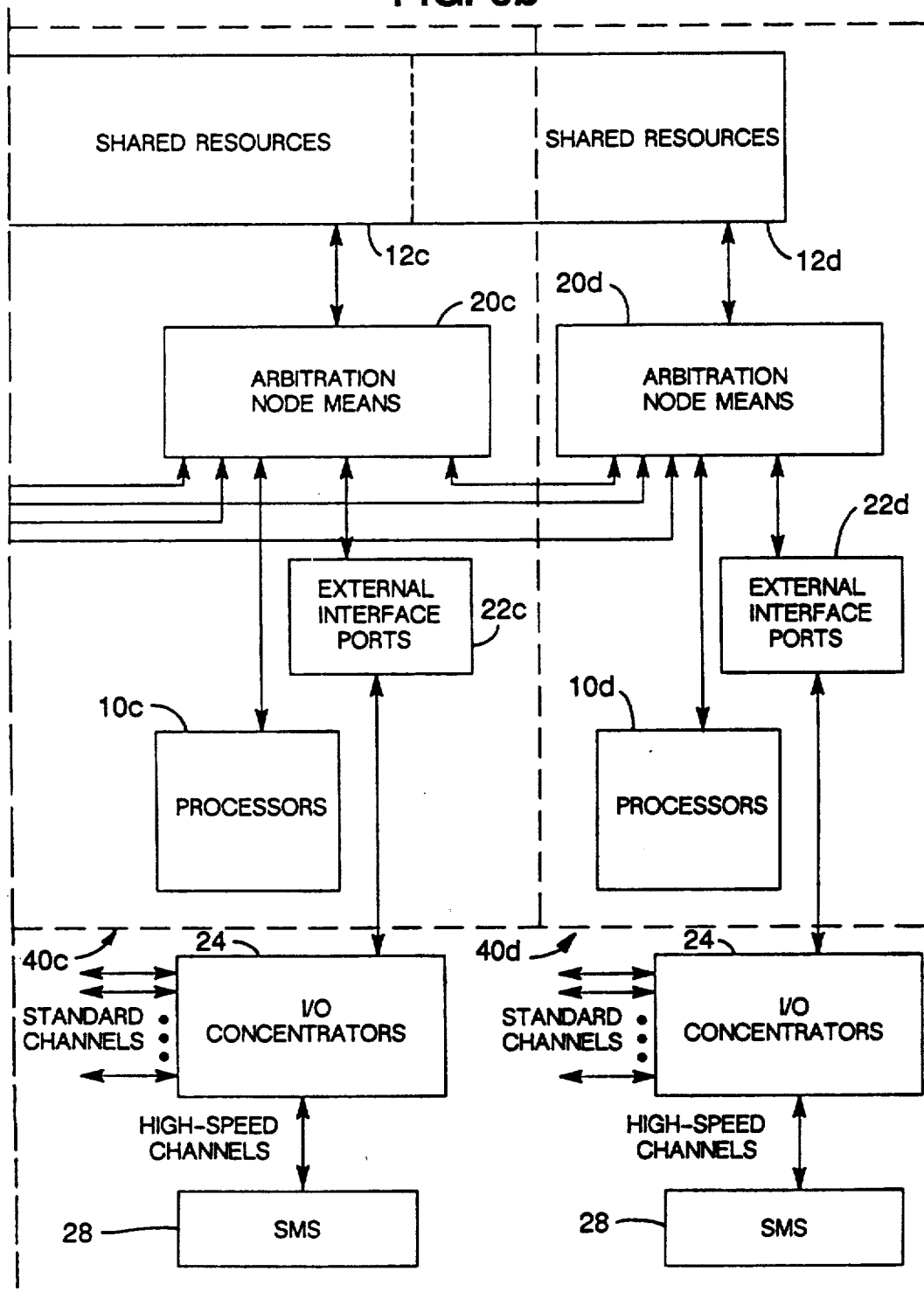

Referring now to FIGS. 6a and 6b, a block diagram of a four cluster version of the multiprocessor system is shown. Each of the clusters 40a, 40b, 40c and 40d physically has its own set of processors 10, shared resources 12, and external interface ports 22 (not shown) that are associated with that cluster. The clusters 40a, 40b, 40c and 40d are interconnected through a remote cluster adapter means (not shown) that is an integral part of each arbitration node means 20 as explained in greater detail in the parent application. Although the cluster 40a, 40b, 40c and 40d are physically separated, the logical organization of the clusters and the physical interconnection through the remote cluster adapter means enables the desired symmetrical access to all of the shared resources 12.

Figure 7:
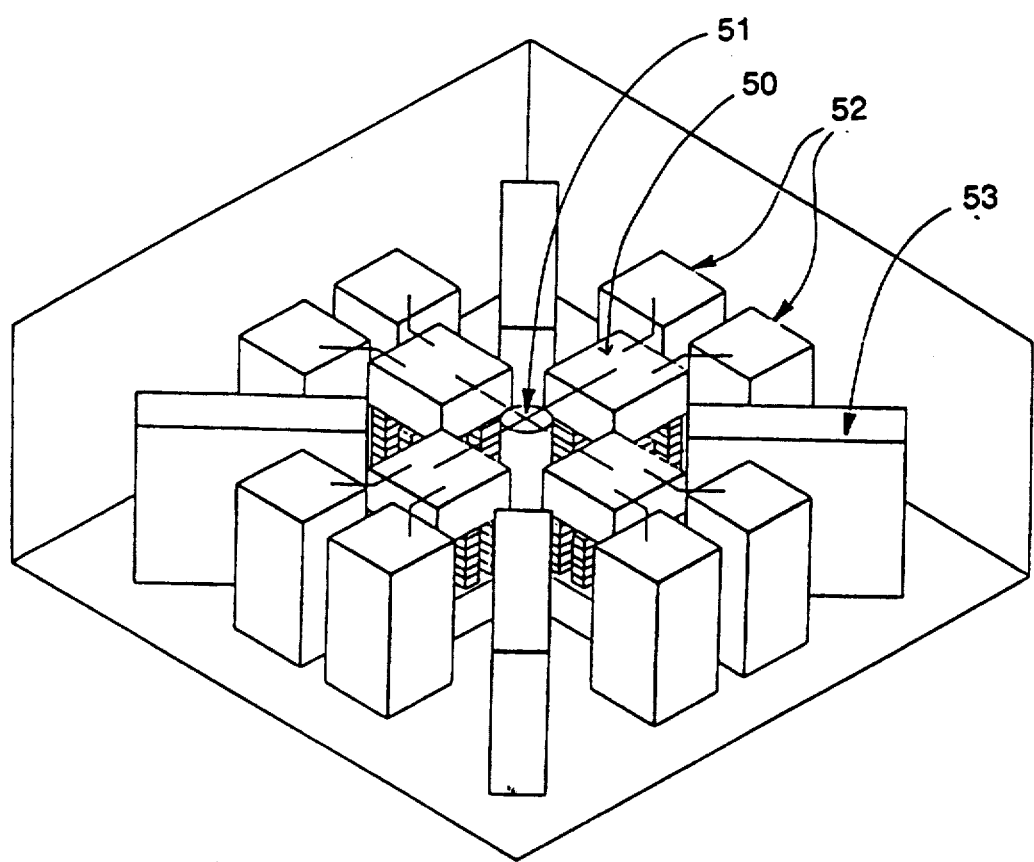
FIG. 7 is a pictorial representation of a four cluster implementation of the multiprocessors cluster system shown in FIGS. 6a and 6b.
Figure 8:
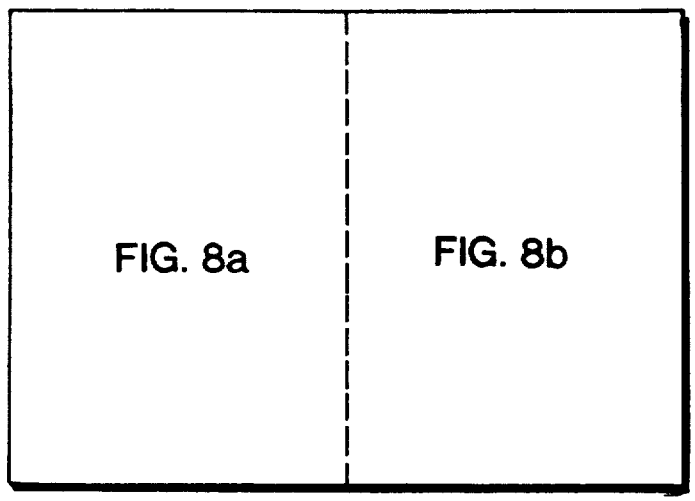
FIGS. 8, 9, and 10 illustrate the arrangement of FIGS. 8a, 8b, 9a, 9b, 10a, and 10b.

Referring now to FIG. 7, the packaging architecture for the four-cluster version of the preferred embodiment will be described, as it concerns the physical positions of cluster element cabinets within a computer room. The physical elements of the multiprocessor system include a mainframe 50 housing a single cluster 40, a clock tower for providing distribution of clock signals to the multiprocessor system, an Input/Output Concentrator (IOC) 52 for housing the input/output concentrator means 24 and a Secondary Memory System storage 53 for housing the SMS 28. In the preferred embodiment, an input/output concentrator means 24a, 24b, 24c and 24d in the IOC 52 and a SMS 28a, 28b, 28c and 28d in the SMS storage 53 are each associated with two of the clusters 40a, 40b, 40c and 40d to provide redundant paths to those external resources.

The multiprocessor cluster system of the preferred embodiment creates a computer processing environment in which parallelism is favored. Some of mechanisms in the multiprocessor cluster system which aid the present invention in coordinating and synchronizing the parallel resources of such a multiprocessor system include, without limitation: the distributed input/output subsystem, including the signaling mechanism, the fast interrupt mechanism, and the global registers and the atomic operations such as TAS, FAA, FCA and SWAP that operate on the global registers as described in greater detail in the previously identified co-pending application entitled DISTRIBUTED INPUT/OUTPUT ARCHITECTURE FOR A HIGHLY PARALLEL MULTIPROCESSOR SYSTEM Ser. No. 07/536,182; the mark instructions, the load instruction, the accounting registers and watchpoint addresses as described in greater detail in the previously identified parent application entitled CLUSTER ARCHITECTURE FOR A HIGHLY PARALLEL MULTIPROCESSOR SYSTEM Ser. No. 07/459,083; and the various mechanism that support the pipelined operation of the processors 10, including the instruction cache and the separate issue and initiation of vector instructions as described in greater detail in the previously identified co-pending application entitled SCALAR/VECTOR PROCESSOR Ser. No. 07/536,409. Together, and individually, these mechanisms support the symmetric access to shared resources and the multi-level pipeline operation of the preferred multiprocessor system.

Figure 8A:
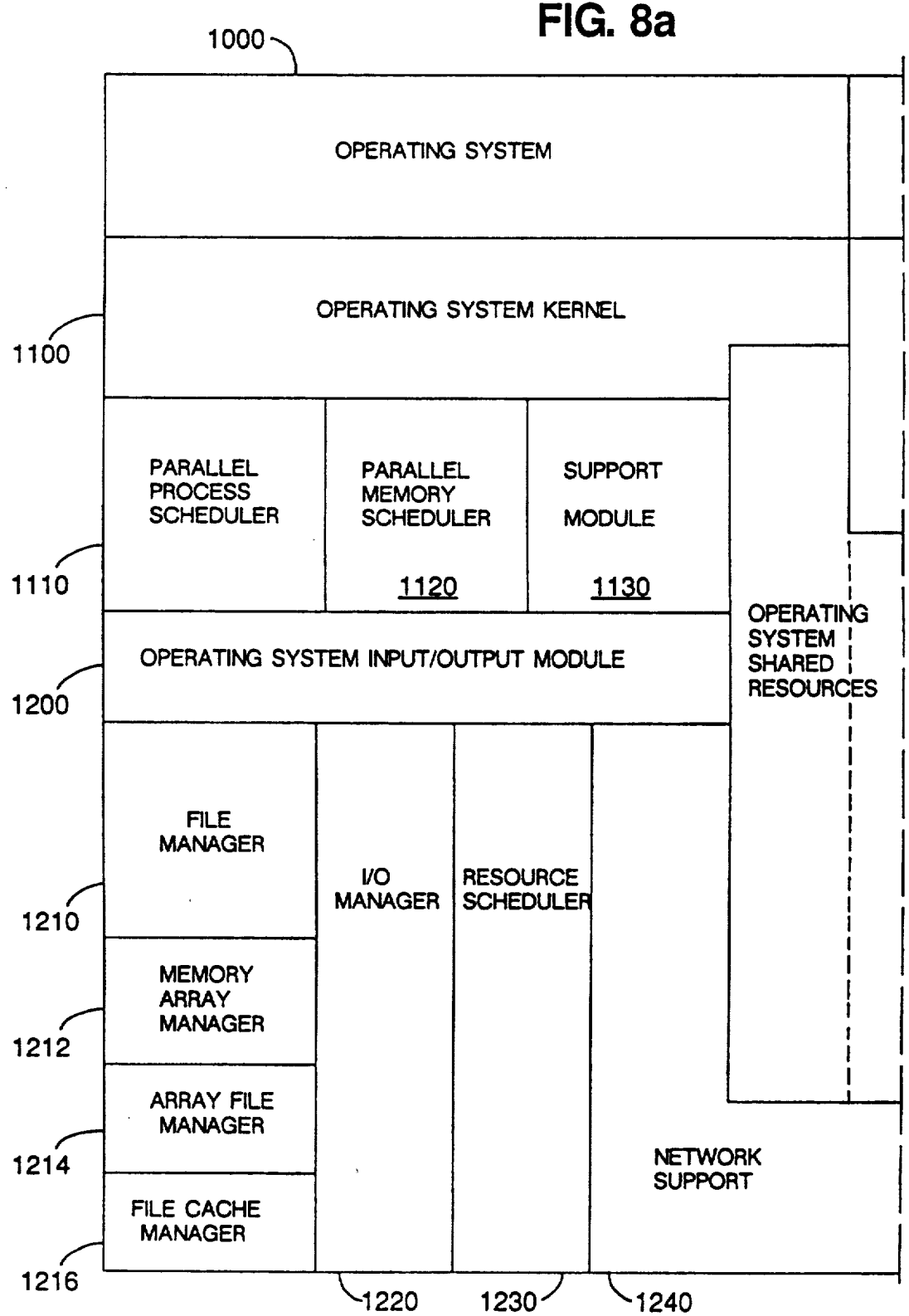
FIGS. 8a and 8b are an overall block diagram of the software architecture of the present invention showing the symmetrically integrated, multithreaded operating system and the integrated parallel user environment.
Figure 8B:
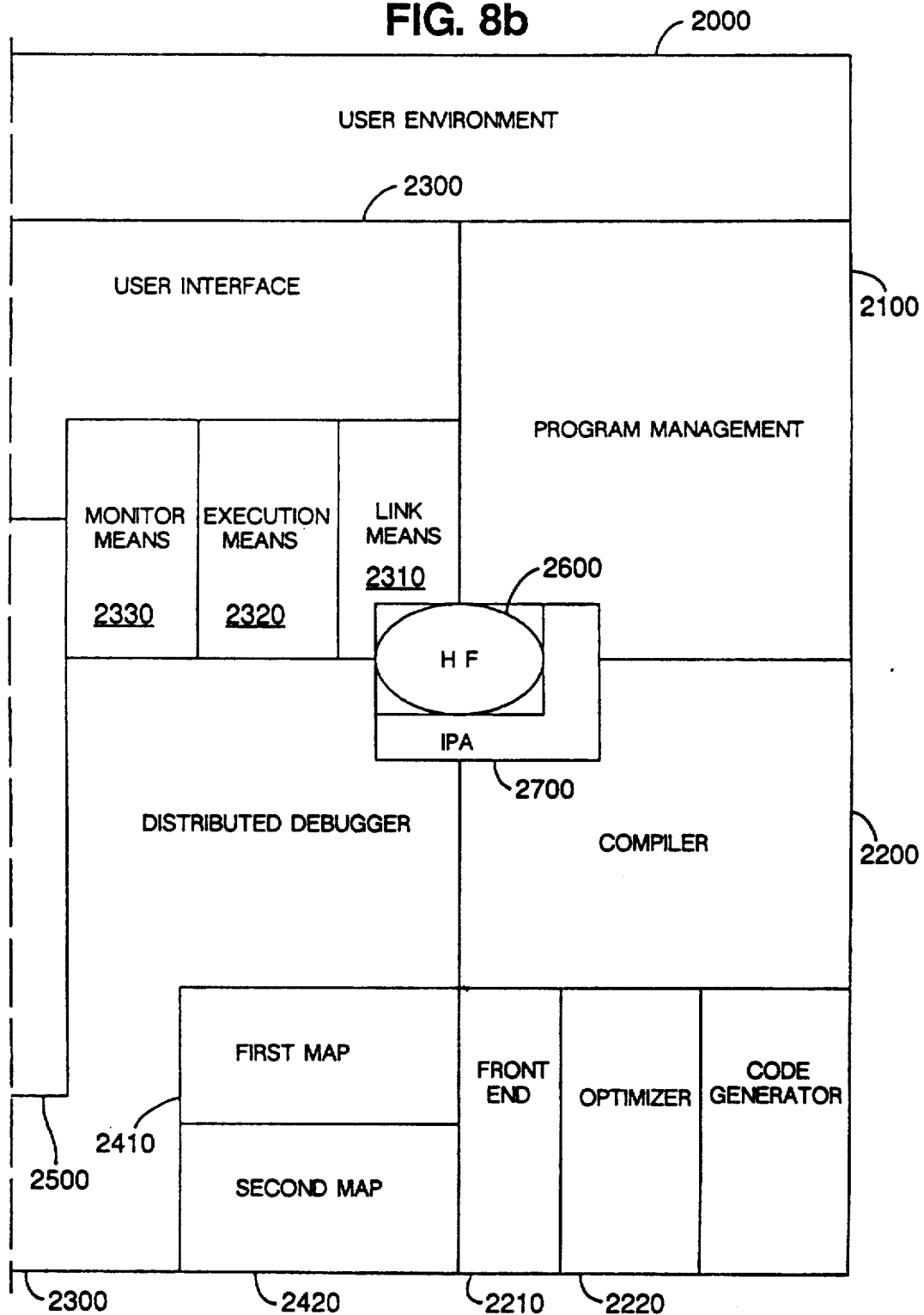

Referring now to FIGS. 8a and 8b, the software architecture of the present invention is comprised of a SSI/mOS 1000 capable of supporting shared image process groups and an integrated parallel user environment 2000 having a common visual user interface. The software architecture of the present invention makes use of the features of the preferred multiprocessor system in implementing parallelism by default in a multiprocessor environment. It will be recognized that although the present invention can make use of the various features of the preferred multiprocessor system, the software architecture of the present invention is equally applicable to other types of multiprocessor systems that may or may not incorporate some or all of the hardware features described above for supporting parallelism in a multiprocessor system.

The SSI/mOS 1000 controls the operation and execution of one or more application and development software programs and is capable of supporting one or more multithreaded programs that comprise such software programs. The SSI/mOS 1000 is comprised of a multithreaded operating system kernel 1100 for processing multithreaded system services, and an input/output section 1200 for processing distributed, multithreaded input/output services. A single image of the SSI/mOs 1000 is stored in the main memory 14 of each cluster 40.

The operating system kernel 1100 includes a parallel process scheduler 1110, a paralle memory scheduler 1120 and a multiprocessor operating support module 1130. The parallel process scheduler 1110 schedules multiple processes into multiple processors 10. The parallel memory scheduler 1120 allocates shared memory among one or more multiple processes for the processor 10. The multiprocessor operating support module 1130 provides accounting, control, monitor, security, administrative and operator information about the processor 10. Associated with the operating system kernel 1100 is a multithreaded interface library (not shown) for storing and interfaceing common multithreaded executable code files that perform standard programming library functions.

The input/output section 1200 includes a file manager 1210, an input/output manager 1220, a resource scheduler 1230 and a network support system 1240. The file manager 1210 manages files containing both data and instructions for the software programs. The input/output manager 1220 distributively processes input/output requests to peripheral devices 32 attached to the multiprocessor system. The resource scheduler 1230 schedules processes and allocates input/output resources to those processes to optimize the usage of the multiprocessor system. The network support system 1240 supports input/output requests to other processors (not shown) that may be interconnected with the multiprocessor system. In the preferred embodiment, the file manager 1210 includes a memory array manager 1212 for managing virtual memory arrays, an array file manager 1214 for managing array files having superstriping, and a file cache manager 1216 for managing file caching.

The integrated parallel user environment 2000 is used to develop, compile, execute, monitor and debug parallel software code. It will be understood that with the integrated parallel user environment 2000 of the present invention the entire program need not be executed on a multiprocessor system, such as the clusters 40 previously described. For example, the development of the parallel software code may occur using a distributed network with a plurality of workstations, each workstation (not shown) capable of executing that portion of the integrated parallel user environment necessary to develop the source code for the parallel software code. Similarly, if the source code for a particular software program is not large, or if compilation time is not a critical factor, it may be possible to compile the source code using a workstation or other front-end processor. Other types of software programs may have only a portion of the source code adapted for execution on a multiprocessor system. Consequently, the user application program may simultaneously be executing on a workstation (e.g., gathering raw data) and a multiprocessor system (e.g., processing the gathered data). In this situation, it is necessary for the execution, monitoring and debugging portions of the integrated parallel user environment 2000 to be able to act in concert so that both portions of the software program can be properly executed, monitored and debugged.

The integrated parallel user environment 2000 includes a program manager 2100, a compiler 2200, a user interface 2300, and a distributed debugger 2400. The program manager 2100 controls the development environment for a source code file representing a software program. The compiler 2200 is responsible for compiling the source code file to create an object code file comprised of one or more threads capable of parallel execution. The user interface 2300 presents a common visual representation to one or more users of the status, control and execution options available for executing and monitoring the executable code file during the time that at least a portion of the executable code file is executed on the multiprocessor system. The distributed debugger 2400 provides debugging information and control in response to execution of the object code file on the multiprocessor system.

The compiler 2200 includes one or more front ends 2210 for parsing the source code file and for generating an intermediate language representation of the source code file, an optimizer 2220 for optimizing the parallel compilation of the source code file, including means for generating machine independent optimizations based on the intermediate language representation, and a code generator 2230 for generating an object code file based upon the intermediate language representation, including means for generating machine dependent optimizations.

The user interface 2300 includes link means 2310 for linking the object code version of the user application software program into an executable code file to be executed by the multiprocessor system, execution means 2320 for executing the multithreaded executable code file in the multiprocessor system, and monitor means 2330 for monitoring and tuning the performance of the multithreaded executable code files, including means for providing the status, control and execution options available for the user. In the preferred embodiment of the user interface 2300, the user is visually presented with a set of icon-represented functions for all of the information and options available to the user. In addition, an equivalent set of command-line functions is also available for the user.

The distributed debugger 2400 is capable of debugging optimized parallel executable code across an entire computer network, including the multiprocessor system and one or more remote processors networked together with the multiprocessor system. It will be recognized that the optimized parallel object code produce by the compiler 2200 will be substantially different than the non-optimized single processor object code that a user would normally expect as a result of the compilation of his or her source code. In order to accomplish debugging in this type of distributed environment, the distributed debugger 2400 includes first map means 2410 for mapping the source code file to the optimized parallel executable code file of the software program, and second map means 2420 for mapping the optimized parallel executable code file to the source code file of the software program.

The primary mechanism for integrating the multithreaded operating system 1000 and the parallel user environment 2000 is a set of data structures referred to as the Operating System Shared Resources (OSSR) 2500 which are defined in relation to the various hardware shared resources 12, particularly the common shared main memory 14 and the global registers 16. The OSSR 2500 is a set of data structures within the SSI/mOS 1000 that define the allocation of global registers 16 and main memory 14 used by the operating system 1000, the parallel user environment 2000, the distributed input/output architecture via the external interfaces 22 and the main memory 14.

When a shared image process group is created, part of context of the shared image process group is a dynamically allocated set of global registers that the shared image process group will use. Each shared image process group is allocated one or more work request queues in the set of global registers. In the preferred embodiment, the sets of global registers are defined by the operating system in terms of absolute addresses to the global registers 16. One of the global registers is designated as the total of all of the outstanding help requests for that shared image process group. By convention, the help request total is assigned to G0 in all sets of global registers. In the situation where the processor looking for work is executing a microprocess or a process that is assigned to the same shared image process group as the global register with the help request total (i.e., intra-process context switch), the resulting switch overhead is minimal as no system related context expense is required to perform the requested work. If the processor looking for work in a given help request total (G0) is executing a microprocess not assigned to the same shared image process group, the processor executing the microprocess must first acquire the necessary microprocess context of the shared image process group for this global register set before examining the help request queues.

In the preferred embodiment, the OSSR 2500 is accessible by both the processors 10 and the external interface ports 22. The accessibility of the OSSR 2500 by the external interface ports 22 enables the achievement of a distributed input/output architecture for the preferred multiprocessor clusters 40 as described in greater detail in the previously identified copending application entitled DISTRIBUTED INPUT/OUTPUT ARCHITECTURE FOR A HIGHLY PARALLEL MULTIPROCESSOR SYSTEM Ser. No. 07/536,182. While it is preferred that the multiprocessor system allow the external interface ports 22 to access the OSSR 2500, it will also be recognized that the OSSR 2500 may be accessed by only the processors 10 and still be within the scope of the present invention.

An integral component of the parallel user environment 2000 is the intermediate language representation of the object code version of the application or development software program referred to as HiForm (HF) 2600. The representation of the software programs in the intermediate langauge HF 2600 allows the four components of the parallel user environment, the program management module 2100, the compiler 2200, the user interface 2300 and the distributed debugger 2400 to access a single common representation of the software program, regardless of the programming language in which the source code for the software program is written.

As part of the compiler 2200, an enhanced Inter-Procedural Analysis (IPA) 2700 is used by the parallel user environment 2000 to increase the value and utilization of the HF representation 2500 of a software program. The IPA 2700 analyzes the various relationship and dependencies among the procedures that comprise the HF representation 2500 of a software program to be executed using the present invention.

Unlike prior art operating systems, the present invention can perform repeatable accounting of parallel code execution without penalizing users for producing parallel code. Unlike prior art user interfaces, the present invention provides a parallel user environment with a common visual user interface that has the capability to effectively monitor and control the execution of parallel code and also effectively debug such parallel code. The end result is that the software architecture of the present invention can provide consistent and repeatable answers using traditional application programs with both increased performance and throughput of the multiprocessor system, without the need for extensive rewriting or optimizing the application programs. In other words, the software architecture implements parallelism by default for a multiprocessor system.

Because of the complexity and length of the preferred embodiment of the present invention, a table of contents identifying the remaining section headings is presented to aid in understanding the description of the preferred embodiment.

1.0 OPERATING SYSTEM
  1.1 SSI/mOS Kernel Overview
  1.2 Process Management
    1.2.1 Elements of System V Processes
    1.2.2 Architectural Implications
    1.2.3 SSI/mOS Implementation of Processes
  1.3 File Management
    1.3.1 Elements of System V File Management
    1.3.2 Architectural Implications
    1.3.3 SSI/mOS Implementation of Files
  1.4 Memory Management
    1.4.1 Elements of System V Memory Management
    1.4.2 Management of Main Memory
    1.4.3 Management of Secondary Memory Storage
  1.5 Input/Output Management
    1.5.1 Elements of System V Input/Output Management
    1.5.2 Architectural Implications
    1.5.3 SSI/mOS Input/Output Management
  1.6 Resource Management and Scheduling
    1.6.1 Introduction
    1.6.2 Role of the Network Queuing System
    1.6.3 Resource Categories
    1.6.4 Resource Management
    1.6.5 Resource Scheduling
    1.6.6 Requirements
  1.7 Network Support
  1.8 Administrative and Operator Support
  1.9 Guest Operating System Support
2.0 PARALLEL USER ENVIRONMENT
  2.1 User Interface
  2.2 Program Management
  2.3 Compiler
    2.3.1 Front Ends
    2.3.2 Parsing
    2.3.3 HiForm (HF) Intermediate Language
    2.3.4 Optimizer
      2.3.4.1 Scalar Optimizations
      2.3.4.2 Control Flow Graph
      2.3.4.3 Local Optimizations
      2.3.4.4 Global Optimizations
      2.3.4.5 Vectorization
      2.3.4.6 Automatic Multithreading
      2.3.4.7 In-lining
      2.3.4.8 Register and Instruction Integration
      2.3.4.9 Look Ahead Scheduling
      2.3.4.10 Pointer Analysis
      2.3.4.11 Constant Folding
      2.3.4.12 Path Instruction
      2.3.4.13 Variable to Register Mapping
    2.3.5 Interprocedural Analysis (IPA)
    2.3.6 Compilation Advisor
  2.4 Debugger
    2.4.1 Distributed Design for Debugger
    2.4.2 Use of Register Mapping by Debugger
    2.4.3 Mapping Source Code to Executable Code
    2.4.4 Debugging Inlined Procedures
    2.4.5 Dual Level Parsing

1.0- THE OPERATING SYSTEM

The operating system component of the software architecture of the present invention is a SSI/mOS that is fully integrated and capable of multithreading support. The preferred embodiment of the operating system of the present invention is based on a Unix System V operating system, AT&T Unix, System V, Release X, as validated by the System V Validation Suite (SVVS). For a more detailed understanding of the operation of the standard AT&T Unix operating system, reference is made to Bach, M., *The Design of the Unix Operating System* (Prentice Hall 1988). Although the preferred embodiment of the present invention is described in terms of its application to a System V-based operating system, it will be recognized that the present invention and many of the components of the present invention are equally applicable to other types of operating systems where parallelism by default in a multiprocessor operation is desired.

Traditional System V operating systems are based on a kernel concept. The extensions to the traditional System V kernel that comprise the operating system of the present invention include kernel enhancements and optimizations to support multiple levels of parallel processing. The operating system of the present invention also contains additions required for the management and administration of large multiprocessor systems. For example, the operating system can manage large production runs that use significant amounts of system resources and require advanced scheduling, reproducible accounting, and administrative tools. Each processor 10 in an cluster 40 runs under the same Supercomputer Symmetrically Integrated, multithreaded Operating System (hereinafter referred to as SSI/mOS). There is one instance of SSI/mOS stored in the main memory 14, portions of which can execute on any number of processors 10 at any one time. For increased efficiency in a multi-cluster embodiment of the preferred embodiment, a copy of the instance of SSI/mOS is maintained in the physical portion of main memory 14 for each cluster 40.

SSI/mOS fully supports parallel processing, multithreading, and automatic multithreading. Its multithreaded kernel efficiently schedules multiple parallel processors 10 and synchronizes their access to shared resources 12. Additions to the System V kernel include extended concurrency and several new types of processes; shared image processes, cooperating processes, multithreaded, parallel system processes (kprocs), interrupt processes (iprocs), and microprocesses (mprocs). SSI/mOS kernel protects internal data structures while kernel operations are occurring simultaneously in two or more processors 10. As a result, individual system requests can take advantage of multiple processors, system functions can be distributed among the available processors.

SSI/mOS also significantly extends the System V memory scheduling mechanism by implementing a selective swapping feature. The selective swapping feature of the present invention reduces swapping overhead by swapping out only those processes which will facilitate swapping in another process. As described in greater detail hereinafter, partial swapping allows mixing of very large memory processes with smaller ones.

This happens without causing undue system overhead when large processes are completely swapped.

In the distributed input/output architecture associated with the preferred embodiment of SSI/mOS, device driver software connects the peripheral devices and interfaces 32 such as networks, tape units, and disk drives, to the multiprocessor cluster 40. Operating system driver code also communicates with various network interfaces. The SSI/mOS supports Terminal Communication Protocol/Inter Process (TCP/IP) for connections to other systems supporting TCP/IP. SSI/mOS provides a Network File System for efficient file sharing across systems. While the operating system driver code is fully integrated into the SSI/mOS operating system, all device drivers in the preferred embodiment are based on established software technology.

1.1 SSI/mOS Kernel Overview

Figure 9:
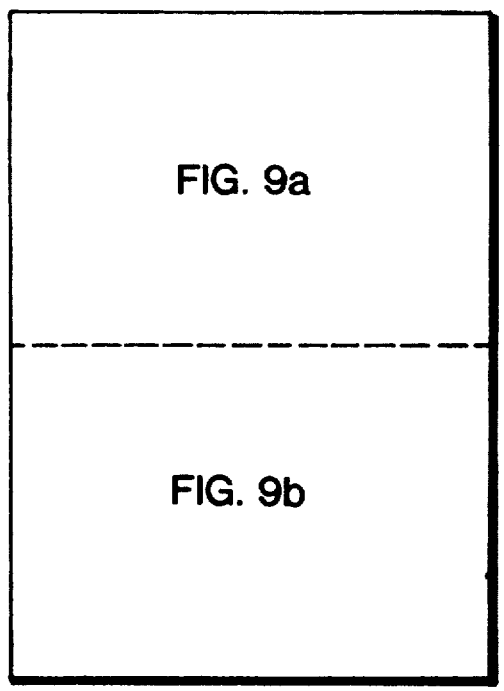
Figure 9B:
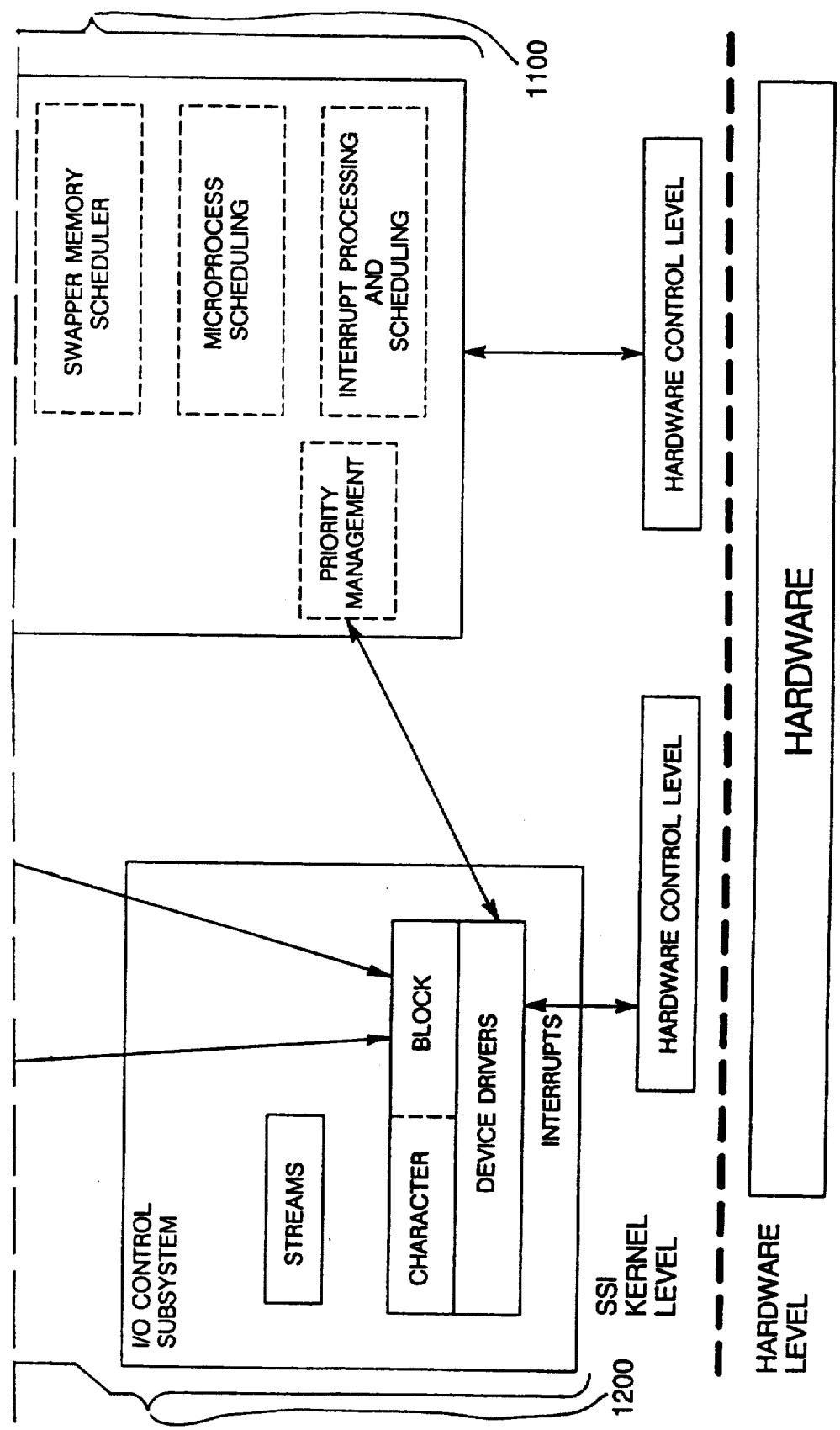

Referring now to FIGS. 9a and 9b, the main components in the SSI/mOS 1100 are shown in relation to traditional System V-like functions. In this block diagram, the user environment 2000 is represented at the top of the diagram and the hardware associated with the preferred embodiment of the multiprocessor system represented at the bottom, with the operating system 1000 shown in between. The operating system kernel 1100 is generally shown on the right of SSI/mOS 1000 and the input/output section 1200 is shown on the left of SSI/mOS 1000.

The executable code file SSI/mOS operating system kernel 1100 is always resident in the main memory 14. In those situations where the user application programs requires an operating system function, it is necessary to perform a context switch from the user application program to the operating system kernel 1100. There are a limited number of situations when the program flow of a user application program running in the processor 10 will be switched to the SSI/mOS kernel 1100. Three events can cause a context switch from an application program into the SSI/mOS kernel 1100: interrupts, exceptions, and traps.

Interrupts are events which are outside the control of the currently executing program, and which preempt the processor 10 so that it may be used for other purposes. In the preferred embodiment, an interrupt may be caused by: (1) an input/output device; (2) another processor, via the signal instruction; or (3) an interval timer (IT) associated with the processor 10 reaching a negative value. In the preferred processor 10, interrupts may be masked via a System Mask (SM) register. If so, pending interrupts are held at the processor until the mask bit is cleared. If multiple interrupts are received before the first one takes effect, the subsequent interrupts do not have any additional effect. Interrupt-handling software in the SSI/mOS kernel 1000 determines via software convention the source of an interrupt from other processors 10 or from external interface port 22. In the preferred embodiment, the SSI/mOS kernel 1100 supports both event-driven and polling-derived interrupts.

An exception terminates the currently executing program because of some irregularity in its execution. As described in greater detail in the parent application, the various causes for an exception in the preferred embodiment are: (1) Operand Range Error: a data read or write cannot be mapped; (2) Program Range Error: an instruction fetch cannot be mapped; (3) Write Protect violation: a data write is to a protected segment; (4) Double bit ECC error; (5) Floating-point exception; (6) Instruction protection violation: an attempt to execute certain privileged instructions from non-privileged code; (7) Instruction alignment error: a two-parcel instruction in the lower parcel of a word; and (8) Invalid value in the SM (i.e., the valid bit not set.) In general, exceptions do not take effect immediately; several instructions may execute after the problem instruction before the context switch takes place. In the preferred processor 10, an exception will never be taken between two one-parcel instructions in the same word. Some exceptions may be controlled by bits in the User Mode register. If masked, the condition does not cause an exception.

A voluntary context switch into the SSI/mOS kernel 1100 can be made via the trap instruction. In the preferred embodiment, a System Call Address (SCA) register provides a base address for a table of entry points, but the entry point within the table is selected by the 't' field of the instruction. Thus, 256 separate entry points are available for operating system calls and other services requiring low latency access to privileged code. The SSI/mOS kernel 1100 takes advantage of this hardware feature to execute system calls with a minimum of overhead due to context saving. Some system calls can be trapped such that context is saved. Traps also facilitate the Fastpath to secondary memory. Unlike interrupts and exceptions, a trap is exact; that is, no instructions after the trap will be executed before the trap takes effect. The operating system returns to the program code via the trap return. The trap return operation, caused by the rtt instruction, is also used whenever the operating system wishes to cause a context switch to do any of the following: (1) Restart a program that was interrupted or had an exception; (2) Return to a program that executed a trap instruction; (3) Initiate a new user program; and (4) Switch to an unrelated system or user mode thread.

An interrupt takes precedence over an exception if: (1) an interrupt occurs at the same time as an exception; (2) an interrupt occurs while waiting for current instructions to complete after an exception; (3) an exception occurs while waiting for instructions to complete after an interrupt. In these cases, the cause of the exception will be saved in the ES (Exception Status) register. If the interrupt handler in the SSI/mOS kernel 1100 re-enables exceptions, or executes an rtt instruction, which re-enables exceptions, the exception will be taken at that time.

Figure 10:
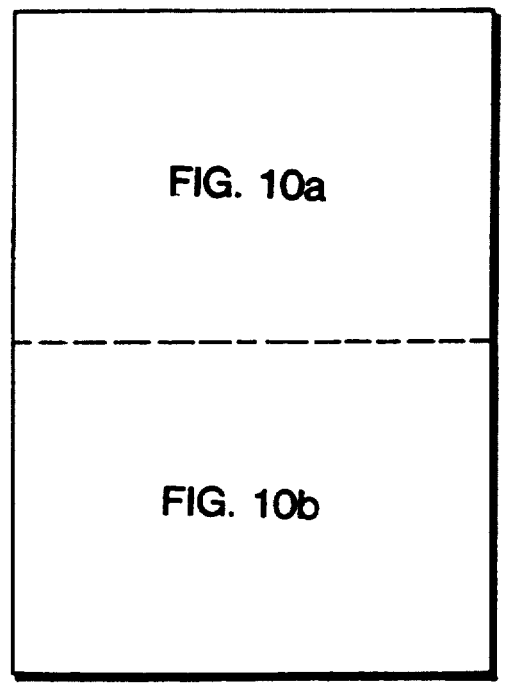
Figure 10B:
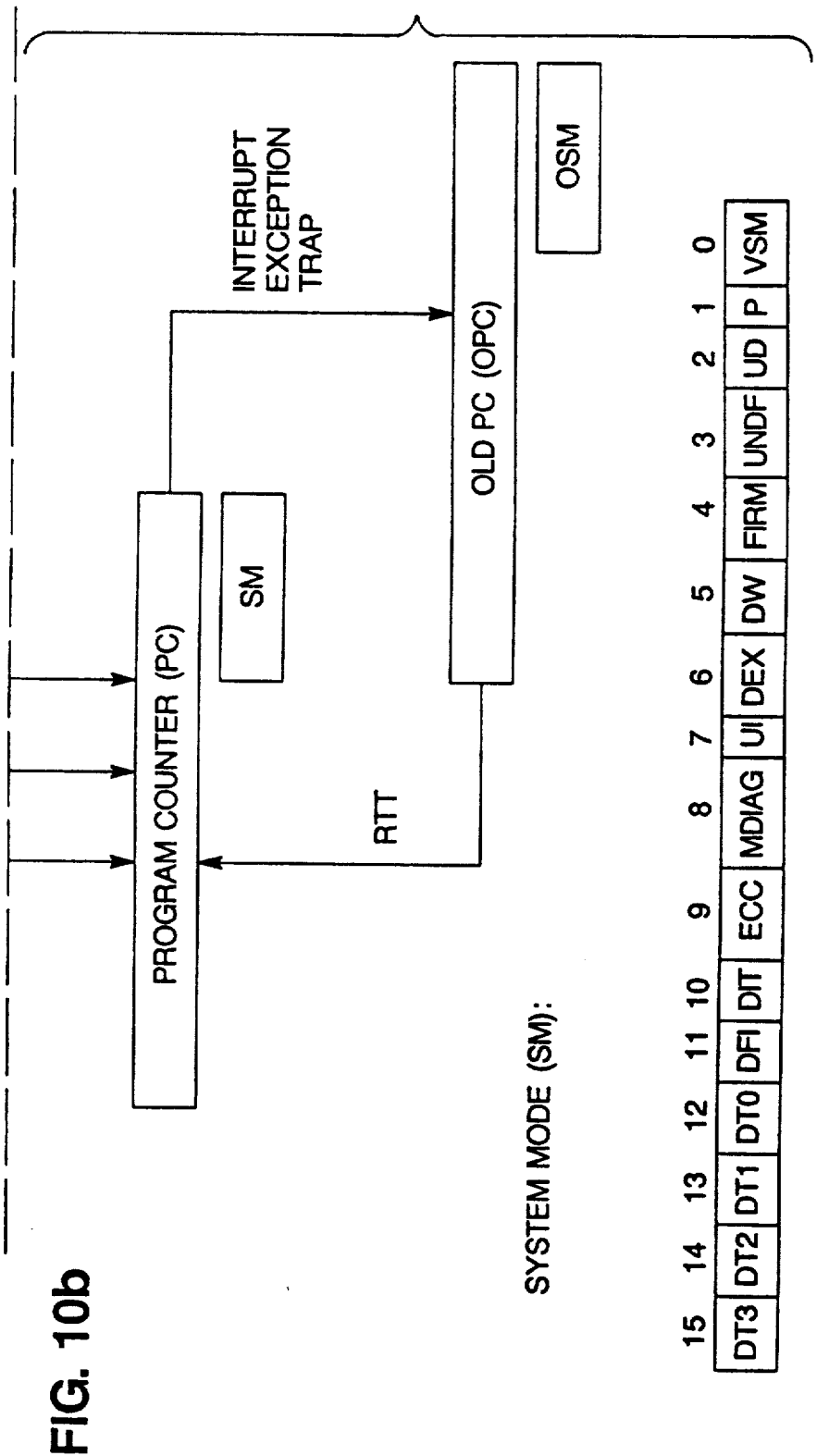

There is a common method of responding to interrupts, exceptions, and traps. FIGS. 10a and 10b show how a handler routine 1150 handles a context switch. At step 1151, the handler routine 1150 saves the registers in the processor 10 that the handler routine 1150 is to use, if it is to return to the suspended program with those registers intact. In the preferred embodiment, this includes either a selected group of registers or all of the registers for the processor, depending upon the type of process executing in the processor 10. At step 1152, the handler routine 1150 it waits for a word boundary or completion of a delayed jump. That is, if the next instruction waiting to issue is the second parcel of a word, or is a delay instruction following a delayed jump, waits until it issues. (This step is not done for trap instructions.) At step 1153, the handler routine 1150 moves the Program Counter (PC) register (adjusted so that it points to the next instruction to be executed) into the Old Program Counter (OPC) register, and the System Mask (SM) register into the Old System Mask (OSM) register. At step 1154, the handler routine 110 loads the PC register from the Interrupt Address (IAD) register, the Exception Address (EAD) register, or the System Call (SCA) register, depending upon which type of context switch is being processed. (If the SCA register is selected, 'or' in the shifted 't' field in the instruction to form one of 256 possible entry points). At step, 1155, the SM register are set to all ones. This disables interrupts and exceptions, disables mapping of instructions and data, and sets privileged mode. At step 1156, execution is resumed at the new address pointed to by the PC register.

1.2 Process Management

Section 1.2 describes processes and process management under SSI/mOS. This information is presented in three sections. Section 1.2.1 briefly describes the standard functions and characteristics of System V processes and their management retained in SSI/mOS. Section 1.2.2 lists those features and functions of the cluster architecture of the preferred embodiment of the multiprocessor system that impose special operating system requirements for processes and process management. Section 1.2.3 describes the additions and extensions developed within SSI/mOS as part of the objectives of the present invention.

1.2.1 Elements of System V Processes

In addition to being validated by the System V Validation Suite (SVVS), SSI/mOS provides System V functionality for processes. A single thread runs through each process. A process has a process image, memory, and files. Each standard process has a unique hardware context; registers and memory are not shared except during inter-process communications (IPC). Standard process states exist (user, kernel, sleeping). Finally, System V IPC elements are used.

1.2.2 Architectural Implications

The design of the cluster architecture of the preferred embodiment focuses on providing the most efficient use of system resources. Several architectural features have direct implications for processes and their management. For example, multiple processors 10 are available per cluster 40 to do work on a single program using the mechanisms of microprocesses and shared image processes. One or more processors work on one or more microprocesses initiated by a single program. The processors 10 are tightly coupled processor and share a common main memory 14 to enhance communications and resource sharing among different processes.

Another important architectural feature is that multiple input/output events go on within a single process image. The concurrent processing of interrupts is an example. As shown in FIG. 11, an interrupt causes the processor to branch to a computational path while the interrupt is processed. Although the processor is idled (sleeps) during the actual data transfer, there is no switch, computations continue and the new data is available and used after the paths are synchronized. Input/output events are initiated in parallel with each other and/or with other computational work.

The present invention allows for processes at a small level of granularity to obtain the most effective use of the system's multiple processors, architecture, and instruction set. For example, small granularity threads are scheduled into small slots of available processor time, thereby maximizing utilization of the processors. This is accomplished by the use of the mprocs as described in greater detail hereinafter.

The cluster architecture of the preferred embodiment also allows the operating system of the present invention to save a number of context switches by minimizing the size of context interrupts and by delaying context switches. Major context switches are deferred to process switch times. The amount of context saved at trap (system call) or interrupt time is minimized.

1.2.3 SSI/mOS Implementation of Processes

To support a multiprocessing kernel, SSI/mOS redefines several System V process-related elements. In addition to the types of processes and process-related elements previously defined, the present invention implements several new process related elements, as well as improving several present process related elements, including:

Microprocess (mproc) - A microprocess is created by a help request from an existing process. A typical example of a microprocess is a thread of execution being initiated by the user-side scheduler (USS). To minimize overhead, a microprocess does not sleep (i.e., is not rescheduled by System V), because it is expected to have a relatively short life span. When an event occurs that requires a microprocess to go to sleep (such as a blocking system call), then the system converts the microprocess to a full context process and reschedules it via the usual kernel process scheduling mechanisms. After a microprocess begins execution on a processor, its context consists primarily of the current contents of the processor registers. As previously stated, SSI/mOS kernel code executed on behalf of a microprocess will force its conversion into a full context process should the microprocess block for any reason.

Shared Image Processes - In addition to the definition previously set forth, it will be recognized that both processes and microprocesses can be shared image processes. Processes have full context as opposed to microprocesses that have a minimum context.

Cooperating Process - This term is used to identify those processes that are sharing (and are thus synchronizing through) a single set of global registers. This means the value in the global register control register is the same for each cooperating process. By default, each microprocess is a cooperating process with its respective initiating process. Shared image processes may or may not be cooperating processes, although by default they are. Through the use of system calls, non-shared image processes can become cooperating processes.

Processor Context - Each process has processor context. In the preferred embodiment, processor context includes the scalar, vector, and global registers being used by the process or microprocess, plus the control register settings that currently dictate the execution environment. To allow the process to continue executing at its next scheduling interval, a subset of this processor context is saved across interrupts, exceptions, and traps. Exactly what is saved depends on the source of the event triggering the context switch.

Switch Lock - Switch locks are used for longer locks in the kernel proper, but not for locks that require an interrupt to be released. A switch lock causes a waiting process to stop executing but places it on the run queue for immediate rescheduling.

Autothreads - Autothreads are part of the automatic parallelization that is a product of the compiler as discussed in greater detail hereinafter. An autothread within compiled code makes a SSI/mOS kernel request for specified numbers of microprocesses. The number given is based on the currently available number of processors. A processor can serially run several autothreads in the same microprocess without going back to the autothread request stage. This is very efficient since it results in fewer kernel requests being made. If an autothread requests system work which requires a context switch, then the autothreads are scheduled into shared image processes. Short-lived, computation-only autothreads do not assume the overhead of process initialization. Minimizing overhead provides additional support for small granularity parallel performance. The operating system can automatically convert autothreads into shared image processes, depending on the functions and duration of the autothread.

System Process (kproc) - A kproc is a process that facilitates the transmission of asynchronous system calls. When system call code is running in another processor, or has been initiated by user code via the system call interface, kprocs enable system call code and user code to run in parallel.

Interrupt Process (iproc) - An iproc may be a process that acts as a kernel daemon. It wakes up to process the work created when an interrupt occurs, such as a series of threads that must be performed in response to an interrupt sent by an external processor or device. Alternatively, an iproc is initiated when an interrupt occurs. Traditionally, this interrupt processing has been done by input/output interrupt handlers.

In the present invention, microprocesses are created as an automatically multithreaded program is executed. An existing process posts a request in a global register asking that a microprocess or microprocesses be made available. At this point, any available processor can be used as a microprocess. It will be noted that System V mechanisms can also create microprocesses, iprocs, kprocs, and shared image processes as well as traditional System V processes using the present invention.

When an exception occurs in SSI/mOS, the user can control the termination of multiple processes. In the preferred embodiment, the default is the traditional System V procedure, that is, to terminate all processes on an exception.

The SSI/mOS scheduler is a multithreaded scheduler called the dispatcher 1112 (FIG. 9). There is no preferential scheduling of processes. The scheduling uses an anarchy based scheme: an available processor automatically looks for work. As a result, several processors may be trying to schedule work for themselves at any one time, in parallel.

Figure 12:
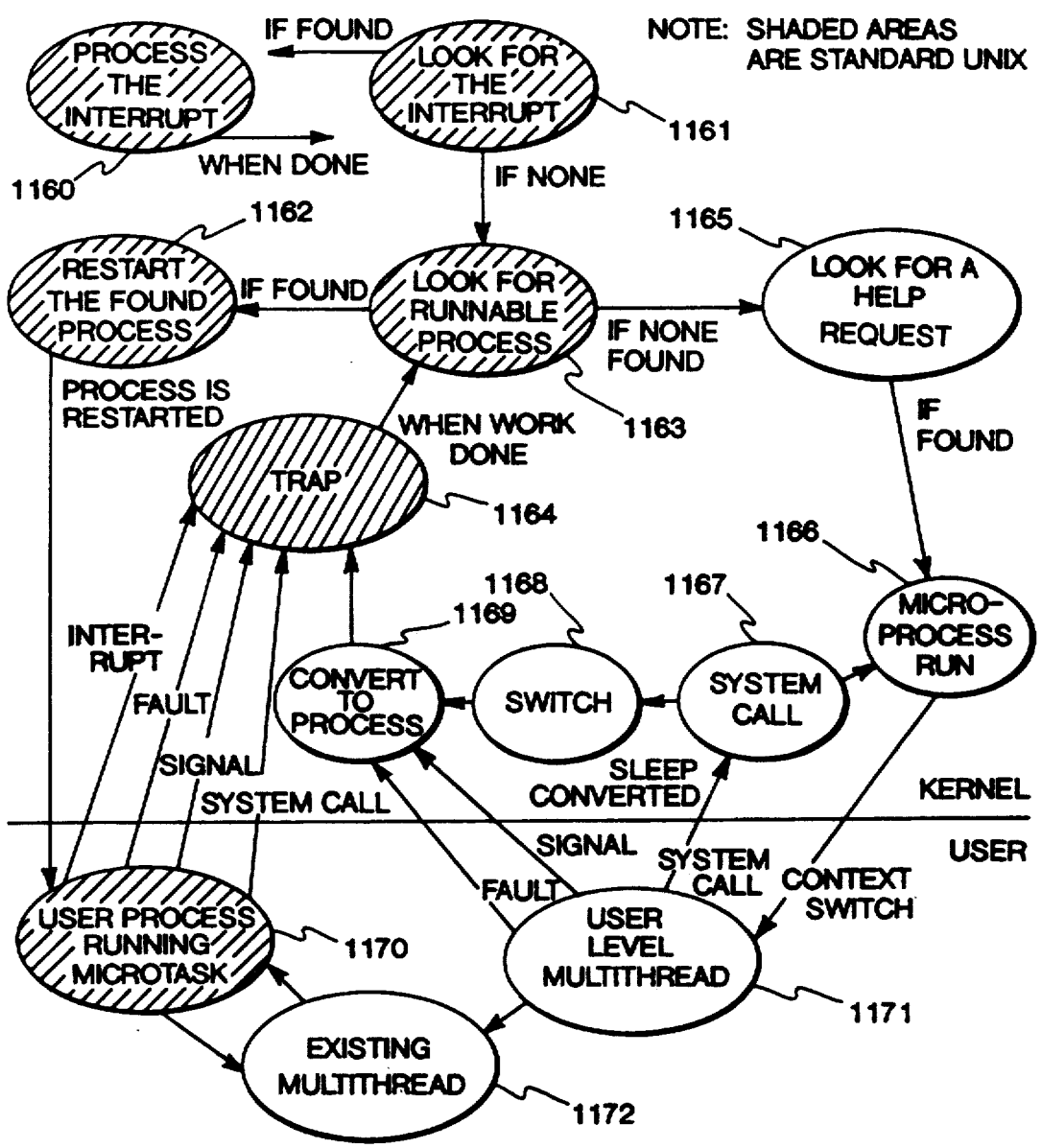
FIG. 12 is a block diagram of the scheduling states for the dispatcher of the present invention.

The dispatcher 1112 manages the progress of processes through the states as shown in FIG. 12. Processors 10 use the dispatcher portion of SSI/mOS to check for the highest priority process or microprocess that is ready to run. Kprocs, iprocs, and mprocs will each be a separate scheduling class. Requests by a process (usually a shared image process group) for work to be scheduled will increment a value in one of the global registers 16 that is associated with that process. The specified global register is chosen by convention as described in greater detail hereinafter and will be referred to for the description of FIG. 12 as the Help Request (HRR). The increment of the HRR is an atomic action accomplished by use of one of the atomic resource allocation mechanisms associated with the OSSR's. At state 1163, the operating system 1000 has a processor 10 that can be scheduled to do new work. Based on site selectable options, the operating system can either (1) always choose to schedule processes first to state 1162 for traditional process scheduling and only if no executable process is found check the HRR in state 1165; or (2) always schedule some portion of the processors 10 to check the HRR in state 1165 to support parallel processing (and, in particular, the processing of mprocs) and schedule the remainder of the processors 10 to state 1162 for traditional process scheduling. This assignment balance between state 1162 and 1165 is modified in real time in accordance with a heuristic algorithm to optimize the use of the multiprocessor system based on predictive resource requirements obtained from the accounting registers in the processor 10. For example, all other conditions being equal, an available processor will be assigned to threads executing at the highest computation rate, i.e. the most efficient processors.

Processes that are sent to state 1165 and do not have any context to be saved at the point they reach state 1165 can become microprocesses. In state 1165, the microprocesses examine each group of global registers assigned to a shared image process group and, specifically, examine the HRR global register for that shared image process group. If the HRR register is positive, then the shared image process group has requested help. The microprocess automatically decrements the count in the HRR (thus indicating that one of the request made to the HRR has been satisfied) and proceeds to state 1169 for scheduling by the User-Side Scheduler.

Shared image processes in a multithreaded program that have completed their current thread of execution will also check the HRR for additional threads to execute. Such processes that do not immediately find additional threads to execute will continue to check the HRR for a period of time that is set by the system, but modifiable by the user. In essence, this is the period of time during which it is not efficient to perform a context switch. If no requests to execute threads are found in the HRR for the shared image process group to which the process is presently scheduled, the process returns to the operating system through state 1164 and into state 1165 for normal process scheduling.

It will be noted that a multithreaded program will generally have different numbers of threads during different point in the execution of that program and therefore will be able to utilize different numbers of processors 10 during the entire period of execution of the program. A feature of the present invention is the ability to efficiently gather additional processors from the operating system to be applied to a multithreaded program when that program has more threads than processors and to return processors to the operating system when there are more processors than threads. When a processor enters a region where additional threads are available for execution, the processor 10 makes a request for additional processors 10 by incrementing the HRR and then proceeds to start executing the threads for which it requested assistance. Processors that are executing in the same shared image process group and that are available to execute another thread check the value of the HRR to determine what available threads exist for execution in that shared image process group. Microprocesses in the operating system will also examine the HRR for all of the shared image process groups executing in the multiprocessor system looking for microprocess threads to execute. As previously mentioned, microprocesses have no context that must be saved because they are destructible upon exit and also require only a minimum amount of context in order to join in the execution of a multithreaded program as a microprocess. Microprocesses can thus be quickly gathered into the execution of a multithreaded program that has available work requests present in the HRR. Processors that are executing a multithreaded program but have no threads to execute will continue to look for additional threads in the shared image process group for the selectable period of time previously described. If a processor does not find additional threads in the allotted time, the processor performs a lightweight context switch to return to the operating system for the purpose of becoming available to execute microprocesses for other shared image process groups.

1.3 File Management

Section 1.3 describes files and file management under SSI/mOS. This information is presented in three sections. Section 1.3.1 briefly describes the System V file functions and characteristics retained in SSI/mOS. Section 1.3.2 lists those features and functions of the cluster architecture that impose special operating system requirements for files and file management. Section 1.3.3 describes the additions and extensions developed within SSI/mOS to satisfy cluster architectural requirements for files and file management.

1.3.1 Elements of System V File Management

SSI/mOS implements the System V tree file system by supporting file access/transfer to all standard networks supporting standard character and block device drivers

1.3.2 Architectural Implications

The cluster architecture supports multiple input/output streams, thus supporting disk striping and multiple simultaneous paths of access to the Secondary Memory System (SMS). The input/output concentrator (IOC) 24 distributes work across processors 10 and input/output logical devices 30. Low level primitives in the IOC 24 expose memory 14, SMS 28, and the global registers 16 to the system's device controllers. All the SMS transfer channels can be busy at the same time. The cluster architecture also provides an optional expanded caching facility through the high bandwidth SMS, using the SMS to cache.

1.3.3 SSI/mOS Implementation of Files

SSI/mOS has two types of file systems. In addition to a System V tree system referred to in section 1.3.1, an array file system may also be implemented. The second type of file system is structured as an array file system. By adding a high performance array file system, SSI/mOS takes advantage of the multiple input/output streams provided in the cluster architecture, allowing optimal configurations of storage based on application characteristics. The array file system allows users to request, through the resource manager, enough space to run their applications, configured as to allow maximum input/output throughput. Other features include: support for large batch users; support for a large number of interactive users; and enhanced support for parallel access to multiple disks within a single file system, i.e. disk striping.

Figure 13:
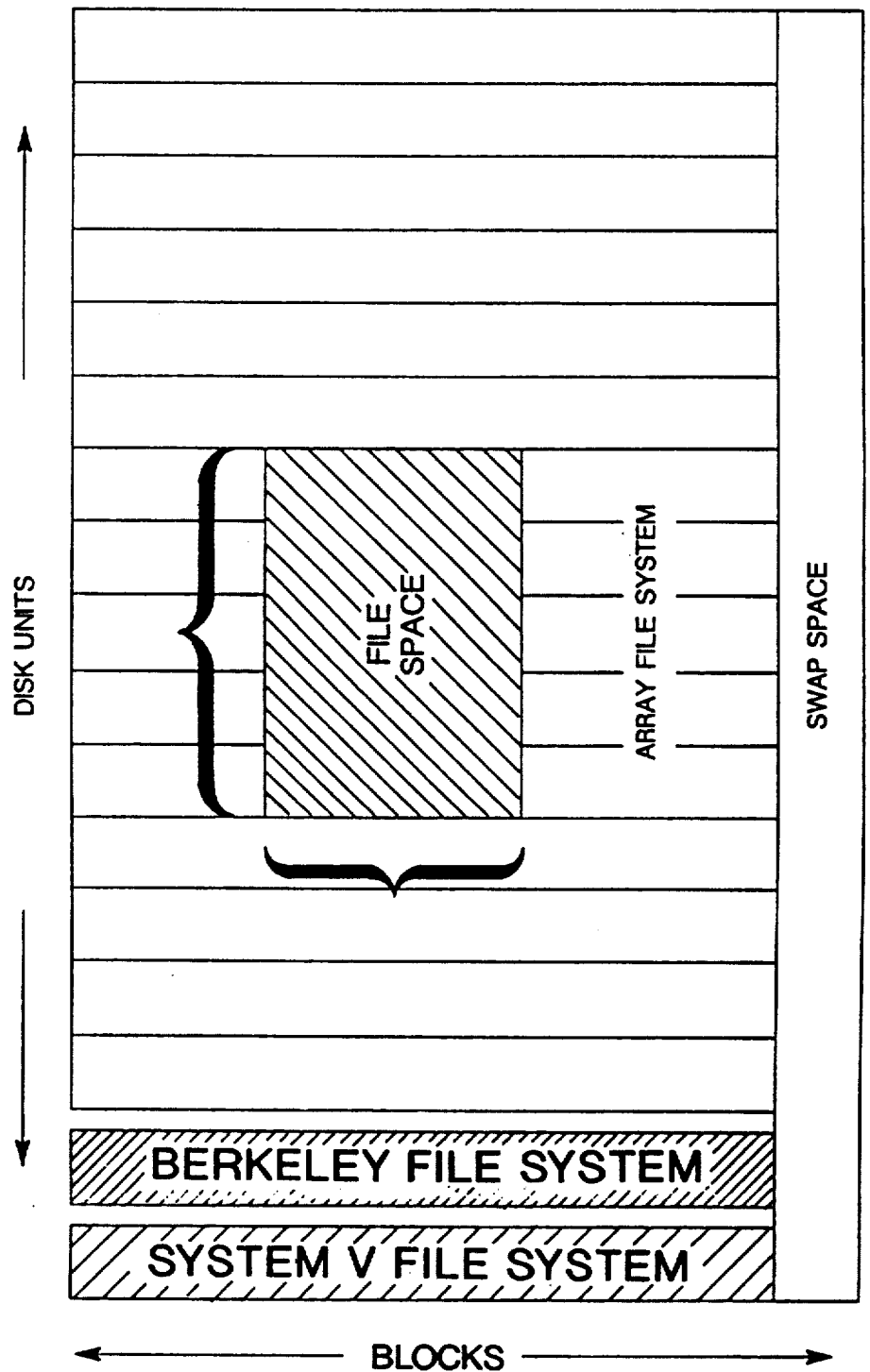
FIG. 13 shows one embodiment of an array file system using the presenting invention.

Referring now to FIG. 13, one embodiment of the SSI/mOS array file system is shown. The size of the file system block is 32 kilobytes. Allocation of space is controlled by the resource manager. Users can access data via System V read and write calls. The present invention also supports disk striping, whereby large blocks of data can be quickly read from/written to disk through multiple concurrent data transfers.

1.4 Memory Management

Section 1.4 describes memory and memory management under SSI/mOS. This information is presented in three sections. Section 1.4.1 briefly describes the standard functions of memory management that are retained in SSI/mOS. Section 1.4.2 describes the additions and extensions developed within SSI/mOS to satisfy cluster architectural requirements for the management of main memory. Section 1.4.3 describes the additions and extensions developed within SSI/mOS to satisfy cluster architectural requirements for the management and utilization of the Secondary Memory System 28.

1.4.1 Elements of System V Memory Management

Although many tables and other memory-related elements are retained, the basic System V memory managing scheme has been replaced.

1.4.2 Management of Main Memory

Major changes have been made in the allocation and scheduling of memory in SSI/mOS as compared to standard System V. Before implementing a memory manager in the SSI/mOS kernel, the paging code in the original System V kernel was removed. This code is replaced by a memory manager which assumes a flat memory architecture. The memory manager tracks the current status of memory by mapping through the segment table entries. A set of routines are used to change that status. Memory mapping is arranged through a set of three doubly-linked circular lists: (1) a list of ALL memory, ordered by location in memory; (2) a list of free space in memory, ordered by size; and (3) a list of allocated space in memory, ordered by size.

Figure 14:
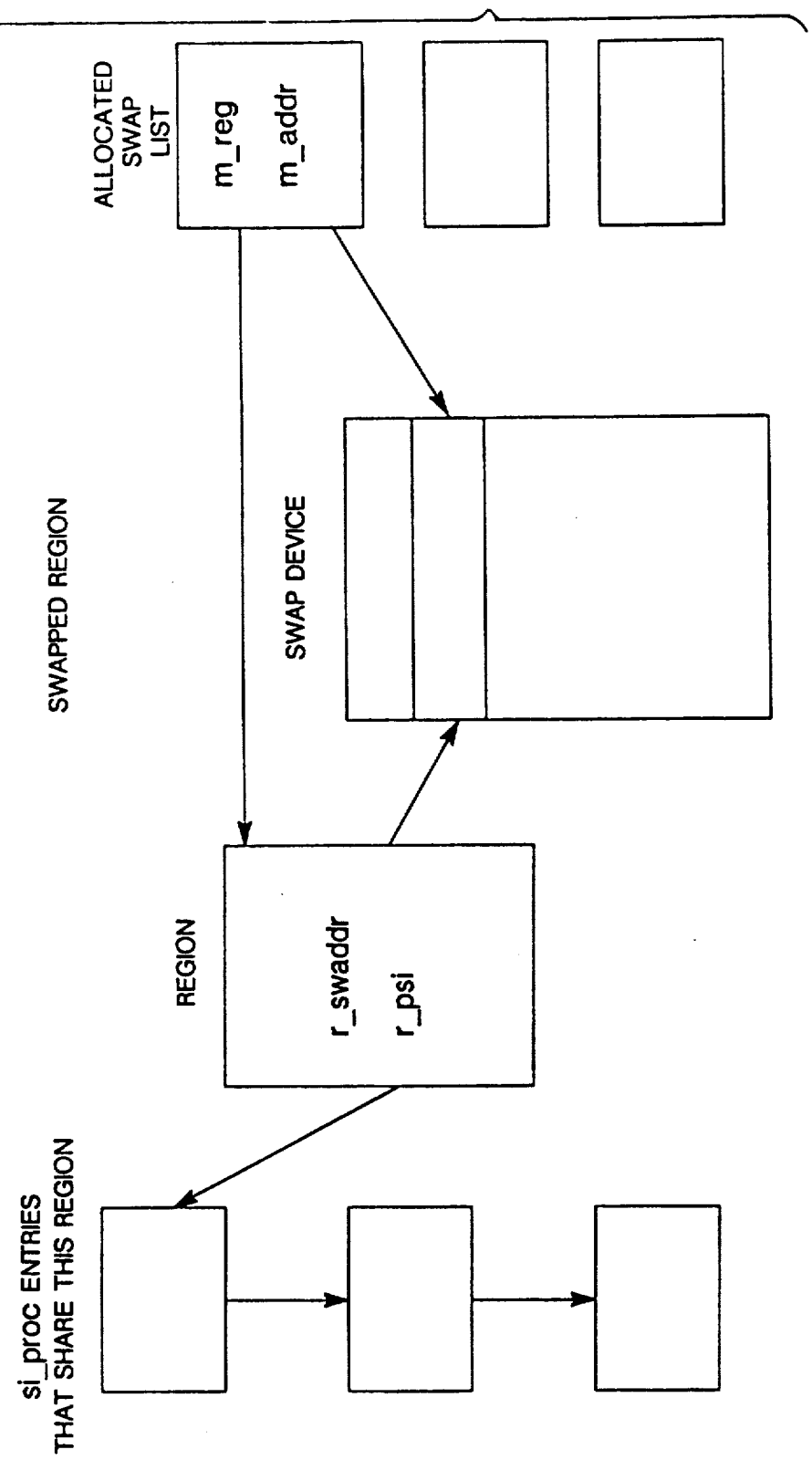
FIG. 14 is a block diagram of a swapped segment.

The System V swapper has been optimized to reduce swapping overhead and to make use of the multiple data control registers. The role of swapper is to determine which process images will be in memory at any given time. As shown in FIG. 14, the swap map parallels the memory map.

Figure 15:
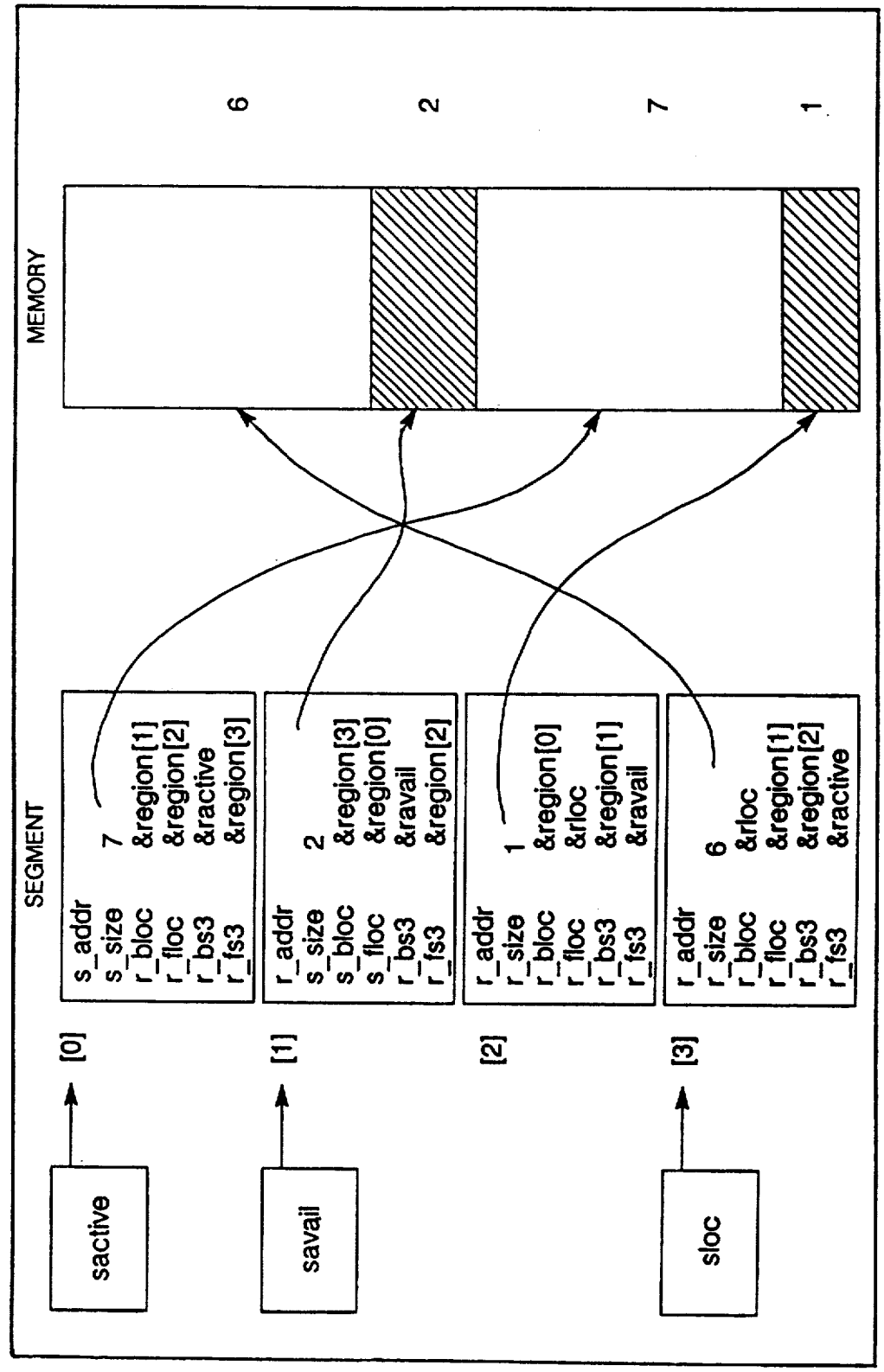
FIG. 15 is a block diagram of memory segment functions.

Segment code manages the sections of memory that contain a user's text, data, and shared memory. The segment code splits the segments to effectively use the multiple data segments in the control registers. If not enough contiguous memory is available to satisfy a request, then multiple data segments of smaller size are used. Segments are doubly linked by location and size. FIG. 15 shows how memory segments function.

Memory is managed via three doubly linked lists: (1) sloc- a dummy node heading a list of all memory segments whether active or available; ordered by location; (2) savail- a dummy node heading a list of memory segments available to be allocated, ordered by descending size; and (3) sactive- a dummy node heading a list of allocated memory segments, ordered by descending size. It will be noted that ravail and ractive are mutually exclusive.

Figure 16:
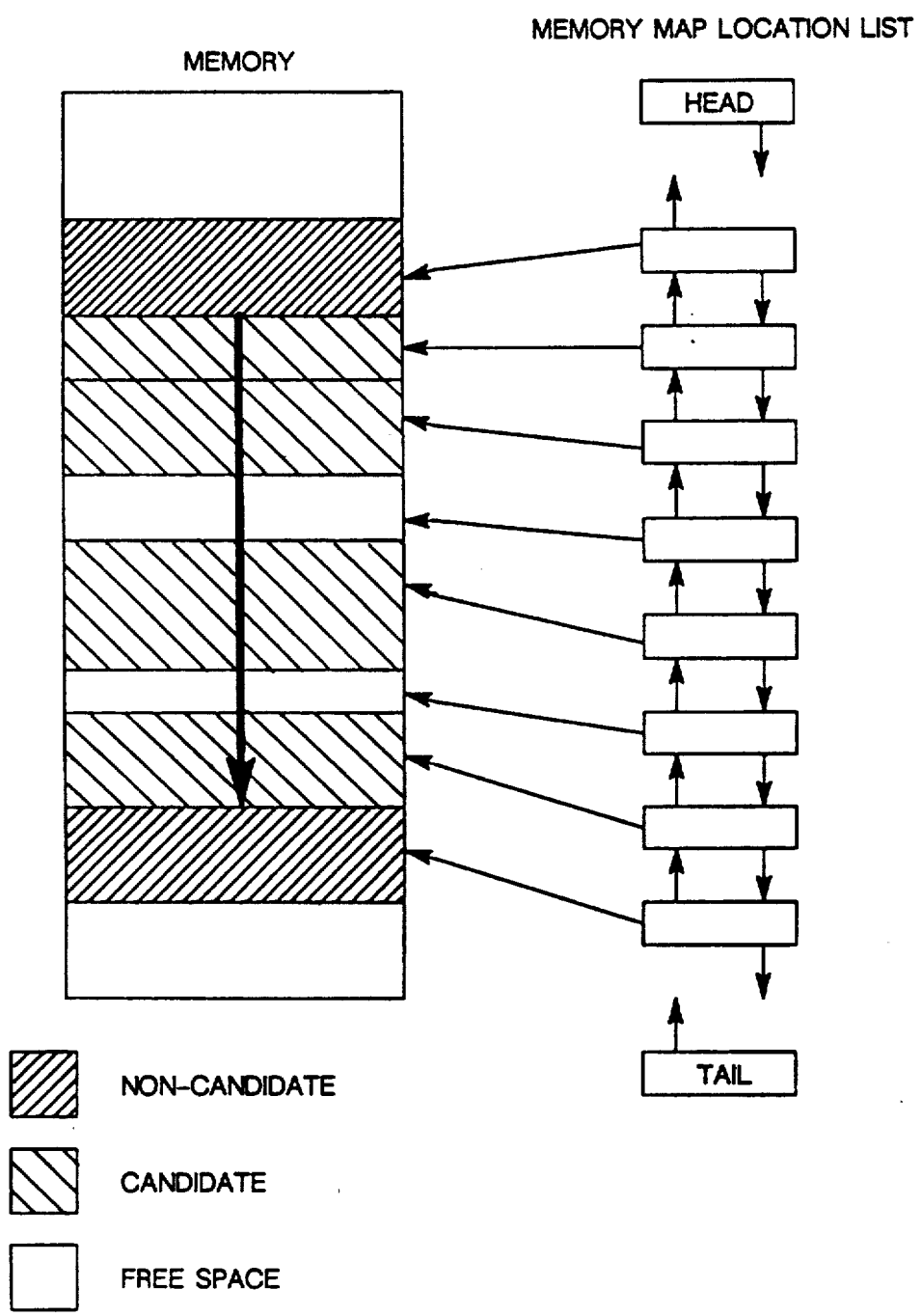
FIG. 16 is a schematic diagram showing the selection of adjacent swap out candidates.

Referring now to FIG. 16, the selection of swap out candidates will be described. The swapping overhead is reduced by making intelligent choices of processes to swap out. The System V swapping algorithm swaps out processes based strictly on priority and age, regardless of whether enough memory will be freed for the incoming process. The SSI/mOS swapper only swaps out processes which free the needed amount of memory. This is done by adding location and size to the criteria used for determining swap out candidates. Multiple adjacent processes may be swapped out if together they free the amount of memory needed. System load and processor usage are criteria for choosing swap candidates. Normally it is not efficient to swap out a very large process. However, if the system load is light, multiple processors can speed swapping out a large process so that many smaller processes can be efficiently swapped in and run. Processes that are not efficiently using their processors will be chosen to be swapped out before an equal priority process that is efficiently using its processors.

Figure 17:
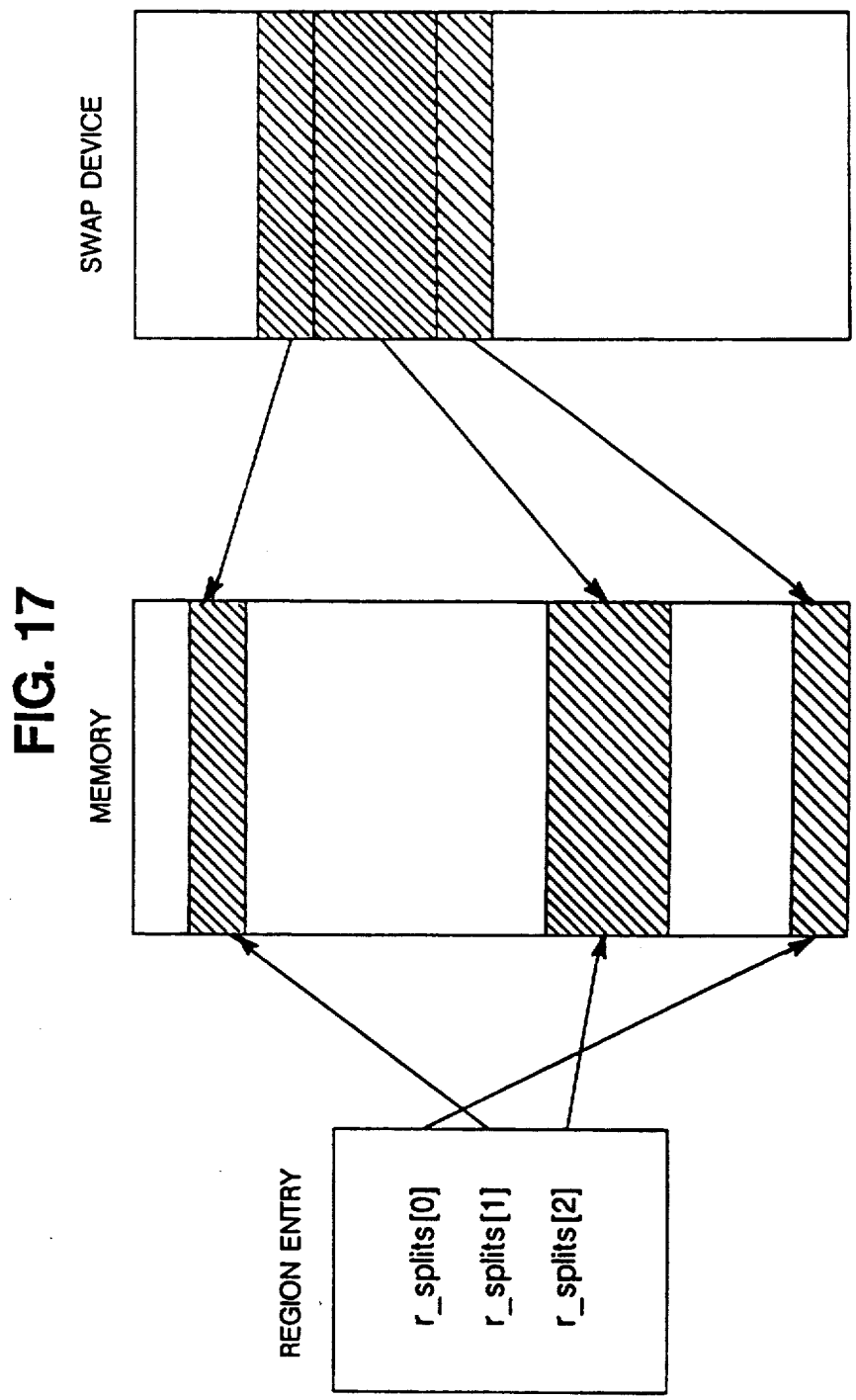
FIG. 17 is a schematic diagram showing the process of splitting memory segments.

Referring now to FIG. 17, the process of splitting memory segments will be described. The swapper is modified to take advantage of the multiple data control registers. If enough memory is available for a given data segment, but is fragmented so that contiguous space cannot be allocated for the segment, the segment may be split into multiple pieces that can be allocated. The extra control registers are used to map the splits so that the user still sees one contiguous segment.

Figure 18:
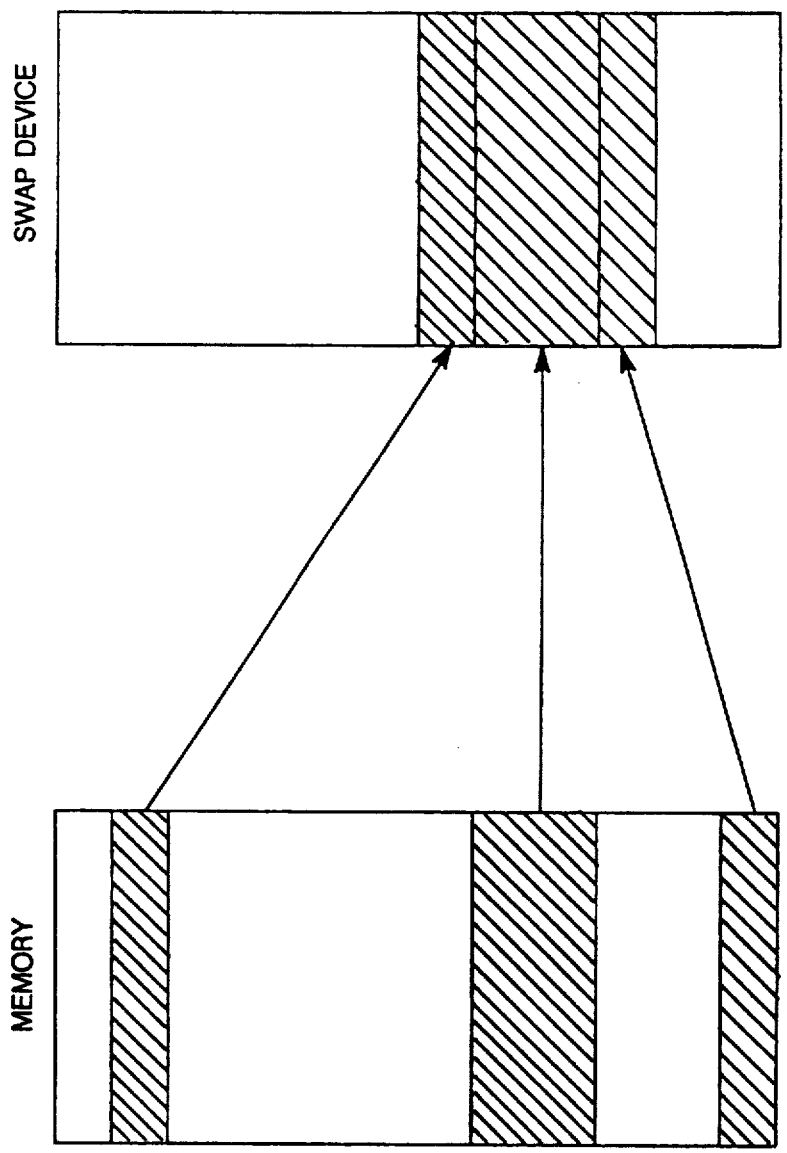
FIG. 18 is a schematic diagram showing the process of coalescing memory segments.

FIG. 18 shows the process of coalescing memory. The memory splits created above are merged back into one contiguous segment when they are swapped out. This process allows the segment to be resplit according to the configuration of memory at the time it is swapped in.

Figure 19:
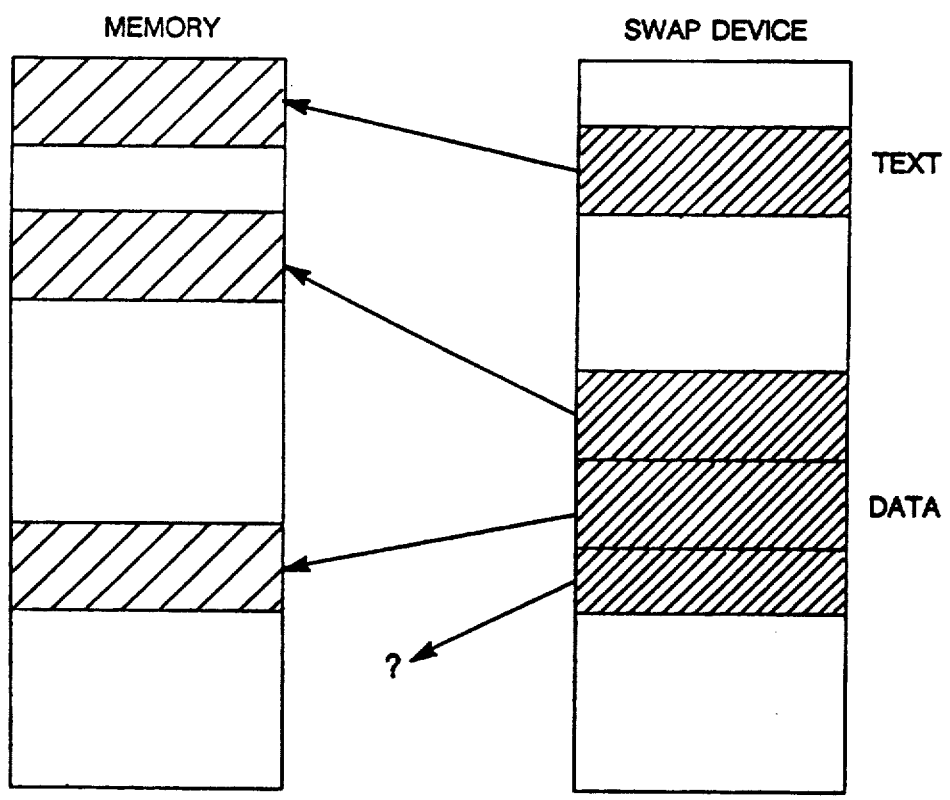
FIG. 19 is a schematic diagram showing the process of splitting memory segments.

Referring now to FIG. 19, the concept of dual memory segments is illustrated. The swapping overhead is also reduced by keeping dual images of the process as long as possible. The swap image of the process is removed when the entire process is in memory, or when swap space is needed for another process to be swapped out. Dual image processes are prime candidates for swap out because their memory image may be freed without incurring the overhead of copying it out to the swap device.

Partial swapping is accomplished in SSI/mOS by the swapper routine. Partial swapping allows a portion of a very large job to be swapped out for a smaller process that is to be swapped in. When the smaller process finishes or is swapped out, the swapped portion is returned to its original location so that the larger job can proceed.

1.4.3 Management of Secondary Memory Storage

SSI/mOS provides an assortment of simple primitives that allow applications, in conjunction with the compiler and runtime libraries, to fully use the SMS 28. SSI/mOS provides a range of support for SMS usage in: a standard file system resident on secondary memory; an extended memory functionality for exceptional users; support for virtual arrays; support for mapped files; file staging from high perforance disk to SMS; and file staging from archival storage to high performance disk.

Some applications need the SMS 28 to function like a disk with a file/inode orientation and System V interfaces. The resource manager allocates space for a file system on a per job basis. Optional disk image space is also available as are the write-through attributes that make such space useful.

Other applications need the SMS 28 to function as an extended memory. This type of large allocation access to the SMS 28 is at the library level and very fast, exposing the power of the hardware to the user. Consequently, there is a need to get away from the file/inode orientation. As an extended memory, the latency between the SMS 28 and the main memory 14 is several microseconds. Compared to disk, SMS 28 is microseconds away rather than seconds away.

A secondary memory data segment (SMDS) has been added to the SSI/mOS process model. An SMDS is a virtual address space. When a process is created, a data segment of zero length is created for it. The data segment defines some amount of area in secondary memory. Although the length of the originally issued data segment is 0, the programmer can use system calls to grow the data segment to the required size. Limits to the size of a data segment are controlled by the operating system and are site-tunable. The new system calls developed for SMS are described below in the System Calls section.

Since the SMS 28 in the preferred embodiment is volatile, that is vulnerable to system power and connection failures, users can specify a write-through to disk. The files that are specified as write-through are first transferred to the SMS 28 and then written onto disk. Secondary memory is attached to a process in the same fashion as is main memory, and operates in much the same way. The user can alter and access SMS data segments through a series of new system calls.

New versions of system break calls (i.e., the brk and sbrk calls) allow processes to dynamically change the size of the SMS data segment by resetting the process's SMS break value and allocating the appropriate amount of space. The SMS break value is the address of the first byte beyond the end of the secondary memory data segment. The amount of allocated space increases as the break value increases. Newly allocated space is set to zero. If, however, the same memory space is reallocated to the same process, its contents are undefined. SMSbrk can decrease the amount of allocated space.

One set of put/get system calls move data between the expanded SMS data segment and main memory in the normal way. A second set of put/get calls uses the Fastpath mechanism to transfer data between a buffer and an SMS data segment. Fastpath allows a data transfer to occur without the process having to give up the processor, and is used for small transfers when very low latency is required; both processes and microprocesses can transfer via Fastpath.

Mapped files are supported through the mmap system call. Since there are a limited number of base and bounds registers, this may place some restrictions on the number of shared memory segments that a program can access at one time. Otherwise, these calls are supported as defined. This is System V except for the shared segments restriction.

Figure 20:
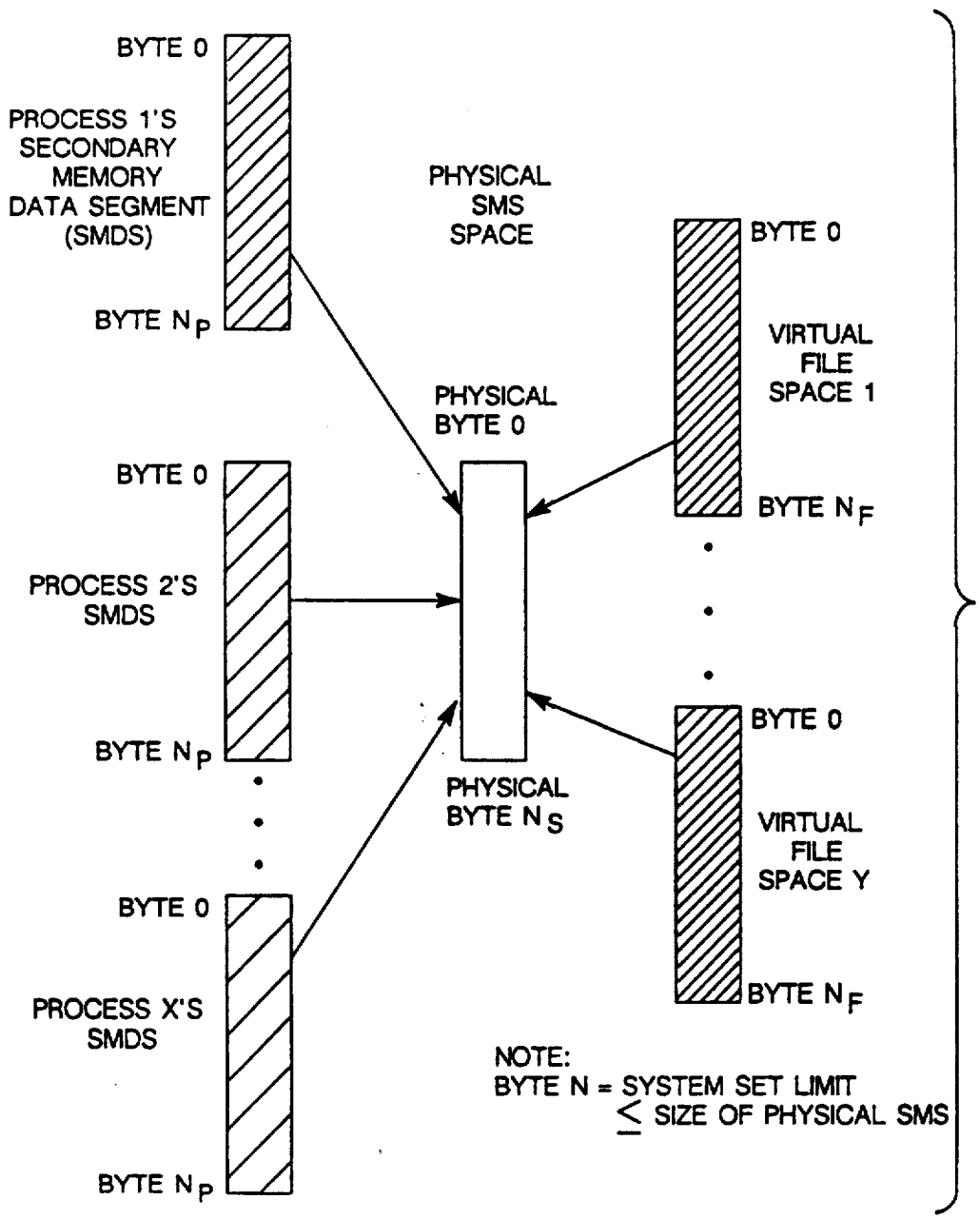
FIG. 20 is a schematic diagram showing the oversubscription of the SMS.

Because the cluster architecture of the preferred embodiment does not have a virtual memory, therefore, the process text and data segments for all jobs have to fit into memory. To do this, the present invention provides mapped files and virtual arrays. As shown in FIG. 20, use of virtual file systems allows oversubscription of the SMS 28 and keeps oversubscription manageable. Because the preferred multiprocessor system does not have hardware paging, software places a named object (an array or common block) into virtual memory. On multiprocessor systems with SMS, software pages this object from SMS. Via this mechanism, the program and the virtual array/common blocks may exceed the size of memory. If a multiprocessor system lack an SMS, paging is accomplished from a file. This is an extension to the C and Fortran languages and is non-System V.

The SMS 28 can be used to stage files. Users first stage their files to SMS, then they issue reads from SMS. For example, a file is moved from the disk subsystem into an SMS buffer. Files written to the SMS 28 from main memory 14 can be staged for archival stores into fast disk. Archival file staging is available. Data is moved from remote archival storage to the SMS, and from there to high performance disks.

1.5 Input/Output Management

Section 1.5 describes the management of input/output under SSI/mOS. This information is presented in three sections. Section 1.5.1 briefly describes the standard elements of input/output management retained in SSI/mOS. Section 1.5.2 lists those features of the cluster architecture that impose special input/output requirements. Section 1.5.3 describes additions and extensions developed within SSI/mOS to satisfy arachitectural requirements for input/output management.

1.5.1 Elements of System V Input/Output Management

System V input/output management has been retained as follows: support for the standard block and character device interfaces; support for STREAMS connections; support for standard networking protocols, specifically TCP/IP; and support for ttys through rlogin and telnet; user logins are fairly standard, but the distributed input/output architecture realistically precludes the notion of a directly connected 'dump' terminal in the preferred multiprocessor system.

1.5.2 Architectural Implications

The distributed input/output architecture of the preferred embodiment definitely places certain requirements on the way peripheral devices interact with the operating system.

The primary connection to the clusters 40 is through a 100 or 200 megabyte/sec HiPPI (High Performance Parallel Interface) channel adaptor. This adaptor serves as the interface between the cluster 40 and the ANSI standard HiPPI protocol. A special optical fiber version of the HiPPI adaptor allows peripherals to be connected in units of miles rather than feet. This adaptor is implemented according to the HiPPI optical fiber specification. Differences in adaptor requirements are handled by changes to on-board microcode rather than changes to system software.

As a result of the HiPPI channel implementation, peripheral devices have a pipe directly into main memory that is similar to a DMA component. Devices also have direct access to the multiprocessor system's global registers and operations, and they are able to directly read/write data to the SMS system. As a result, software running on peripheral devices can in most cases be considered as a logical extension of the operating system. Some implications of the input/output channel design are that peripheral device controllers have to be intelligent and programmable, and they must implement a low level HiPPI command protocol.

1.5.3 SSI/mOS Implementation of Input/Output Management

A number of enhancements are made to SSI/mOS to exploit the distributed input/output and channel architecture. For a more detailed explanation of the distributed input/output architecture for the preferred embodiment of the multiprocessor system, reference is made to the copending application entitled DISTRIBUTED INPUT/OUTPUT ARCHITECTURE FOR A HIGHLY PARALLEL MULTIPROCESSOR SYSTEM, Ser. No. 07/536,182.

A second level cache is part of the SSI/mOS buffer caching scheme. This implementation provides two levels of caching to keep a maximum amount of data in close proximity to the central processors. Level one is the System V buffer caching scheme. Level two is comprised of larger, slower buffers on the SMS. The operating system directs the cache level used by an application according to the nature of its input/output requirements. The two-level cache would be transparent to the application.

The distributed device drivers of the present invention are written so that some typical driver functions will execute out in the peripheral device controller. This model is sometimes preferable, and is made possible by the fact that peripheral device controllers have access to kernel signals, main memory, secondary memory, and global registers.

Additional elements of System V input/output systems that have been modified in the present invention to achieve parallelism by default include: STREAMS, protocol implementations, and device drivers which are all multithreaded in SSI/mOS.

The peripheral controllers in the preferred embodiment can no longer be passive devices and need to be custom designed. Device controllers need to manipulate and access operating system data in main memory. For example, an intelligent device controller will be able to process a signal instruction from the operating system, read an operating system command block in main memory, and then write completion status into the command block upon completion of the operation. The main memory address of the controller's command block is installed during system boot and initialization.

Figure 21:
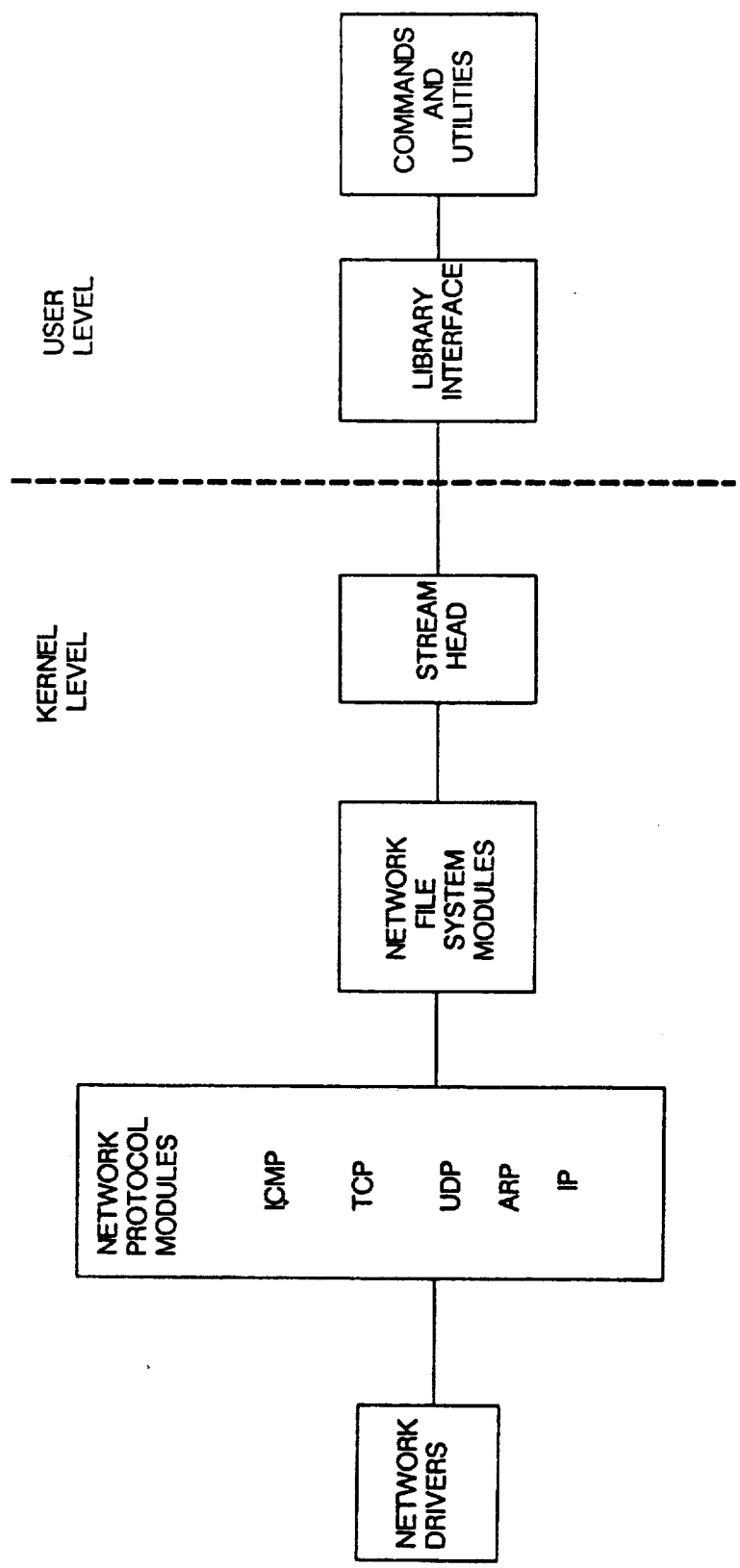
FIG. 21 is a schematic diagram showing a version of STREAMS based TCP/IP implemented using the present invention.

As shown in FIG. 21, SSI/mOS provides capabilities to build networking services using the STREAMS facilities. System V STREAMS have been multithreaded, adding multiprocessor support. The SSI/mOS version of the STREAMS product provides network capability with the network modules shown in FIG. 21. The TCP/IP code provides drivers, libraries and user commands. Host network connections are supported by linking device specific drivers to the protocol modules using STREAMS.

1.6 Resource Management and Scheduling

1.6.1 Introduction

The resource manager is a set of utilities that schedule jobs and allocate resources to them in such as way as to optimize the usage of the multiprocessor cluster 40. The resource manager allows system resources to be overcommitted without deadlocking and without aborting jobs. Jobs that do not have enough resources are held until resources become available. In this context, a job is a user's request to execute one or more processes any of which may require system resources such as tape or disk drives, memory, processors, and so on.

The resource manager has two requirements of users: (1) the amount of resources needed must be specified in advance (statistics provided by the resource manager help users estimate the required resources); and (2)

additional resources will not be requested until all currently held resources are released.

1.6.2 Role of the Network Queuing System (NQS)

Traditional supercomputer operating systems create a batch user and execution environment. Because System V operating systems create an interactive user and execution environment, their implementation on supercomputers requires the addition of support for the traditional batch user.

NQS is a suite of programs for the submission of jobs in a batch manner that can be done from any site across a network. NQS runs on a variety of hardware platforms (e.g., IBM 3090 computers, Sun workstations, DEC Vax computers). If all platforms are running NQS, then anyone at any node can submit a batch job from a terminal. In this way NQS creates a networked batch user environment that complements the System V networked interactive environment. NQS and any associated resource management support jobs that require lots of compute time and many resources. Power users will want large amounts of the machine in off hours, and if five or six power users demand 75% of the system at once, it is the function of the resource manager to make sure that each user gets what they want. And to so do in such a manner that guarantees no deadlocks. Other kinds of jobs, jobs that do not require resources above a certain level, will run in the normal System V manner.

1.6.3 Resource Categories

Private resources are not shared. Examples include: tapes, cartridges, graphics terminals, specialized imaging hardware (medical, radar, ultrasonic), and other highly specialized devices. Semi-private Resources are those such as optical disks and drives, and compact disks. Public Resources are fully shared. Examples include processor, System V file systems, disks, main memory, secondary memory, and input/output channels. The resource manager is concerned primarily with non-shared resources.

1.6.4 Resource Management

A resource database map can be allocated dynamically. The resource database is alterable on the fly, and this bit-wise database map that is a part of the OSSR 2500 is owned by the resource manager and is usable only at privileged levels. The operating system and the resource manager share the database. Either one can add or delete system resources during operation. Large sections of each disk (areas other than those required by the file system and swap area) are used like memory. Tapes, memory, processors, input/output devices and channels are allocated or de-allocated as necessary. Disk space is allocated by specific user request, rounded up to the nearest 32K block size for efficiency. Space is released as required or upon abort and the area is patterned with a constant pattern.

The only time that a job will need to be restarted is due to the physical failure of a resource, for example, when a disk or tape drive is disabled. Access failures are treated similarly, and may require rescheduling of a job. The resource manager provides for de-allocation in case any resource is temporarily unavailable.

1.6.5 Resource Scheduling

Some jobs, usually small, may be finished in minutes or a few hours. These jobs are scheduled interactively. High priority jobs, large or small, are scheduled when the user does not care how much it costs and is willing to pay any amount to get the job completed. If the user does not use the resource manager, these jobs may not run optimally. Deadline-scheduled jobs may be scheduled hours, days, or weeks in advance. This kind of scheduling works well with Dijkstra's "Banker's Algorithm," where it is known in advance the amount and kinds of resources required.

Several scheduling assumptions are used by the resource manager, including: some threads are purely computational and do not explicitly require automatic scheduling of resources, and are scheduled first; among jobs scheduled through the resource manager, shorter jobs requiring fewer resources generally run first; the largest jobs, i.e., those the scheduler postpones, run only when the system has enough resources, and smaller jobs are interleaved whenever possible; and priority of deadline-scheduled jobs increases as the deadline approaches, assuming that the deadline is reasonable.

To the degree possible, the resource manager schedules the mix of jobs that uses the maximum number of resources at all times. All jobs entered via the resource manager are tracked for both accounting and security purposes. The record keeping feature provides cost/use information on a per-user and per-job basis. The resource manager allows the user or authorized personnel to cancel or alter the status of a job, for example, to restart a job or change its priority. It also allows the system administrator to increase the priority of a job in emergency circumstances.

As described in greater detail hereinafter, a screen-orientated interface is available to help the user easily use the resource manager for scheduling jobs and for the presentation of any data requested by the user that involves his job.

1.6.6 Requirements

Using a resource manager sharply increases the performance for all jobs, especially large jobs. Therefore, the resource manager must be easy to use and have the features users need. The resource manager supports device requests in batch mode and batch jobs requiring no devices, such as processor-intensive jobs. The resource manager allows users to interact with their jobs and allows the system administrator to add or delete of resources as necessary. Subsystem databases and binary and ASCII header files that are a part of the OSSR 2500 are subsequently updated. The resource database subsystem will allow the addition or deletion of resources without interfering with the continued execution of the resource manager. Either the operator of the subsystem or the system administrator may restart, modify, prioritize jobs, or schedule controlled resources using the resource manager. The resource manager supports queue access restrictions, deadline scheduling, and networked output, where the stdout and stderr output of any request can be returned to any station. A status report of all machine operations to trace activity, for debugging, accounting, and security purposes. The resource manager also supports clearing any temporarily reserved media such as disk, CDs, memory for security.

In the preferred embodiment, the resource manager runs across all nodes, workstations, and all networked machines. If a cluster shuts down when jobs are running the processes are suspended or switched to other clusters. The user has the option, in most cases, to decide to suspend his process or to switch it to another cluster.

The resource manager can display network status and use information upon request or every five minutes. This information is logged and available to any user. Any security-sensitive thread will be listed in a protected manner or will not appear in the status report. Consistent with the common visual interface 2300, the resource manager provides a screen-oriented, visual interface. Shell scripts are an alternate means of defining the jobs for the resource manager. In the preferred embodiment, the resource manager uses the NQS-based algorithms that guarantee consistency of files across network configurations in the event of any system failure.

1.7 Network Support

Figure 22:
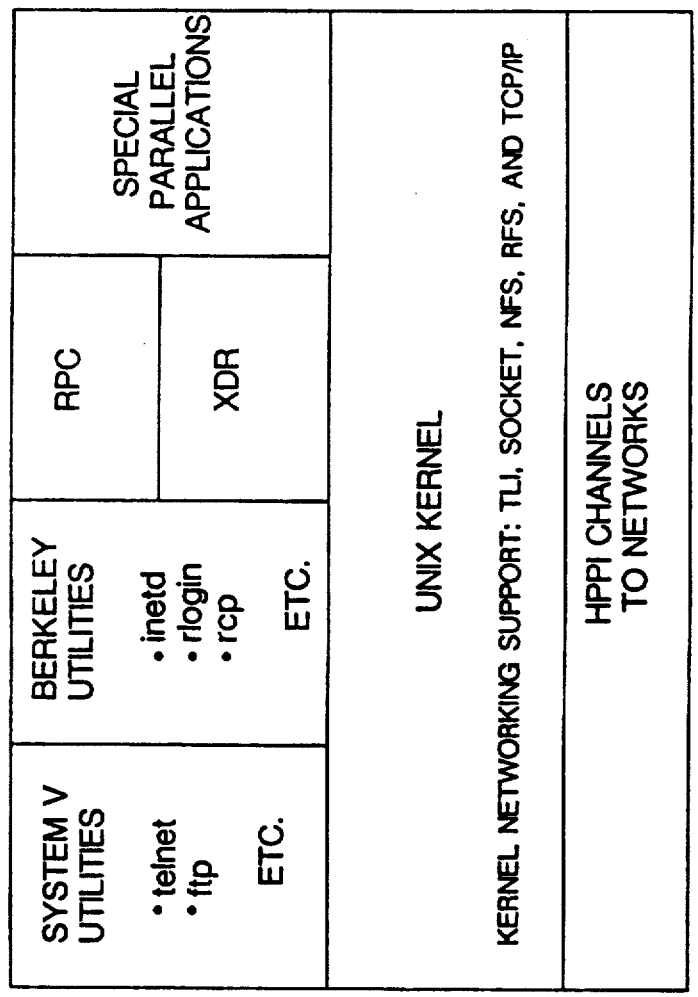
FIG. 22 is a block diagram showing the kernel networking environment and support of the present invention.

Referring now to FIG. 22, the operating system networking 2800 environment is described. The block 2820 below the System V kernel 2810 represents the various physical access methods, most of them are High Performance Parallel Interfaces (HiPPI) adapters that are data links to front end networks such as UltraNet. The blocks 2830-2870 above the kernel represent user level features and facilities which utilize System V networking. XDR module 2860 and RPC modules 2850 are included in this group. XDR module 2860 encapsulates data so it can be understood by heterogenous machines. RPC module 2850 invokes procedures on remote machines. Together, these two modules provide a facility for distributing applications in a heterogenous network environment.

Within the kernel 2810 are RFS and NFS. They provide transparent file access across a network. Both NFS and RFS come standard with AT &T Unix ® System V release 4.0. In addition to RFS, NFS, RPC, and XDR, there are the standard Berkeley networking utilities 2840 which depend upon the kernel's Berkeley Sockets facility. These include rlogin (remote login), rcp (remote copy), and inetd (the Internet demon that watches for users trying to access the preferred multiprocessor and spawns various networking services accordingly).

Block 2830 represents networking utilities which depend upon the AT&T Unix ® Transport Level Interface (TLI) library. The TLI is the main interface between user level programs and streams based networking facilities. Two of the utilities in this block are FTP (File Transport Protocol) and Telnet (the ARPANET remote login facility), both of which may also exist as Berkeley utilities and therefore run on top of the socket interface rather than the TLI interface. The network modules provide high level input/output support for the external device drivers. These modules supply the drivers with a list of transfers to perform. When the data arrives, the driver notifies the module and the data is then sent 'upstream' to the user level.

1.8 Administrative and Operator Support

The administrative and operator support in the present invention includes support for accounting, security, administrative scheduling of the multiprocessor system and support for the operators of the multiprocessor installation.

In the preferred embodiment of the present invention, there are two methods of accounting. One method of accounting is based on the time of processor assignment, using the real time clock. The second derives from a work metric calculated from the processor activity counts (memory references, instructions issued and functional unit results). Both accounting methods are needed to develop reproducible charges and to collect performance statistics that enable code optimization and system tuning. In addition to System V accounting, the present invention provides for dev/sessionlog and dev/systemlog reporting. Dev/sessionlog includes a history with accounting stamps, a unique record per login, batch run, shared image process group, and a history of shell-emitted transactions and other items of interest. Dev/systemlog includes a history with accounting stamps, unique per security level. The types of accounting stamps include: begin/end timestamp, all metrics, process name, some arguments, and the like.

Multilevel security is implemented at several levels: network security, user-level security, and administration utilities and commands to support security.

In addition to the standard administrative support available for any large computer processing system or supercomputer, the present invention provides for "fair share" scheduling and predictive, heuristic scheduling of processes to meet administratively defined utilization goals for multiprocessor system, including, input/output, memory, remote procedure call (RPC), interactive response time, and the like.

The operator environment is a superset of the user's environment as described in greater detail hereinafter. It requires standard capabilities plus display of "operator" log(s) and dynamic display replacement for "ps". Ps is a visual metaphor for multiprocessor execution or run-time environment and includes multiwindow, point and click for more or less information with "real time" refresh. The displays include: queue displays, process displays, displays for a processor in a running process, memory displays, and resource allocation tables. The queue displays include: input, swapped (and why), running, output. The processes displays include status, resources assigned, resource status fds (path, size, position, function, . . . ), cluster and processor usage, memory size, the last few sessionlog entries, the current command, the next few commands (if script, and cooperating shell), and an "operator" message area. The displays for a processor in a running process include the PC register of the processor, the processor registers (hex+ascii) and the last system call. The memory displays include user areas, system areas and system tables. The resource allocation tables have investigative access showing all open files and all connection activities.

As users to their own processes, operators require commands that provide the capability to change priorities, limits, suspend, abort, arbitrary signal, checkpoint, change memory, set sense switches, communicate with process requesting operator action or response, insert "next" command (requires cooperating shell), and insert comments in user/system log(s).

1.9 Guest Operating System Support

The present invention contains support for executing itself or other operating systems as a guest, i.e. as a user program. This capability includes the establishment of virtual processes and virtual external devices as well as facilities to emulate the trap, interrupt and exception capabilities of the preferred multiprocessor system. The guest operating system support feature takes advantage of the facilities describes in Sections 1.2.3, SSI/mOS Implementation of Processes; 1.4.3, Management of Main Memory, and 1.7, Network Support.

2.0-PARALLEL USER ENVIRONMENT

The architecture of the present invention accomplishes an integrated hardware and software system. A major part of the software system is the programming environment package of integrated development tools designed to bring the full capabilities of the clusters 40 of the preferred multiprocessor to the programmer. Referring again to FIGS. 8a and 8b, the four major components of the parallel user environment of the present invention are shown. The program management module 2100 controls the development environment for a source code file representing a software program for which parallel software code is desired. The compiler 2200 provides support for all of the features that allow for parallelism by default to be implemented in the present invention. The user interface 2300 presents a common visual representation to one or more users of the status, control and execution options available for executing and monitoring the executable code file during the time that the executable code file is executed. User interface 2300 includes a common set of visual/icon functions and a common set of command line functions and common tools for showing a dynamic view of user application program and system performance. The user interface 2300 also supports a limited subset of the online process scheduling functions to the user and reconfiguration of shared resources and system parameters in coordination with the resource manager in the operating system 1000. Finally, the debugger 2400 allows for effective and distributed debugging of parallel program code.

2.1 Visual User Interface

Referring now to FIGS. 8a and 8b, a pictorial representation of the programming environment as seen by a programmer is shown. The programming environment that comprises the visual user interface 2300 of the present invention provides for a common windowed interface to a ToolSet 2351, that is a complete set of utilities that facilitate the production of efficient, bug-free software programs. The major tools in the set are available through windowed interfaces in a desktop environment accessible on a distributed network. In the preferred embodiment, the ToolSet 2351 organizes the tools into drawers. When open, a drawer displays the set of icon for the tools it contains. Programmers may organize the ToolSet 2351 as desired and may also add their own tool icons as desired. All the tools are also available with the command line interface.

Figure 23A:
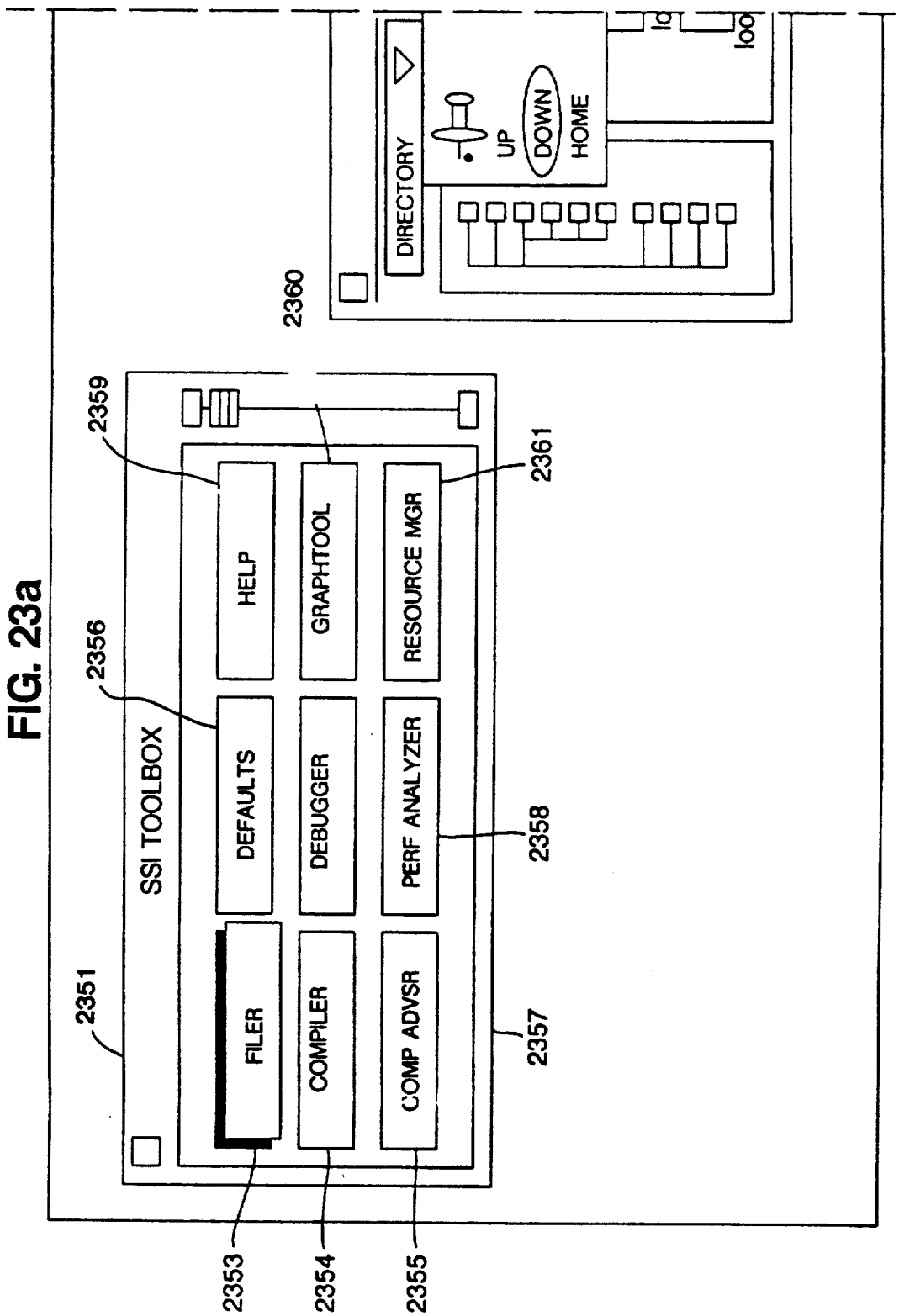
FIGS. 23a and 23b are a pictorial representation of the programming environment as seen by a programmer.
Figure 23B:
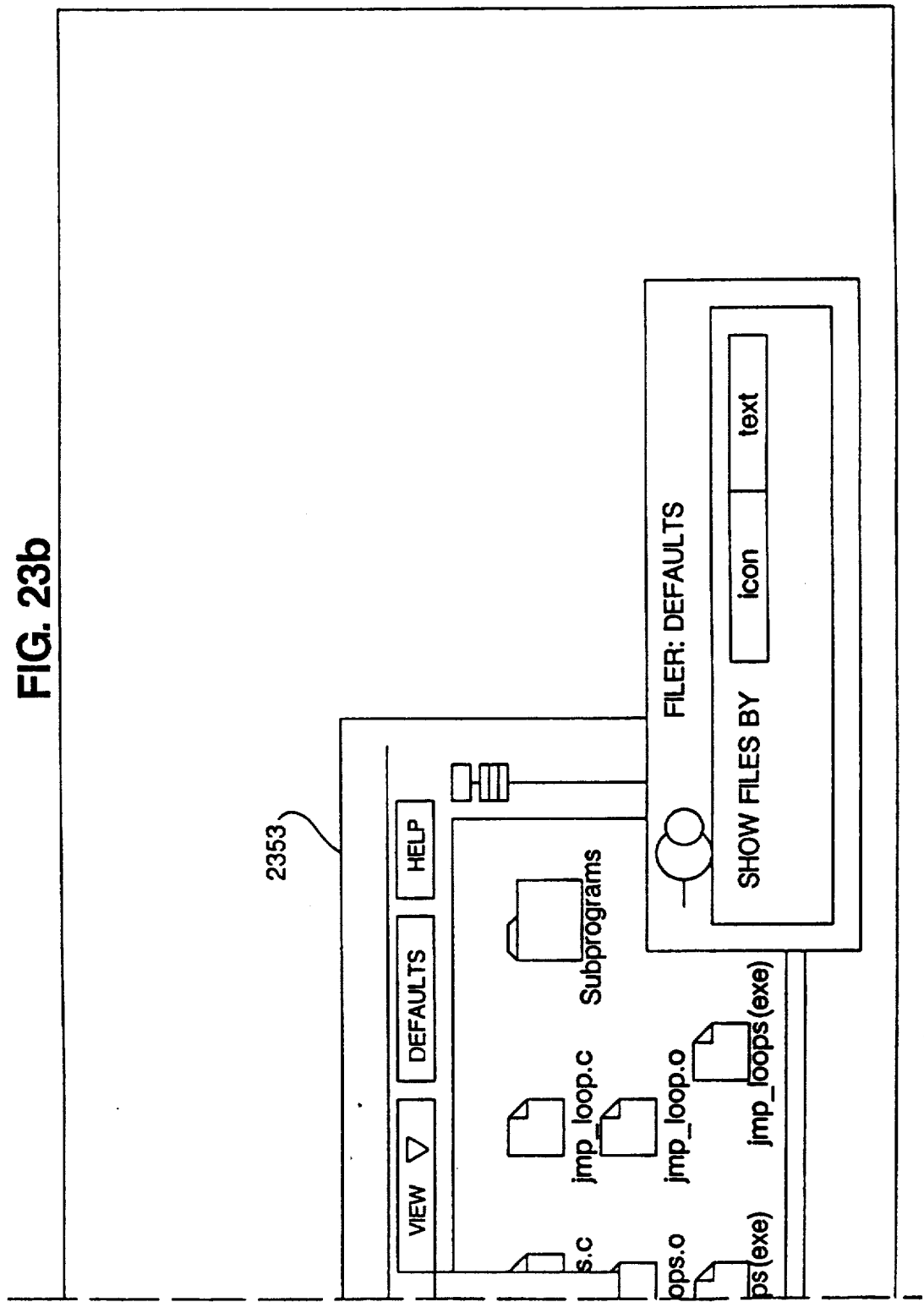

In the embodiment shown in FIG. 23, a programmer may select any of the icons representing one of the tools of the ToolSet 2351 to open a window 2352 associated with that particular tool. The Filer icon 2353 allows the programmer to see his files in icon form. The Compiler icon 2354 allows the programmer to elect compile options and compile the software program. The Compilation Advisor icon 2355 allows the programmer to interact with the compiler 2200 through an interactive interface that enables the programmer to conveniently supply additional optimization information to the module compiler 2200. The compilation advisor icon 2355 can also be used to display dependency information that is gathered by the compiler. Dependencies in a program inhibit optimization and the programmer can use the compilation advisor to study the dependencies for possible removal. The program analyzer (not shown in the figure) gathers interprocedural information about an entire program which is used to support the optimization by the compiler 2200 and to check that procedure interfaces are correct.

The Defaults icon 2356 allows the programmer to set the various defaults for the ToolSet 2351, including invoking different levels of interprocedural analysis and selecting link options. For example, the programmer can select a default option to start a text editor if there is an error during compilation, with the text editor beginning where the compilation error occurred. The programmer might also tell the ToolSet to automatically start the debugger if an error occurs during program execution.

The Debugger icon 2357 invokes the debugger 2400. The Performance Analyzer icon 2358 allows the programmer to optionally collect performance data on the execution of a particular software program. The Help icon 2359 invokes a help menu that provides online assistance and documentation for the programmer. The Graphtool icon 2360 allows the programmer to display information in graphical form. The programmer can use the CallGraph feature as described in greater detail hereinafter to control the interprocedural analysis done on a program. The Debugger icon 2357 can be used to visualize a representation of the threads that have been created in the program and to monitor the processes and processors that are executing the program. An assembler tool (not shown) enables the programmer to use a symbolic language to generate object code. Finally, the Resource Mgr icon 2361 allows the programmer to identify the system resources that will be required by a software programmer. This information is used by the operating system 1000 as previously described.

A programmer can also use a command line interface to perform the activities without the using the icons for ToolSet 2351.

After editing a program, the programmer can compile, link, and then execute a program by selecting the appropriate icon. The programmer may tailor the ToolSet 2351 to his or her particular needs. The ToolSet 2351 builds on existing System V utilities such as the macro processor and text editors. The ToolSet also allows the programmer to create separate input windows and output windows for the program. This is useful when a program generates a large amount of output and the user needs to see the program input. Traditionally, missing procedures are not detected until a program is linked. The programmer can use the Program Analyzer (not shown) to determine if all procedures are available before trying to link the program.

Figure 24:
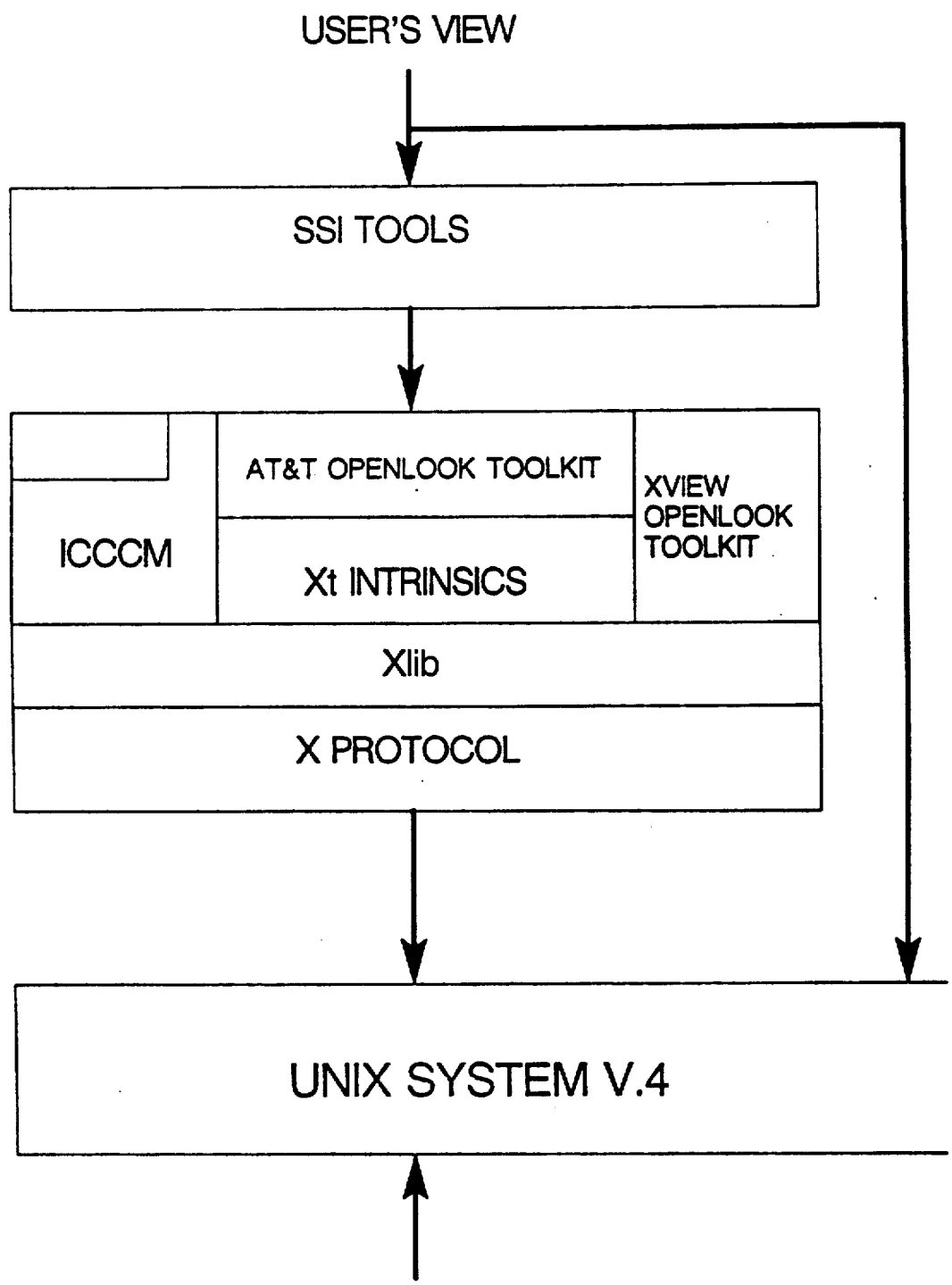
FIG. 24 is a simplified block diagram of the preferred design of the ToolSet shown in FIG. 23 as implemented on top of present software.

Referring now to FIG. 24, the preferred design of the ToolSet 2351 as built on top of standard software is shown. The ToolSet 2351 features are implemented in an OPEN LOOK-style user interface based on the X-Windows System available from MIT. The parallel user environment as implemented through the ToolSet 2351 is integrated according the InterClient Communication Convention Manual (ICCCM) specification with a limited number of extensions that are described elsewhere.

2.2. Program Management

The program management module 2100 controls modifications to source code files that comprise a software program. The software program may result in either serial or parallel software code. A fine level of control of modifications to source code files is desirable for an efficient development environment. This is especially true for large source code programs. For example, every time a one-line change is made to a source code program, it would be very inefficient to recompile and relink the entire source code program. The program management module 2100 interacts with the compiler 2200 and the IPA 2700 to determine which procedures in the source code have been changed and/or affected by a change and, as a result, which procedure will need to be recompiled, reoptimized and/or relinked. In this sense, the program management module 2100 is similar to the make utility in System V except that the control of recompilation is on the procedure level instead of on the file level.

Interprocedural optimization introduces dependencies among procedures and makes minimum recompilation a concern. For example, the module compiler uses information about procedure B when compiling procedure A. Later, procedure B is modified and recompiled. Does module A also need to be recompiled? The compilation system keeps information about procedure dependencies and recompiles procedure A only when needed. Recompiling only the necessary set of procedures saves time.

The programmer can use the interprocedural assembler support tool of the program management module 2100 to add interprocedural information about assembly language programs. This information includes the number and type of formal parameters and the local use and definition of formal parameters and global variables.

The program composer of the program management module 2100 aids a programmer in maintaining different versions of a program. As discussed above, use of interprocedural information for optimization introduces dependencies among procedures. To generate correct executable programs, the correct versions of all procedures must be linked into that program. This introduces the need to uniquely identify different versions of a procedure. The program composer makes this version control available to the programmer for the maintenance of different versions of a program.

2.3 Compiler

Referring now to FIG. 25a, the compiler 2300 of the present invention will be described. A plurality of front-ends modules interface the compiler 2300 with a variety of presently available programming languages. The preferred embodiment of the compiler 2300 provides a C front-end 2701 and a Fortran front-end 2702. The front ends 2701 and 2702 generate a representation of the source code in a single common intermediate language referred to as HiForm (HF) 2703. The HF 2703 is user by the optimizer 2784 and the code generator 2705. The optimizer 2704 performs standard scalar optimizations, and detects sections of code that can be vectorized or automatically threaded and performs those optimizations. FIG. 25b is a pictorial representation of a common user interface to the compiler 2300.

2.3.1 Front Ends

The C compiler front-end 2701 is based on the ANSI X 2.159-1989 C language standard. Extensions to the C compiler front-end 2701 provide the same functions to which System V programmers are accustomed in other C compilers. Additional extensions, in the form of compiler directives, benefit CPU-intensive or large engineering/scientific applications. The C compiler front-end 2701 performs macro processing, saving the definitions of macros for debugging.

The Fortran compiler front-end 2702 is based on ANSI Fortran 77 and contains several extensions for source compatibility with other vendors' Fortran compilers. All extensions can be used in a program unless there is a conflict in the extensions provided by two different vendors.

Because the C and Fortran compilers front-ends share the optimizer 2704 and back end, the programmer may easily mix different programming languages in the same application. Compiler front-ends for additional languages can conveniently be added to the compiler 2200 and will share the optimizer 2704 with existing compiler front-ends.

2.3.2 Parsing

Parsing determines the syntactic correctness of source code and translates the source into an intermediate representation. The front ends parse the source code into an intermediate language HiForm (HF). The parsers in the present invention utilize well known methods of vector parsing tables, including optimized left-right parsing tables specifically adapted for the preferred multiprocessors system executing the software architecture of the present invention.

2.3.3 HiForm (HF) Intermediate Language

The objective of the front-ends 2701 and 2702 is to produce a representation of the source code for a software program in a common, intermediate language referred to as HiForm (HF). For a more detailed description of the HF language, reference is made to Appendix A which sets forth all of the HF language statements, a copy of which is attached hereto and hereby incorporated in the present application.

One of the central components of HF is the Definition Use Dependencies (DUDes). Definition-use information relates a variable's definition to all the uses of the variable that are affected by that definition. Use-definition information relates a variable's use to all the definitions of the variable that affect that use. Definition-definition information relates a variable definition with all definitions of the variable that are made obsolete by that definition. The present invention incorporates definition-use, use-definition and definition-definition information for single and multiple words variables, equivalenced variable, pointer and procedure calls (including all potential side effects) into a single representation (DUDes) that is an integral part of the dependence analysis done for vectorization and multithreading. For a more detailed description of the DUDe data structures, reference is made to Appendix B which sets forth the definitions for the DUDe data structures, a copy of which is attached hereto and hereby incorporated in the present application.

2.3.4 Optimizer

The optimizer 2704 improves the intermediate HF code 2703 so that faster-running object code will result by performing several machine-independent optimizations. The optimizer 2704 performs aggressive optimizations, which include automatic threading of source code, automatic vectorization of source code, interprocedural analysis for better optimizations, and automatic in-lining of procedures.

The optimizer 2704 performs advanced dependence analysis to identify every opportunity for using the vector capabilities of the preferred multiprocessor system. The same dependence analysis is used to do multithreading, which makes it possible to concurrently apply multiple processors to a single program. The optimizer also applies a wide range of scalar optimizations to use the scalar hardware in the most efficient manner. Scalar loop optimizations, such as strength reduction, induction variable elimination, and invariant expression hoisting are performed on loops that cannot be vectorized or automatically multithreaded. Global optimizations are performed over an entire procedure. They include: propagation of constants, elimination of unreached code, elimination of common subexpressions, and conversion of hand-coded IF loops to structured loops. In-lining of procedures automatically pulls small, frequently used procedures inline to eliminate procedure call overhead.

The process of translating the intermediate HF code to machine dependent instructions also performs machine-dependent optimizations. These optimizations attempt to make optimum use of registers, such as keeping the most commonly used variables in registers throughout a procedure. Other optimizations are as follows. The instruction scheduler seeks to simultaneously use the multiple functional units of the machine and minimize the time required to complete a collection of instructions. Linkage tailoring minimizes procedure call overhead. Post-scheduling pushes back memory loads as early as possible and performs bottom loading of loops. Loop unrolling duplicates the body of the loop to minimize loop overhead and maximize resource usage.

Optimization is a time- and space-intensive process, even when using efficient algorithms. Selected parts of optimization may be turned off to provide some of the benefits without all of the cost. For example, performing vectorization does not require performing scalar global optimization. However, without the global transformation, some opportunities for vectorization may be missed. Or, in situations where it is necessary to have quick compilation, the optimization phase may be skipped by using a command line option. However, the execution time of the user's program will be greater.

2.3.4.1 Scalar Optimizations

Figure 26A:
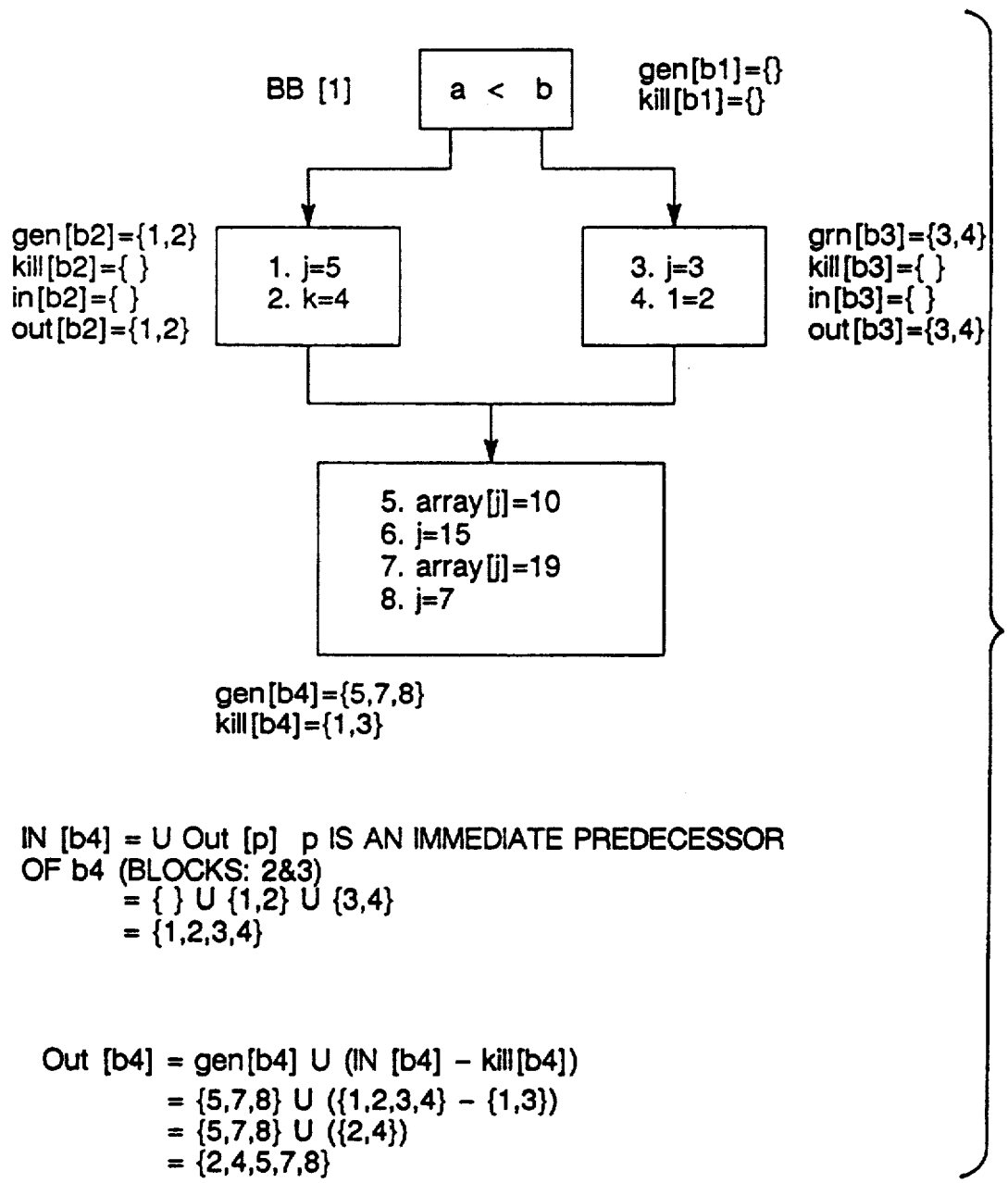
FIGS. 26a and 26b are functional and logical representations of an example of the basic unit of optimization in the present invention referred to as a basic block.
Figure 26B:
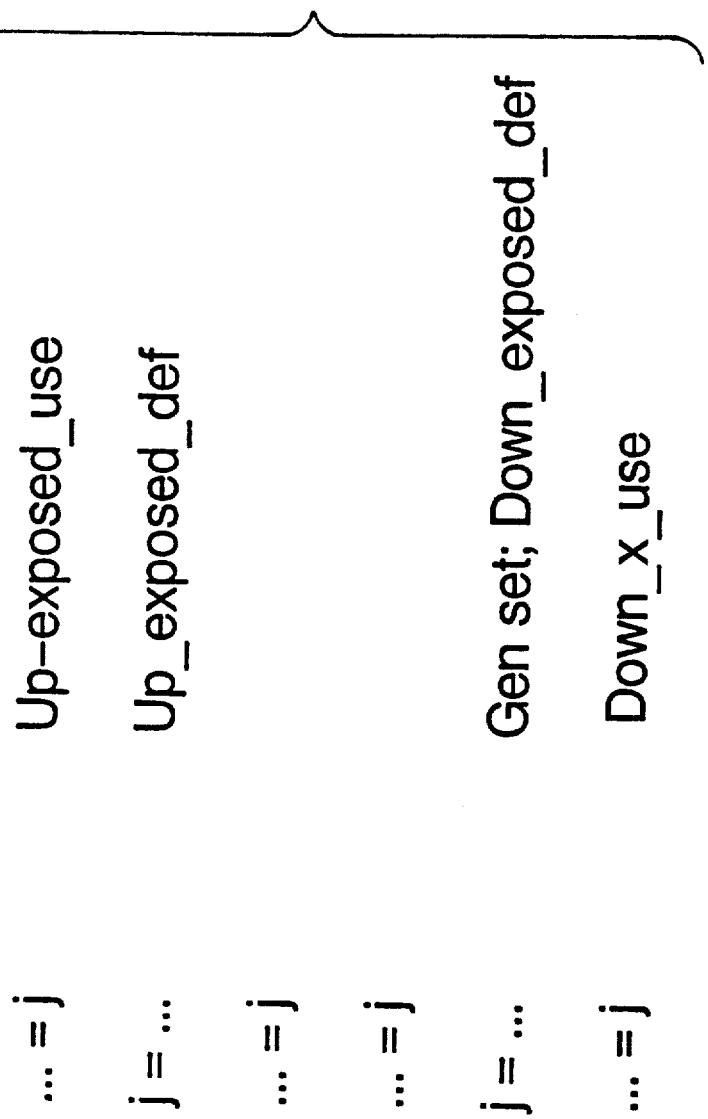

Scalar optimization reduces execution time, although it does not produce the dramatic effects in execution time obtained through vectorization or automatic multithreading. However, the analysis and transformation of scalar optimization often increase the effectiveness of vectorization and automatic multithreading. The basic unit of scalar optimization is called the basic block as shown in FIGS. 26a and 26b. The Basic Block is a sequence of consecutive statements in which flow of control enters at the beginning and leaves at the end without halt or possibility of branching except at the end. This segment of code can be entered at only one point and exited at only one point. Local (or basic block) optimizations are confined to a basic block. Global optimizations have a scope of more than one basic block.

2.3.4.2 Control Flow Graph

Figure 27A:
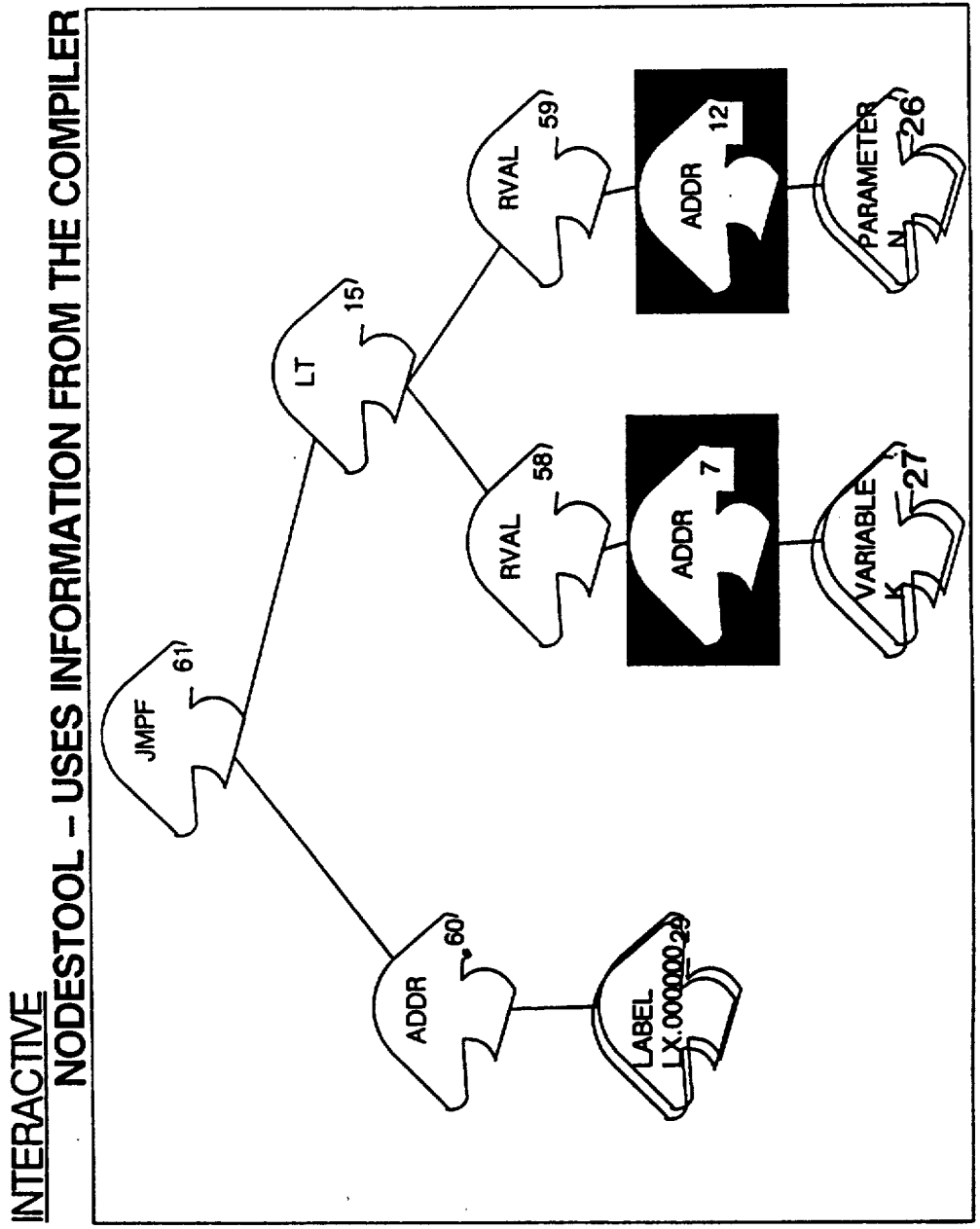
FIGS. 27a and 27b show two examples of how control flow can be used to visualize the flow of control between basic blocks in the program unit.
Figure 27B:
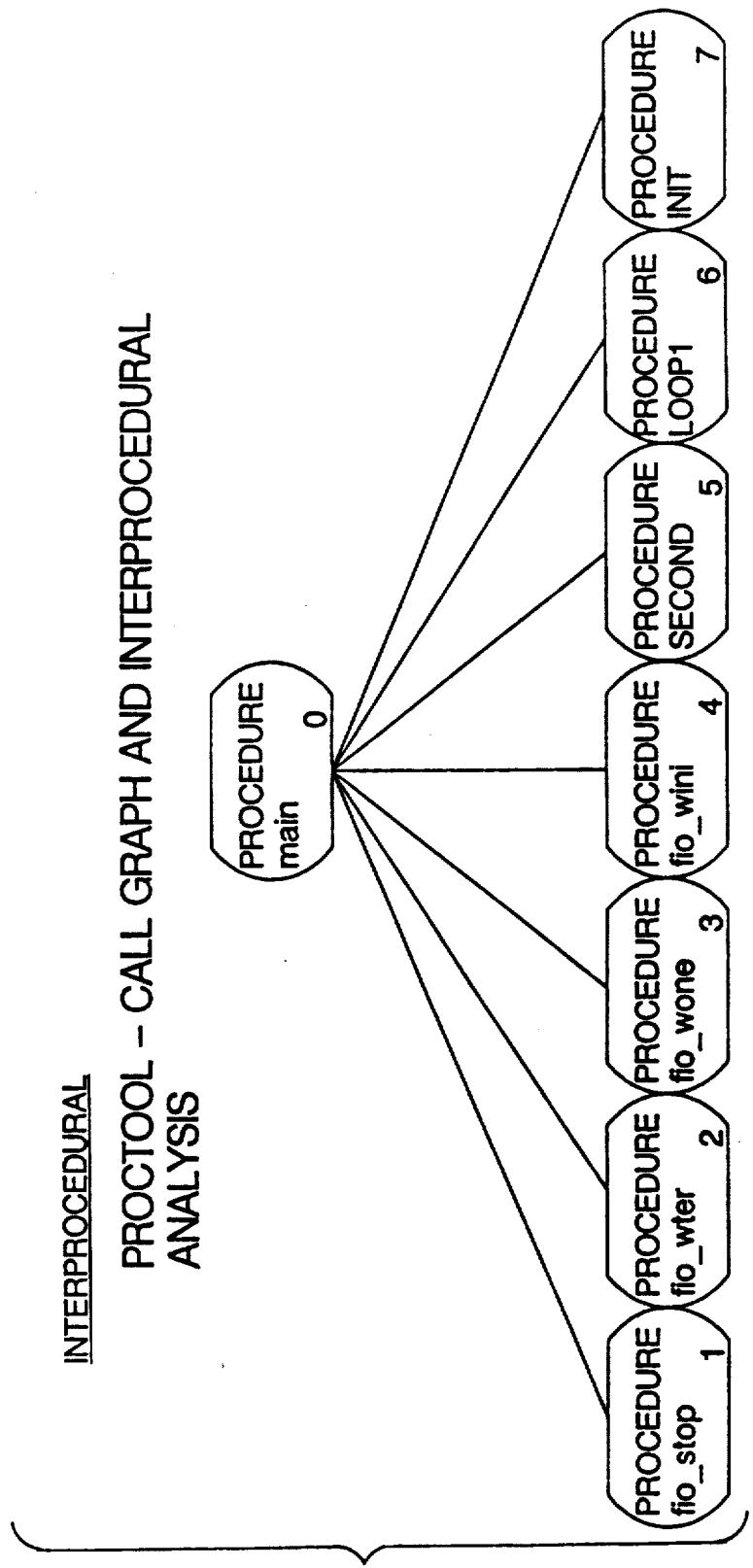

A control flow graph indicates the flow of control between basic blocks in the program unit. Once the basic blocks in the program have been formed and the control flow connections have been indicated in the control flow graph, further optimization processing can take place. FIG. 27a is a pictorial representation of a control statement in HiForm and FIG. 27b is the call graph of a program.

2.3.4.3 Local Optimizations

The local optimizations that are performed by the optimizer 2220 are listed. The order of these optimizations does not imply an implementation order.

Common Subexpression Elimination-If there are multiple identical expressions whose operands are not changed, the expression can be computed the first time. Subsequent references to that expression use the value originally computed.

Forward Substitution-If a variable is defined within the block and then referenced without an intervening redefinition, the reference can be replaced with the right-hand side (RHS) expression of the definition.

Redundant Store Elimination-If a variable is defined more than once in a basic block, all but the last definition can be eliminated.

Constant Folding-If the values of the operands of an expression are known during compilation, the expression can be replaced by its evaluation.

Algebraic Simplifications-There are several algebraic simplifications; for example, removing identity operations, changing exponentiation to an integer power to multiplies. Other simplifications (e.g., changing integer multiplies to shifts and adds) are performed by the code generator.

2.3.4.4 Global Optimizations

Like local optimization, a brief description for the global optimizations performed by the optimizer 2220 is set forth. Again, an implementation order is not implied by the order given below.

Transformation of IF Loops to HF Loops-The control flow graph is analyzed to find loops constructed from IF and GOTO statements. If possible, these loops are transformed into the same HiForm representation as DO loops have. This is not a useful scalar optimization, per se. It increases the opportunities for vectorization and automatic multithreading.

Constant Propagation-If a variable is defined with the value of a constant, then when that variable is referenced elsewhere in the program, the value of the constant can be used instead. This is, of course, only true on paths on which the variable has not been redefined.

Dead Store Elimination-If a variable is defined, but it is not an output variable (e.g., a dummy argument (formal parameter), common variable, or saved variable), its final value need not be stored to memory.

Dead Code Elimination-Code, the result of which is not needed, may be eliminated from the intermediate HF text. This can be as little as an expression or as much as a basic block.

Global Common Subexpression Elimination-Global common subexpressions are like local common subexpressions except the whole program graph is examined, rather than a single basic block.

Loop Invariant Expression Hoisting-An expression inside a loop whose operands are loop invariant may be calculated outside the loop. The result is then used within the loop. This eliminates redundant calculations inside the loop.

Induction Variable Strength Reduction-Induction variables, whose values are changed in the loop by a multiplication operation, may sometimes be calculated by a related addition operation. Generally, these kinds of induction variables are not found in the source code, but have been created to perform address calculations for multidimensional arrays.

Induction Variable Elimination-If there is an induction variable I within a loop and there is another induction variable J in the same loop and each time J is assigned, J's value is the same linear function of the value of I, it is often possible to use only one induction variable instead of two. Again, this kind of situation most frequently arises due to address calculation.

2.3.4.5 Vectorization

During vectorization, loops are analyzed to determine if the use of vector instructions, rather than scalar instructions, may change the semantics of the loop. If there is no change to the loop's semantics, the loops are marked as vectorizable. Some obvious constructs make loops nonvectorizable, such as calls with side effects and most input/output operations. Subtle, less obvious constructs are recurrences, which make loops nonvectorizable. A recurrence occurs when the computation of the value of a data item depends on a computation performed in an earlier iteration of the loop.

The term "dependence" is used in the vectorization and automatic multithreading sections. A dependence is a constraint on the order of two data item references (use or definition). When two elements of the same array are referenced, the subscripts must be analyzed to determine dependence.

Statement Reordering-Certain recurrences may be eliminated if the order of the statements in the loop is changed. Statements may be reordered only if the change maintains the loop's semantics. The loop shown in FIG. 26b may be vectorized if the statements are reordered.

Loops with IF statements-The presence of one or more IF statements in a loop shall not by itself inhibit vectorization of the loop. (Note that this includes loops with multiple exits.) The user will be able to inform the compiler that the IF construct can be more efficiently run with masked, full VL operations, or compressed operations.

Partial Vectorization/Loop Splitting-Loops that cannot be vectorized as a whole can sometimes be split into several loops, some of which can be vectorized. Loop splitting is the term often used when entire statements are moved into a vector or scalar loop. Partial vectorization is the term generally used when parts of statements are moved into the vector or scalar loop.

Loop Reordering-Within a loop nest, loops (i.e., DO statements) may be reordered to provide better performance. The dependence of a particular subscript expression is due to a certain loop. An innermost loop may have a recurrence and be unvectorizable, but if an outer loop is moved inward, the recurrence may disappear, allowing vectorization. Of course, all dependencies must be preserved when loops are reordered.

Loops may also be reordered when an inner loop has a short vector length, or to allow better vector register allocation. This last reason is getting rather machine-dependent, but will provide significant performance improvements on loops like a matrix multiply.

Although a reduction is a recurrence, these may be vectorized to some extent. It is really handled by partial vectorization, but deserves special mention because it's been a special case to so many compilers.

2.3.4.6 Automatic Multithreading

Analysis of loop dependencies determines if a loop must be run sequentially or not. If a loop does not have to be run sequentially, it can be equally well run using vector instructions or multiple processors, although synchronization may be required when multiple processors are used.

Vectorization, rather than automatic multithreading, will be chosen for inner loops because the loop will execute faster. An outer loop of a vector or a scalar loop will be autothreaded if the dependence analysis allows it and there seems to be enough work inside the loop(s). Exactly how much is enough is dependent on the loop and the automatic multithreading implementation. The faster the processes can be created, the more loops that will benefit from automatic multithreading.

2.3.4.7 Intrinsic Functions

This section sets forth the functional specification for the Intrinsic Functions Library, a set of routines that are "special" to the compiler. Code for some of these routines are generated inline by the compiler, others are called with parameters in registers, still others may be called with the standard linkage conventions. For access from Fortran, any one of the intrinsics is available from Fortran simply by making a call. For access from C, any of the intrinsics is available from C through the directive: #pragma ssi intrinsic (name), where name is the specific name of the desired intrinsic. It will be noted that the names of many of the standard C mathematical functions agree with the specific names of intrinsics. In all such cases, the C math function and the corresponding intrinsic are implemented by the same code sequence, so identical results will be obtained whether the C math function or the intrinsic is called. Appendix C contains a list of the primary intrinsics that are utilized in the present invention, a copy of which is attached hereto and hereby incorporated in the present application.

2.3.4.8 Register Assignment and Instruction Scheduling Integration

Integration of register assignment and instruction scheduling is also available as an optimization. The instruction scheduler notes when the number of available registers drops below a certain threshold, and schedules instructions to increase that number of registers. This is done by looking forward in the resource dependence graph and picking the instruction sequence which frees the most registers.

The instruction scheduler tries to reorder the instruction sequence in order to maximize the usage of the various functional units of the machine. Blindly chasing this goal causes the scheduler to lengthen the lifetimes of values in registers, and in some cases, causes a shortage of registers available for expression evaluation. When the number of free registers available reaches a low threshold, the instruction scheduler stops reordering to maximize pipeline usage and begins to reorder to free the most registers. This is done by examining potential code sequences (as restricted by data dependencies) and choosing sequences that free the greatest number of registers.

The instruction scheduler and the look ahead scheduler described in Section 2.3.4.9 also use the mark instructions of the preferred embodiment of the processor to schedule work to be done during the time that the processor would otherwise be waiting for a synchronization to occur. Unlike prior art schemes for marking data as unavailable until a certain event occurs, the Data Mark mechanism of the preferred embodiment separates the marking of a shared resource 12 (mark or gmark) from the wait activity that follows (waitmk). This separation allows for the scheduling of non-dependent activity in the interim, thereby minimizing the time lost waiting for marked references to commit. For a more detailed description of the preferred embodiment of the Data Mark mechanism, reference is made to the previously identified parent application entitled CLUSTER ARCHITECTURE FOR A HIGHLY PARALLEL SCALAR/VECTOR MULTIPROCESSOR Ser. No. 07/459,083.

2.3.4.9 Look Ahead Scheduling

Vector instructions are scheduled according to their initiation times while scalar instructions are scheduled with respect to their issue times. Even though a vector instruction may issue immediately, the scheduler may delay its issue to minimize the interlocks caused by the init queue.

In the preferred embodiment of the processor 10 as described in greater detail in the previously identified, co-pending application entitled SCALAR/VECTOR PROCESSOR Ser. No. 07/536,409, vector instructions can be issued before a functional unit for the vector instruction is available. After a vector instruction is issued, instructions following it can be issued. A vector instruction that has been issued is put into queue until it can be assigned to a functional unit. The instructions in the "init queue" are assigned to a functional unit on a first in, first out basis. When the instruction is assigned to a functional unit, it is said to be initialized. An instruction may be held in the init queue due to a variety of hardware interlocks. Once the queue is full, no more vector instructions can be initialized to that functional unit. The vector instruction scheduler recognizes the depth of the initialization queue and the interlocks that may cause the instruction to hold initialization and delays the issue of a vector instruction if the vector instruction cannot be initialized on a functional unit until it can initialize without delay.

2.3.4.10 Pointer Analysis

Pointer analysis is performed for vectorization and parallelization dependence analysis of all forms of pointers, including those within a structure or union; as well as global pointers, subroutine call side effects on pointers, non-standard pointer practice, and directly/indirectly recursive pointers. Pointers are a type of object that is used to point to another object in a program. Dereferencing a pointer references the object to which the pointer points. In the most general case, the dereference of a pointer can reference any object in the program. Dependence analysis for vectorization and parallelization requires information about what objects are being referenced (typically within a loop). Without information about the objects to which a pointer points, the dereference of a pointer must be considered a reference to any object and thus inhibits vectorization and parallelization because of the dependence information is imprecise. Pointer analysis attempts to determine which object or objects a pointer points to so as to provide more precise information for dependence analysis.

2.3.4.11 Constant Folding

Figure 28A:
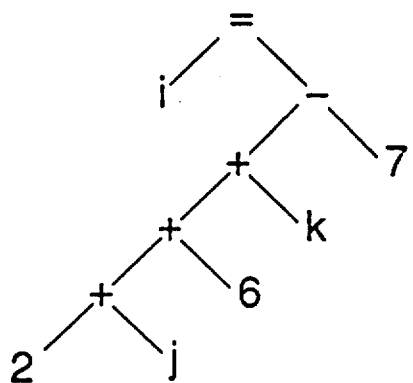
FIGS. 28a, 28b, 28c, 28d and 28e are tree diagrams of the constant folding optimization of the compiler of the present invention.
Figure 28D:
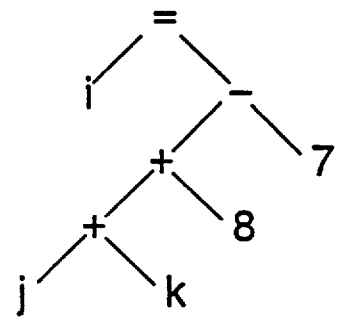
Figure 28B:
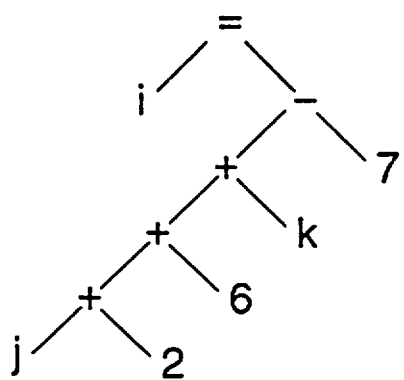
Figure 28E:
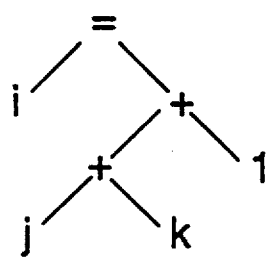
Figure 28C:
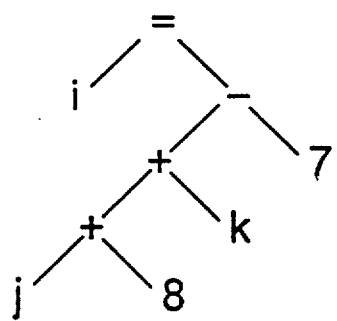

Constant folding and algebraic simplification with intrinsic function evaluation is also performed by the present invention. Constant folding and algebraic simplification are done together so that expressions such as $5*(x+12)$ are simplified and folded to $5*x+60$. Intrinsic functions involving constants are also simplified. The invention for the constant folding and algebraic simplification relies on the internal representation of the compilation unit which is being compiled (HiForm or HF). This internal representation represents program statements and expressions as trees and potentially as DAGs (directed acyclical graphs). The constant folder and algebraic simplifier are combined into a single module, which runs down the tree or DAG using recursive descent, and works bottom up, folding each expression as it rewinds itself back up the root of the statement/expression. As an example, the statement: $i=2+j+6+k-15$, would be represented in tree form as (root of the tree at the top) as shown in FIG. 28a. The tree would be algebraically simplified/folded as shown in FIGS. 28b-28e.

Some of the unique things that are simplified/folded by this optimization pass are that all expressions and operators written in 'C' or 'FORTRAN77' which involve constant arguments are folded and many algebraic simplifications are performed. Appendix C contains a listing of the intrinsics which are folded/simplified: This gives the front-ends the added flexibility of allowing all of these potentially folded operators to appear in statements or declarators where a constant expression is required (e.g. data statements, parameter statements, auto initializers, etc.).

As an example, the expression $i=2+j+6+k-7$, can be represented in the tree-form shown in FIG. 21a. The expression represented by the tree can be subjected to the algebraic simplification and constant folding illustrated in FIGS. 21b-21f. First, the leaf expression $2+j$ is transposed to $j+2$ (algebraic simplification using the commutative law), giving the tree shown in FIG. 21b. Next, the expression $j+2+6$ is changed to $j+8+k$ is changed to $j+k+8$ (algebraic simplification using the commutative law), giving the tree shown in FIG. 21d. Then the expression $j+k+8-7$ is changed to $j+k+1$ (constant folding), giving the tree shown in FIG. 21e. Since there are no further opportunities for algebraic simplification or constant folding, the tree shown in FIG. 21e is the final form.

2.3.4.12 Path Instruction

The scheduler estimates issue, init, and go times of all vector instructions. It inserts a "path" instruction before a vector instruction which will normally dependent init on one functional unit but will have an earlier go on another unit if it doesn't dependent init on the first unit. The architecture of the processor 10 has multiple functional units of the same kind, as explained in greater detail in the previously identified co-pending application entitled SCALAR/VECTOR PROCESSOR Ser. No. 07/536,409. When a vector instruction is issued and that instruction can execute on more than one functional unit, the vector instruction is normally initialized on the functional unit that least recently initialized a vector instruction. The path instruction will steer a vector instruction to initialize on a particular functional unit. The vector schedular inserts a path instruction when it determines that a vector instruction will normally dependent initialize on one functional unit but would actually start earlier on another functional unit and therefore should be steer to that latter functional unit.

2.3.4.13 Variable to Register Mapping

Ranges during which the value of a variable is kept in a register (as opposed to the memory location of the variable) are maintained by the compiler for use by the debugger. This provides the debugger with the location of the current value of a variable. In each basic block in a procedure a variable is assigned to at most one register. For each basic block the compiler keeps a list (logically) of variables and associated registers. This information is generated as part of the local register allocation phase of the compile and is kept for the debugger.

2.3.4 Interprocedural Analysis

When the compiler is processing a procedure, there may be calls to other procedures. In the traditional software environment, the compiler has no knowledge of the effects of these other (or called) procedures. Without such knowledge, the compiler is forced to assume the worst and inhibit many optimizations that are safe. Interprocedural analysis (IPA) is the collection and analysis of procedure information. The results of this analysis allow the compiler to optimize across called procedures. Certain optimizations can benefit from interprocedural analysis. With the use of IPA information, the number of instances where an optimization can be applied should be increased. The optimizations that can benefit from IPA include: common subexpression elimination, forward substitution, redundant store elimination, constant folding, constant propagation, dead code elimination, global common subexpression elimination, vectorization and automatic multithreading.

In addition, for each procedure in a program, IPA collects a list of defined or used global variables and counts how many times each variable is defined or used. IPA sums the number of defines and uses of the global variables and sorts them into the order of most frequent use. The most frequently used variables can then be allocated to L registers. The registers for a called procedure are offset from the calling procedure to reduce the number of register saves and restores in a procedure call.

There are two types of interprocedural analysis that are well known in the prior art, exhaustive and incremental. For exhaustive analysis, the call graph is formed from information in the object code file files and analyzed. This is the "start from scratch" analysis. For incremental analysis, the call graph and analysis are assumed to exist from a previous link of the program, and a small number of modified procedures are replaced in the call graph. This is the "do as little work as possible" analysis.

In the traditional System V environment, a programmer can modify a procedure, compile, and link a program without having to recompile any other procedures, since no dependencies exist between procedures. In an IPA environment, dependencies exist between procedures since procedures are basing optimizations upon knowledge of how called procedures behave. Hence when a called procedure is modified and recompiled, a calling procedure may also need to be recompiled. This problem is solved by recompiling a procedure when any of the procedures it calls has changes in its interprocedural information.

2.3.5 Compilation Advisor

The compilation advisor 2340 as shown in FIG. 23 functions as an interface between the programmer and the module compiler. It allows the module information compiler to ask the programmer optimization-related questions. The module compiler identifies the information that it needs and formulates questions to ask the programmer. The module compiler saves these questions so the programmer can address them through the compilation advisor 2340. The compilation advisor 2340 relays the programmer's answer back to the module compiler.

A second role of the compilation advisor 2340 is displaying dependence information so the programmer can attempt to eliminate dependencies. Dependencies among expressions in a program inhibit vectorization and parallelization of parts of the program. Eliminating dependencies enables the module compiler to generate more efficient code. When there is no transformation that the compiler can do to eliminate a dependence, the programmer may be able to change the algorithm to eliminate it.

2.4. Debugger

The debugger 2400 is an interactive, symbolic, parallel debugger provided as part of the parallel user environment. The debugger 2400 contains standard features of debuggers that are commonly available. These features enable a programmer to execute a program under the control of the debugger 2400, stop it at a designated location in the program, display values of variables, and continue execution of the program.

Figure 29:
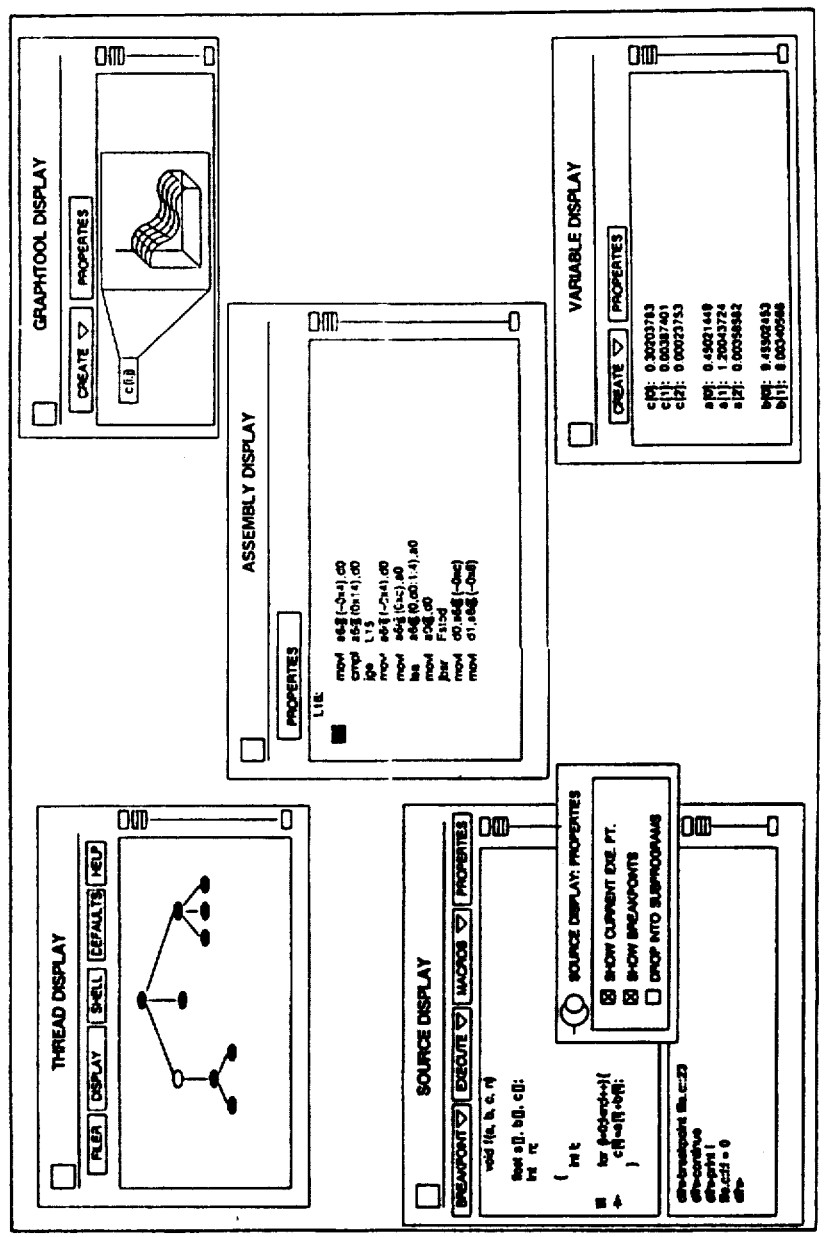
Figure 29A:
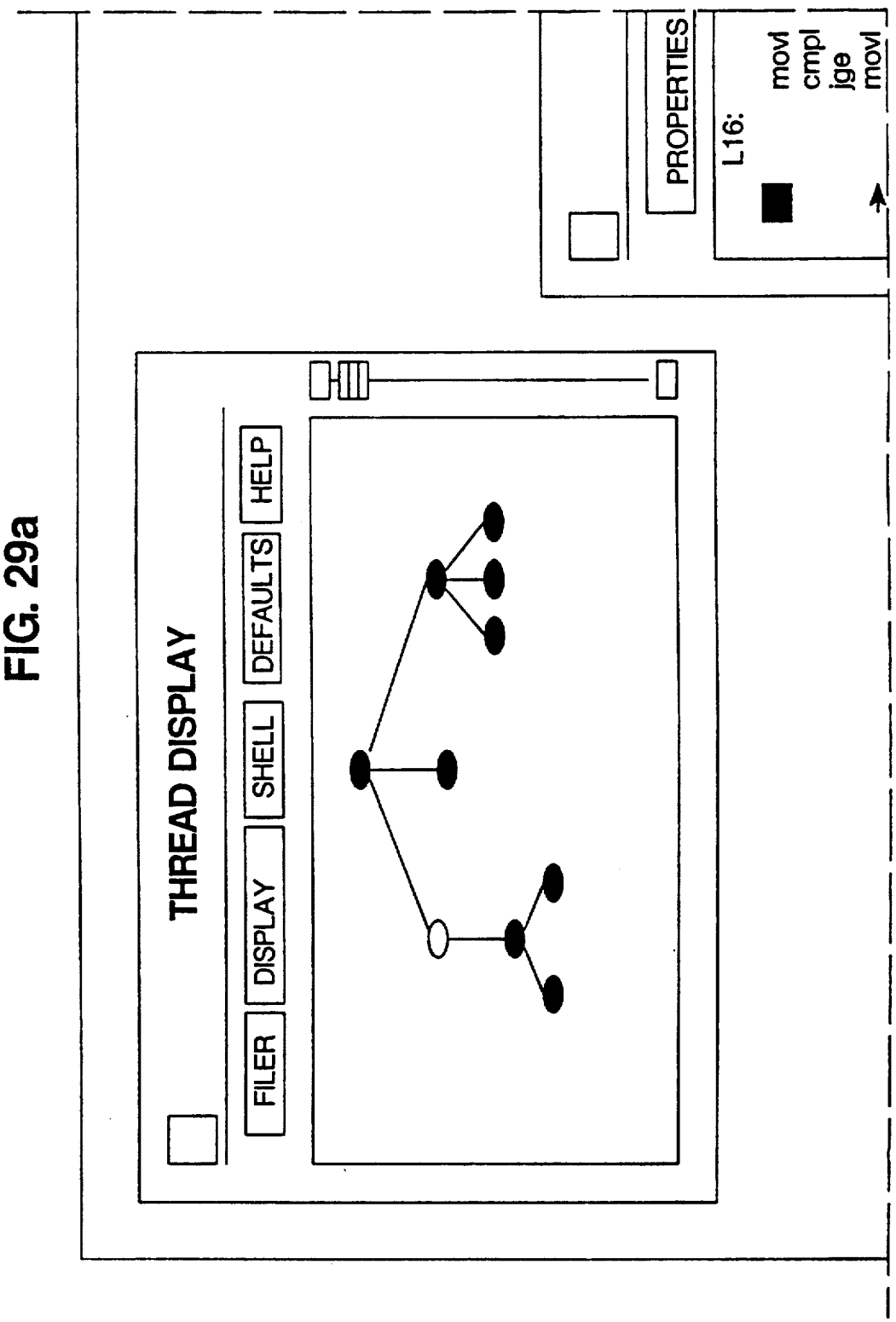
FIGS. 29a, 29b, 29c and 29d are a pictorial representation of a multiple window user interface to the distributed debugger of the present invention.
Figure 29B:
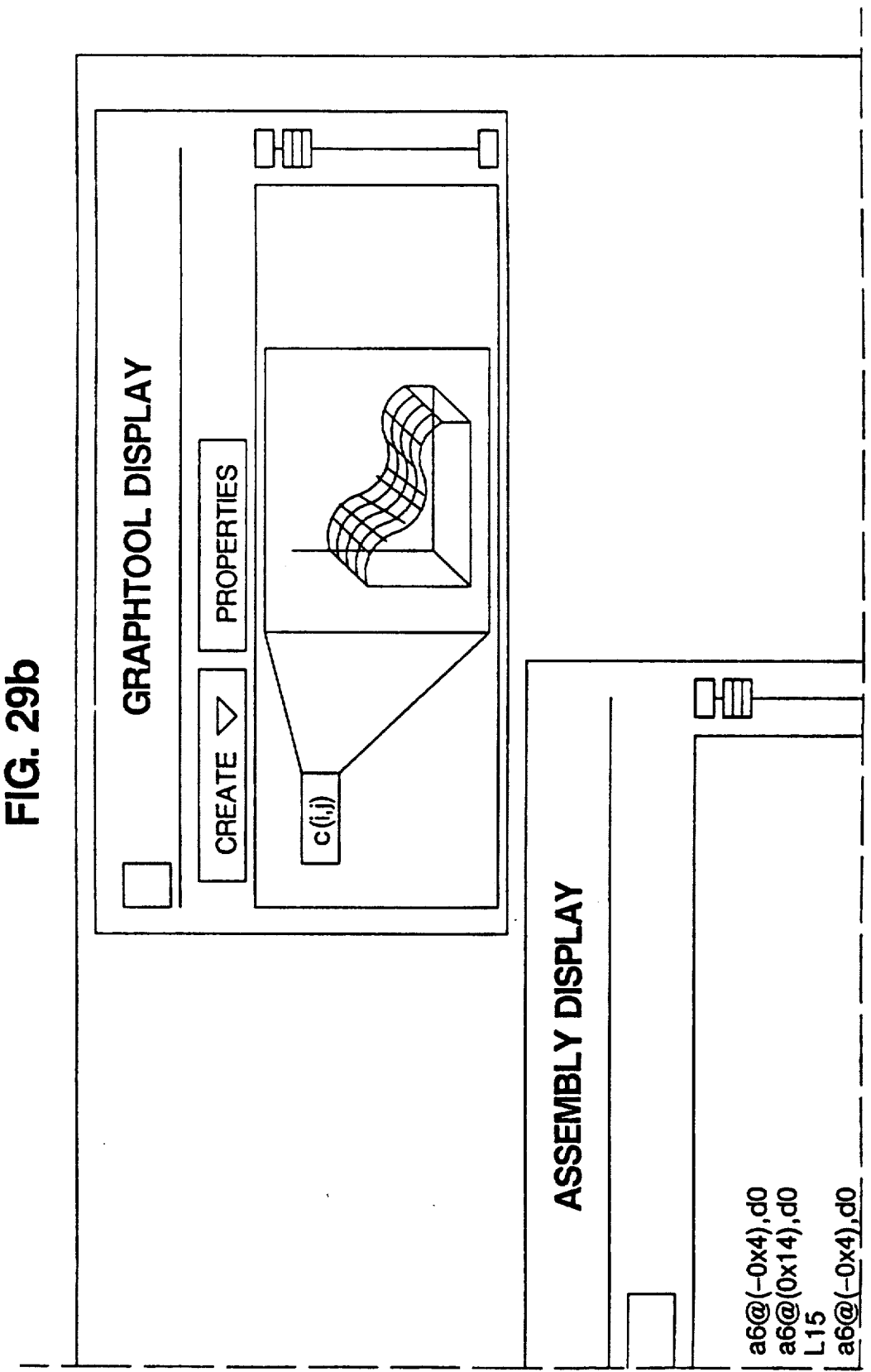
Figure 29C:
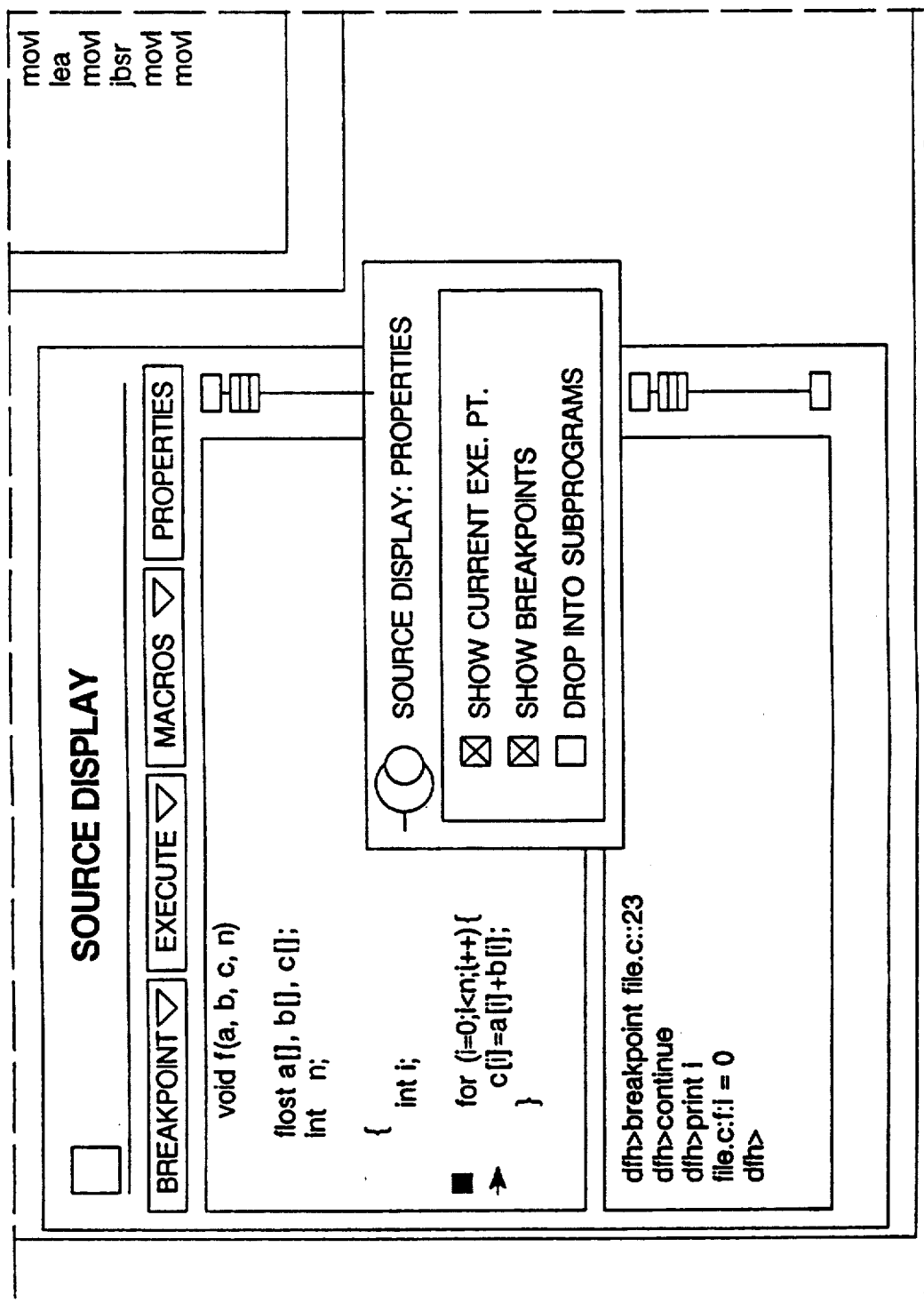
Figure 29D:
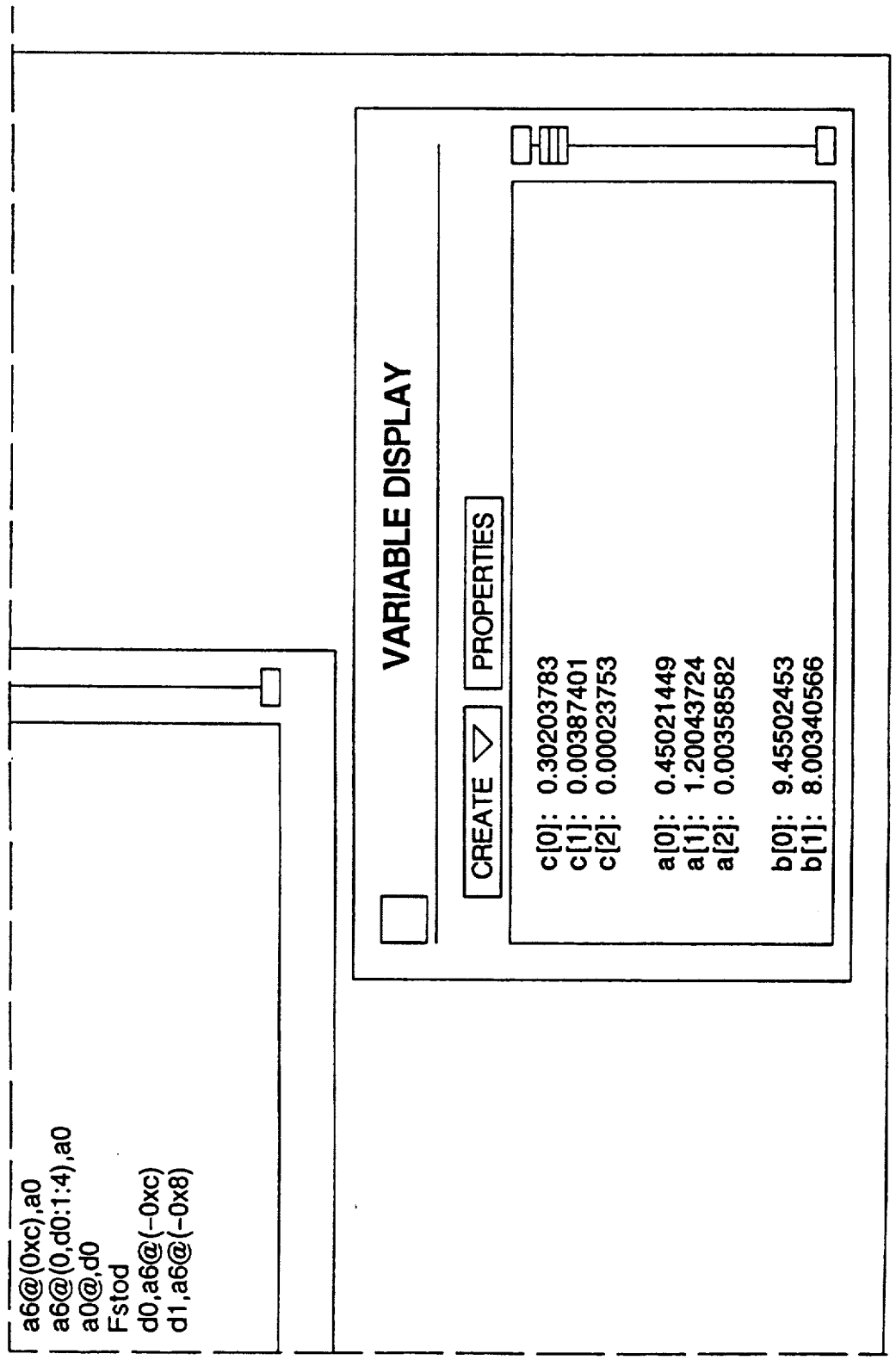

The debugger 2400 has several unique features. The combination of these innovative capabilities provide the user functionality not generally found in other debuggers. The debugger 2400 has two user interfaces. The first, a line-oriented interface, accepts commands familiar to System V users. The second interface, comprised of windows, is designed to minimize the learning required to use debugger 2400's capabilities. As shown in FIG. 29, multiple windows display different types of information. Windows also provide flexible display and control of objects in a debuggins session and a means for visualizing data graphically.

Figure 30:
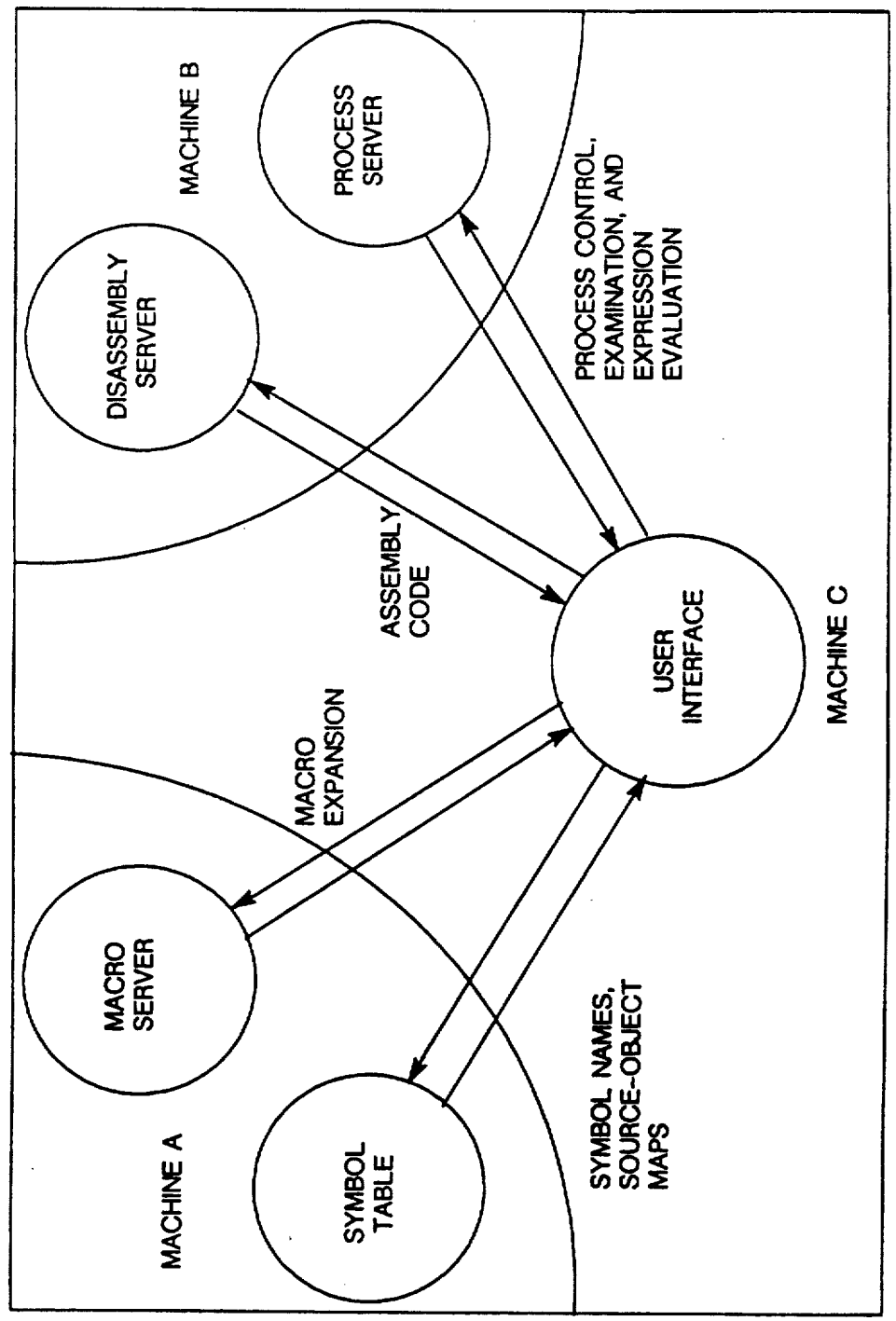
FIG. 30 is a schematic representation of the information utilized by the distributed debugger as maintained in various machine environments.

As shown schematically in FIG. 30, the software architecture of the present invention maintains the information necessary to display high-level language source, for the segment of the program being debugged, in a number of environments (e.g., Machine A, B and C). The compilation system creates a mapping of the high-level program source code to machine code and vice versa. One of several capabilities of the debugger 2400 not found in other debuggers is source-level debugging of optimized code. The optimizations that can be applied and still maintain source-level debugging include dead-code elimination, code migration, code scheduling, vectorization, register assignment and parallelization.

The debugger 2400 supports debugging of parallel code. A display of the program's dynamic threading structure aids the user in debugging parallel-processed programs. The user can interrogate individual threads and processes for information, including a thread's current state of synchronization. Other commands display the status of standard synchronization variables such as locks, events, and barriers. The debugger 2400 provides additional capabilities. For example, a programmer can set breakpoints for data and communication, as well as code. Macro facilities assign a series of commands to one command. Control statements in the command language allow more flexibility in applying debugger commands. Support for distributed processes enables the programmer to debug codes on different machines simultaneously. Numerous intrinsic functions, including statistical tools, aid the programmer in analyzing program data. The debugger 2400 support of language-specific expressions allows familiar syntax to be used.

2.4.1 Distributed Debugger Design

Distributing the functionality of the debugger into unique server processes localizes the machine dependent parts of the debugger 2400 to those unique server processes. The debugger 2400 is a distributed debugger consisting of a Debugger User Interface (DUI) plus a Symbol Server (SS) and a Debug Host Server (DHS). The DUI parses the commands from the user and creates an internal representation for the commands. It then interprets the commands. DUI uses SS to get symbol information about symbols in the process being debugged. Symbol information includes type information and storage information about symbols in the program being debugged. DUI uses DHS to interact with the process executing the program being debugged. Interaction with the process includes starting and stopping the execution of the process, reading the registers in the process, and reading the memory image of the process. The distributed nature of the debugger aids the debugging of distributed applications (applications that run on a distributed computer network). For example, an application running on 3 computers would have 3 instances of DHS running on the 3 computers to interact with the three different parts of the applications. DUI communicates with SS and DHS via remote procedure calls.

2.4.2 Use of Register Mapping for Debugger

The debugger 2400 uses the list of variable and register pairs associated with each basic block to determine which register holds the live value of a variable. Each variable resides in only one register in each basic block. The variable that is held in a register in a basic block either enters the basic block in that register or is loaded into that register during execution of the basic block. If the variable is already in the register upon entry to the basic block, then its value is readily known from the variable-register pairs maintained by the compiler. If the variable is not in a register upon entry to the basic block, the debugger 2400 examines a sequence of code in the basic block to determine at what point the variable is loaded into the register.

2.4.3 Mapping Source Code to Executable Code

A mapping of the source code to its executable code (generated from the source code) and a mapping of the binary code to its source code are maintained to aid in debugging optimized code. The mappings allow setting of breakpoints in the source code and mapping the breakpoints to the binary code. It also allows recognition of the source code associated with each binary instruction.

The compilers translate their respective source program into an intermediate form called HiForm or HF. Contained within the HF is the source file address of the source code that translated into that HF. The source file address contains the line number for the source expression, the byte offset from the beginning of the file to the source expression, and the path name to the source file. The HF is translated to LoForm or LF. The LF is a second intermediate form that maps closely to the instruction set of the preferred embodiment of the processor as set forth in detail in the appendix to the previously identified parent application. The HF maps directly to the LF that it generates. The LF contains a relative location of the binary instruction corresponding to the LF.

The debugger matches the line number of a line of source with a source file address in the HF. The HF points to its corresponding LF and the LF points to the corresponding location of its binary instruction.

2.4.4 Debugging Inlined Procedures

The compiler 2200 provides debugging support for in-lined procedures by marking the HF for any procedure that has been in-lined and creating a table of source file addresses where in-lining has been done.

The process of debugging is made more difficult by procedure in-lining. One problem is that the source code for the program no longer reflects the executing code for the program because calls to procedures have been replaced by the code for the procedure. A second problem is that debugging the code in the procedure that has been in-lined is complicated by the fact that the code exists in multiple places (wherever it has been in-line and potentially as a non-in-lined instance of the procedure. To overcome these difficulties in-lining in the present invention: 1) sets a bit in every statement node that was created due to some form of in-lining (also set a field in the statement node to point to the specific call site that was in-lined); and 2) creates a list of source file addresses where in-lining has taken place per procedure being inlined, and attaches that list to the procedure definition symbol.

2.4.5 Dual Level Parsing

The parser associated with the debugger 2400 consists of multiple parsers, including: a debugger command language parser, C expression parser, and Fortran expression parser. The command language parser executes until it recognizes that the next items to be parsed are expressions in either C or Fortran. The command language parser knows when to expect an expression by the structure of the command language. It knows which language expression to expect because of the language flag that specifies what language is being processed. The command language parser then calls either the C expression parser or the Fortran expression parser. All parsers are built with the YACC parser generating systems with modifications to the names of the different parsers. Each parser has a different LEX generated lexical analyzer and each parser has its own separate parse table. All lexical analyzers also share a common input stream. The grammar for each of the parsers is made simpler than a single grammar for the command language, C expressions and Fortran expressions and the parsing is faster and more efficient.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. An integrated software architecture for controlling a highly parallel multiprocessor system having multiple tightly-coupled processors that share a common memory, the integrated software architecture comprising:

control means for distributively controlling the operation and execution of a plurality of multithreaded programs in the multiprocessor system by executing a symmetrically integrated multithreaded operating system program on one or more of the processors that has an anarchy-based scheduling model for scheduling one or more processes and resources associated with each multithreaded program for execution on one or more of the processors, each processor having access to a single image of the operating system program stored in the common memory that operates on a common set of operating system shared resources, the operating system programming means comprising:

kernel means for processing multithreaded system services such that any one or more of the system services can be executed concurrently by multiple processors, the system services including:

parallel process scheduler means for scheduling multiple processes into one or more processors according the anarchy-based scheduling model, parallel memory scheduler means for allocating space in the common memory among one or more processes scheduled for execution in one or more of the processors, and support means for providing accounting, control, monitoring, security, administrative and operator information about any one or more of the processors;

input/output means for processing distributed, multithreaded input/output services such that any one or more of the input/output services can be executed concurrently by multiple ones of the processors and a plurality of input/output resources associated with the multiprocessor system, the input/output resources including a plurality of peripheral devices attached to the multiprocessor system via a plurality of external interfaces, the input/output services including file management means for managing the external storage of files containing both data and instructions for the multithreaded programs, input/output management means for distributively processing input/output requests from the processors to the peripheral devices, resource scheduler means for allocating the input/output resources to the processes so as to optimize the usage the input/output resources of the multiprocessor system, and network support means for supporting input-/output requests to other remote processors interconnected with the multiprocessor system; and multithreaded interface library means for interfacing requests to a plurality of common multithreaded object code files stored in the common memory for performing standard programming library functions; and interface means operably associated with the control means for interfacing between one or more developers and users of the multithreaded programs and the control means so as to present a common visual format for all output representations and input commands for the operating system program and a plurality of program development tools that comprise an integrated parallel user environment for providing compilation, execution and debugging of the multithreaded programs.

2. The integrated software architecture of claim 1 wherein the program development tools of the integrated parallel user environment comprise:

compilation means for compiling a source code file representing one of the multithreaded programs to produce an executable code file containing one or more processes associated with the multithreaded program;

program management means for controlling a development and execution environment for the source code file;

debugger means for controlling a debugging environment in response to execution of the executable code file on the multiprocessor system; and user interface means operably connected to the compilation means, the program management means and the debugger means for presenting the visual representations of one or more outputs and for receiving one or more input commands relating to of a plurality of status, control and execution options available for the multithreaded programs.

3. The integrated software architecture of claim 2 wherein the compilation means comprises:

one or more front end means for parsing the source code file and for generating an intermediate language representation of the source code file;

optimization means for optimizing the organization of the intermediate language representation of the source code file to produce a multithreaded program capable of parallel execution, including means for generating machine independent optimizations based on the intermediate language representation; and code generating means for generating an object code file based upon the intermediate language representation, including means for generating machine dependent optimizations.

4. the integrated software architecture of claim 3 wherein the program management means comprises:

means for linking the object code file of the multithreaded program into an executable code file to be executed by the multiprocessor system;

means for executing the executable code file in the multiprocessor system; and means for monitoring and tuning the performance of the executable code file, including means for providing the status, control and execution options available for the developer.

5. The integrated software architecture of claim 2 wherein the user interface means comprises:

a set of icon-represented functions corresponding to the status, control and execution options available for the multithreaded programs; and an equivalent set of command-line functions.

6. The integrated software architecture of claim 3 wherein the debugger means comprises:

means for mapping the source code file to the object code file of the multithreaded program; and means for mapping the object code file to the source code file of the multithreaded program.

7. A method for controlling a highly parallel multiprocessor system having multiple tightly-coupled processors that share a common memory comprising the steps of:

distributively controlling the operation and execution of one or more multithreaded programs in the multiprocessor system by executing a symmetrically integrated multithreaded operating system program on one or more of the processors that has an anarchy-based scheduling model for scheduling one or more processes and resources associated with each multithreaded program, each processor having access to a single image of the operating system program stored in the common memory that operates on a common set of operating system shared resources, the operating system program comprising the steps of:

(a) processing a plurality of multithreaded system services such that any one or more of the system services can be executed concurrently by multiple processors, the system services including:

(a1) scheduling multiple processes into one or more of the processors according the anarchy-based scheduling model, (a2) allocating space in the common memory among one or more of the processes scheduled for execution in one or more of the processors, and (a3) providing for accounting, control, monitoring, security, administrative and operator information about any one or more of the processors and processes;

(b) processing a plurality of multithreaded input/output services such that any one or more of the input/output services can be executed concurrently by multiple ones of the processors and a plurality of input/output resources associated with the multiprocessor system, the input/output resources including a plurality of peripheral devices attached to the multiprocessor system via a plurality of external interfaces, the input/output services including (b1) managing storage of files containing both data and instructions for the multithreaded programs on the peripheral devices, (b2) distributively processing input/output requests from the processors to the peripheral devices, (b3) allocating the input/output resources to the processes so as to optimize the usage the input/output resources of the multiprocessor system, and (b4) supporting input/output requests to other remote processors interconnected with the multiprocessor system; and interfacing between one or more developers and users of the multithreaded programs and the operating system program so as to present a common visual format for all output representations and input commands for the operating system program and a plurality of program development tools that comprise an integrated parallel user environment for providing compilation, execution and debugging of the multithreaded program.

8. The method of claim 7 wherein the program development tools of the integrated parallel user environment comprise the steps of:

(a) compiling a source code file representing one of the multithreaded programs to produce an executable code file containing one or more processes associated with the multithreaded program;

(b) controlling a development and execution environment for the source code file and executable code file;

(c) controlling a debugging environment in response to execution of the executable code file on the multiprocessor system; and (d) presenting in response to steps (a), (b) and (c) all of the visual representations and input commands relating to the status, control and execution options available for the multithreaded programs in the common visual format.

9. The method of claim 8 wherein step (a) comprises:

(a1) parsing the source code file and generating an intermediate language representation of the source code file;

(a2) optimizing the organization of the intermediate language representation of the source code file to produce a multithreaded program capable of parallel execution, including generating machine independent optimizations based on the intermediate language representation; and (a3) generating an object code file based upon the intermediate language representation, including generating machine dependent optimizations based on a machine dependent representation of the intermediate language representation.

10. The method of claim 9 wherein step (b) comprises:

(b1) linking the object code file of the multithreaded program into an executable code file to be executed by the multiprocessor system;

(b2) executing the executable code file in the multiprocessor system; and (b3) monitoring and tuning the performance of the executable code file, including providing the status, control and execution options available for the developer and user.

11. The method of claim 10 wherein step (c) comprises:

(c1) mapping the source code file to the object code file of the multithreaded program;

(c2) mapping the object code file to the source code file of the multithreaded program; and (c3) in response to a command from the developer or an interrupt during the step of executing the executable code file, allowing the developer to examine the status of the executable file as it was executing on one or more of the processors by referring directly to one or more statements in the source code file.

12. The method of claim 8 wherein step (d) comprises:

providing a set of icon-represented functions corresponding to the status, control and execution options available for the multithreaded programs; and providing an equivalent set of command-line functions.

* * * * *